(12) United States Patent
Pereira et al.

(10) Patent No.: US 10,910,854 B2
(45) Date of Patent: Feb. 2, 2021

(54) METHODS AND APPARATUS FOR A TABLET COMPUTER SYSTEM INCORPORATING A BATTERY CHARGING STATION

(71) Applicant: Alfi, Inc., Miami Beach, FL (US)

(72) Inventors: Paul Antonio Pereira, Miami Beach, FL (US); Charles Raglan Pereira, Miami Beach, FL (US); John Marvin Cook, II, North Bay Village, FL (US)

(73) Assignee: Alfi, Inc., Miami Beach, FL (US)

( * ) Notice: Subject to any disclaimer, the term of this patent is extended or adjusted under 35 U.S.C. 154(b) by 0 days.

(21) Appl. No.: 16/803,102

(22) Filed: Feb. 27, 2020

(65) Prior Publication Data

US 2020/0259347 A1 Aug. 13, 2020

Related U.S. Application Data

(63) Continuation of application No. 16/576,071, filed on Sep. 19, 2019.
(Continued)

(51) Int. Cl.
*H02J 7/00* (2006.01)
*G06F 1/16* (2006.01)
(Continued)

(52) U.S. Cl.
CPC .......... *H02J 7/0045* (2013.01); *G06F 1/1626* (2013.01); *G06F 1/1635* (2013.01);
(Continued)

(58) Field of Classification Search
CPC .............................. H02J 7/0045; G06F 1/1626
(Continued)

(56) References Cited

U.S. PATENT DOCUMENTS

2002/0098891 A1* 7/2002 Graham ................ G06Q 30/02
463/42
2008/0207276 A1 8/2008 Burrell
(Continued)

FOREIGN PATENT DOCUMENTS

| JP | 3213041 U | 10/2017 |
| KR | 10-0693414 B1 | 3/2007 |
| KR | 10-2017-0001792 A | 1/2017 |

OTHER PUBLICATIONS

International Search Report and Written Opinion dated May 14, 2020, received in International Patent Application No. PCT/US2020/0144441.

*Primary Examiner* — Jeffery A Williams
(74) *Attorney, Agent, or Firm* — Knobbe, Martens, Olson & Bear LLP

(57) ABSTRACT

A tablet computer includes a housing, a display, a processing system, a camera system comprising a camera sensor, and a battery system, the battery system positioned within the housing. The battery system is configured to charge an external device. A charging cable retainer is configured to retain one or more cables against or within the housing. One or more integral cables are provide. The one or more integral cables include a cable comprising a first end fixedly coupled to the battery system, a first connector of a first type configured to mate with a first type of external device connector, a second connector of a second type configured to mate with a second type of external device connector, and a lens configured to form images on the camera sensor. The charging cable retainer includes a cable channel or magnet.

30 Claims, 72 Drawing Sheets

Related U.S. Application Data

(60) Provisional application No. 62/803,951, filed on Feb. 11, 2019.

(51) Int. Cl.
  *H01R 31/06* (2006.01)
  *H01R 27/00* (2006.01)
  *H04N 5/33* (2006.01)
  *H04N 1/00* (2006.01)
  *G09G 5/10* (2006.01)

(52) U.S. Cl.
  CPC ............ *G06F 1/1686* (2013.01); *G09G 5/10* (2013.01); *H01R 27/00* (2013.01); *H01R 31/06* (2013.01); *H04N 1/00209* (2013.01); *H04N 5/33* (2013.01); *G09G 2320/0626* (2013.01); *G09G 2330/021* (2013.01); *G09G 2354/00* (2013.01); *H04N 2201/0084* (2013.01)

(58) Field of Classification Search
  USPC .......................................................... 348/78
  See application file for complete search history.

(56) References Cited

U.S. PATENT DOCUMENTS

| | | |
|---|---|---|
| 2009/0051312 A1 | 2/2009 | Simon et al. |
| 2009/0128090 A1 | 5/2009 | Bi |
| 2010/0211219 A1* | 8/2010 | Hallin .................... G06Q 50/22 700/242 |
| 2011/0222724 A1* | 9/2011 | Yang .................... G06K 9/4628 382/103 |
| 2011/0317872 A1 | 12/2011 | Free |
| 2012/0071215 A1 | 3/2012 | Bourque et al. |
| 2012/0158461 A1 | 6/2012 | Aldrey et al. |
| 2012/0250950 A1 | 10/2012 | Papakipos et al. |
| 2012/0252543 A1 | 10/2012 | Cho |
| 2013/0066677 A1 | 3/2013 | Killoh |
| 2013/0092811 A1 | 4/2013 | Funk et al. |
| 2013/0155309 A1 | 6/2013 | Hill et al. |
| 2013/0163197 A1 | 6/2013 | Mack et al. |
| 2013/0305144 A1 | 11/2013 | Jackson et al. |
| 2014/0026157 A1 | 1/2014 | Wang et al. |
| 2014/0091623 A1 | 4/2014 | Shippy |
| 2014/0118145 A1* | 5/2014 | Wawrzyniak ...... G08B 21/0247 340/568.8 |
| 2014/0140572 A1 | 5/2014 | Ranjan et al. |
| 2014/0156398 A1* | 6/2014 | Li ...................... G06K 9/00288 705/14.53 |
| 2014/0253024 A1 | 9/2014 | Rautiainen et al. |
| 2014/0333255 A1 | 11/2014 | Han et al. |
| 2014/0344017 A1* | 11/2014 | Deephanphongs .......................... G06Q 30/0201 705/7.29 |
| 2015/0123620 A1 | 5/2015 | Nowak |
| 2015/0138703 A1 | 5/2015 | Gillis |
| 2015/0207864 A1 | 7/2015 | Wilson et al. |
| 2016/0033997 A1 | 2/2016 | Heckler |
| 2016/0042308 A1 | 2/2016 | Aptakin |
| 2017/0118207 A1 | 4/2017 | Madhu et al. |
| 2017/0163063 A1 | 6/2017 | Cai |
| 2017/0192501 A1* | 7/2017 | Na ..................... G06F 3/017 |
| 2017/0208370 A1 | 7/2017 | Ray et al. |
| 2018/0357981 A1* | 12/2018 | Ng ..................... G09G 5/12 |
| 2019/0149869 A1 | 5/2019 | Ray et al. |

\* cited by examiner

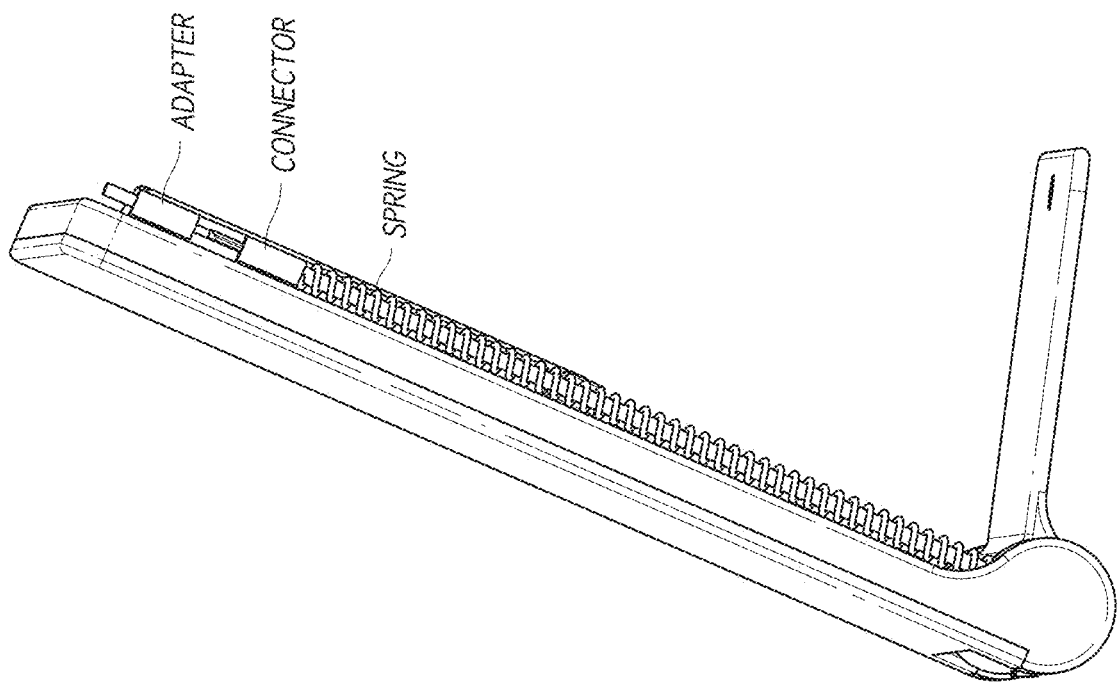

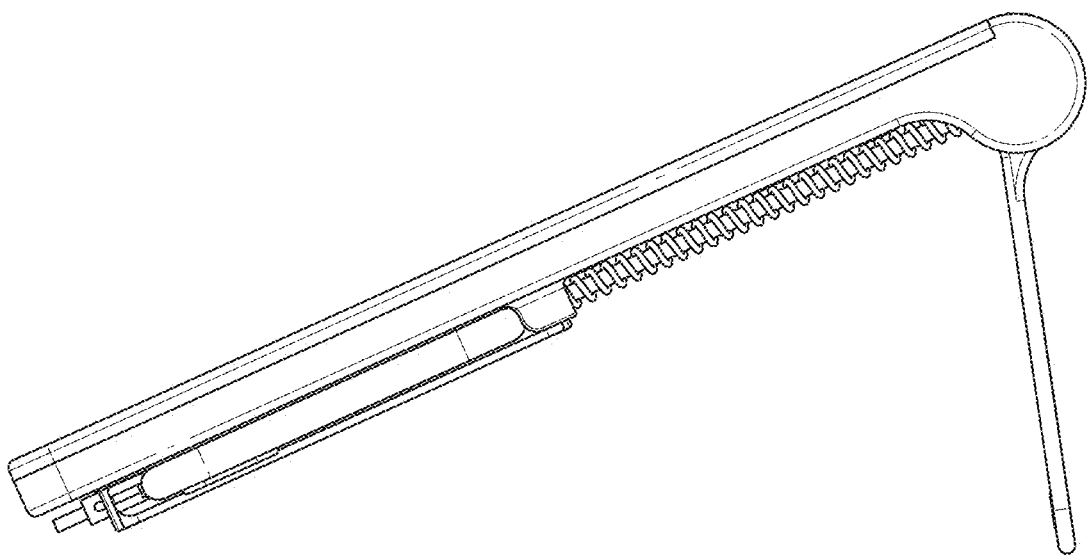

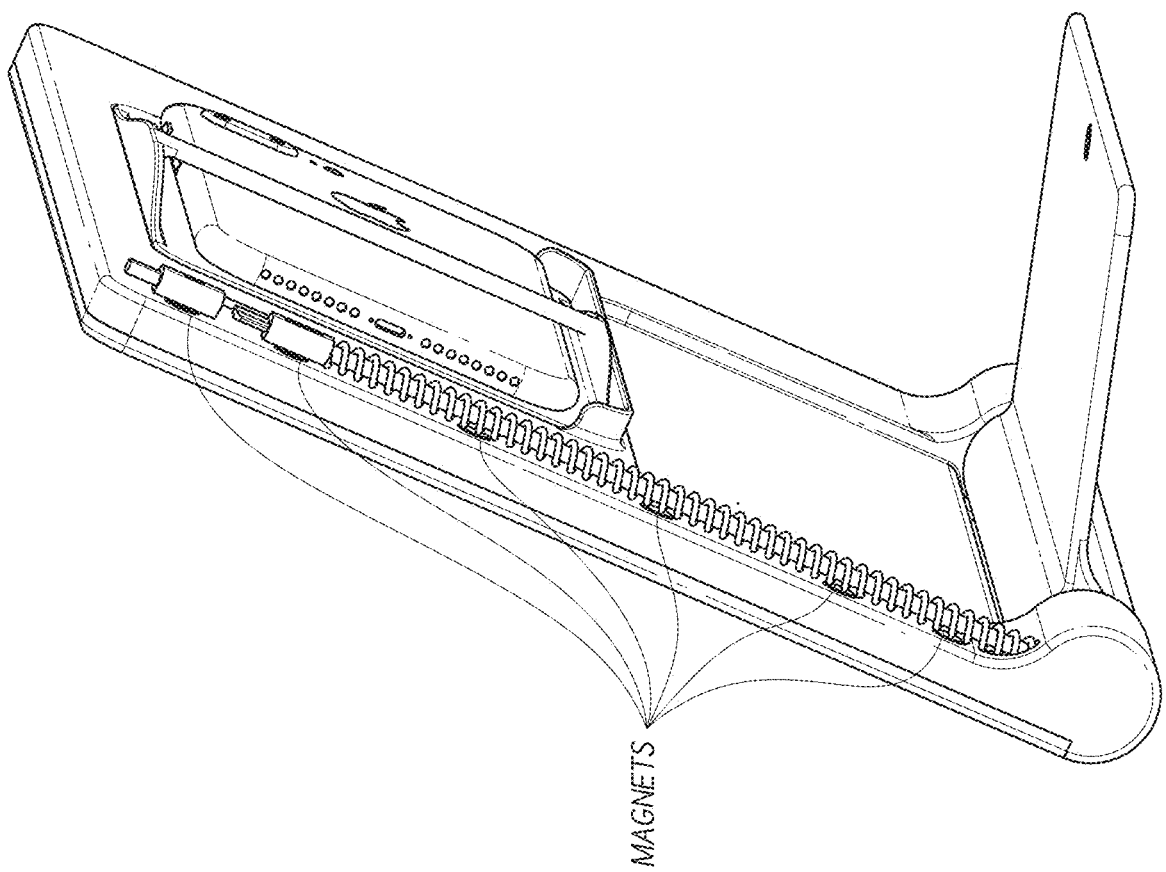

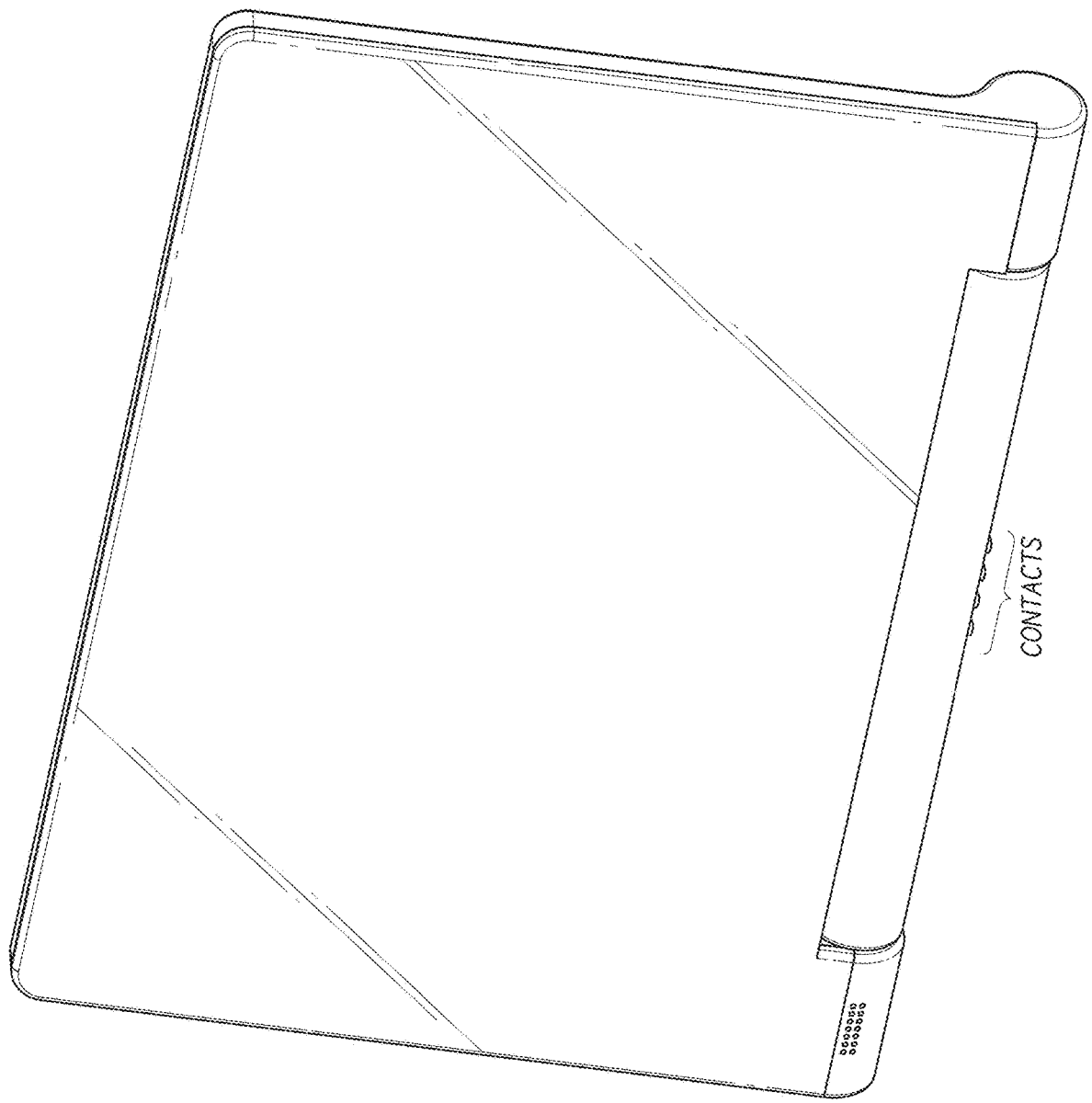

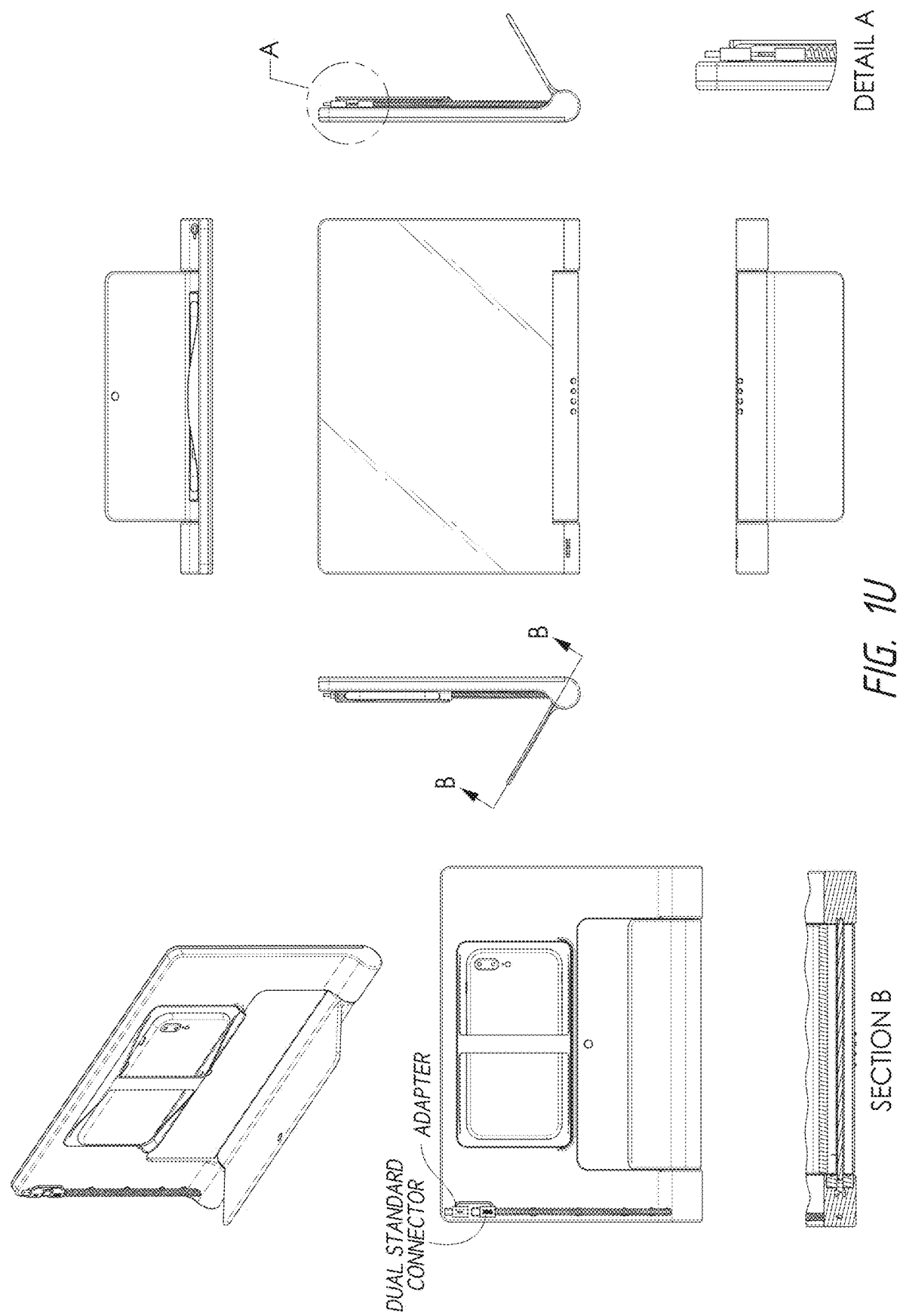

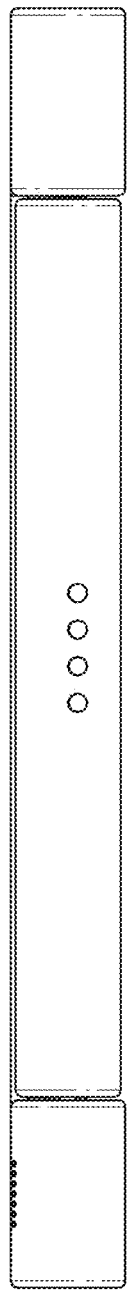
FIG. 1I/

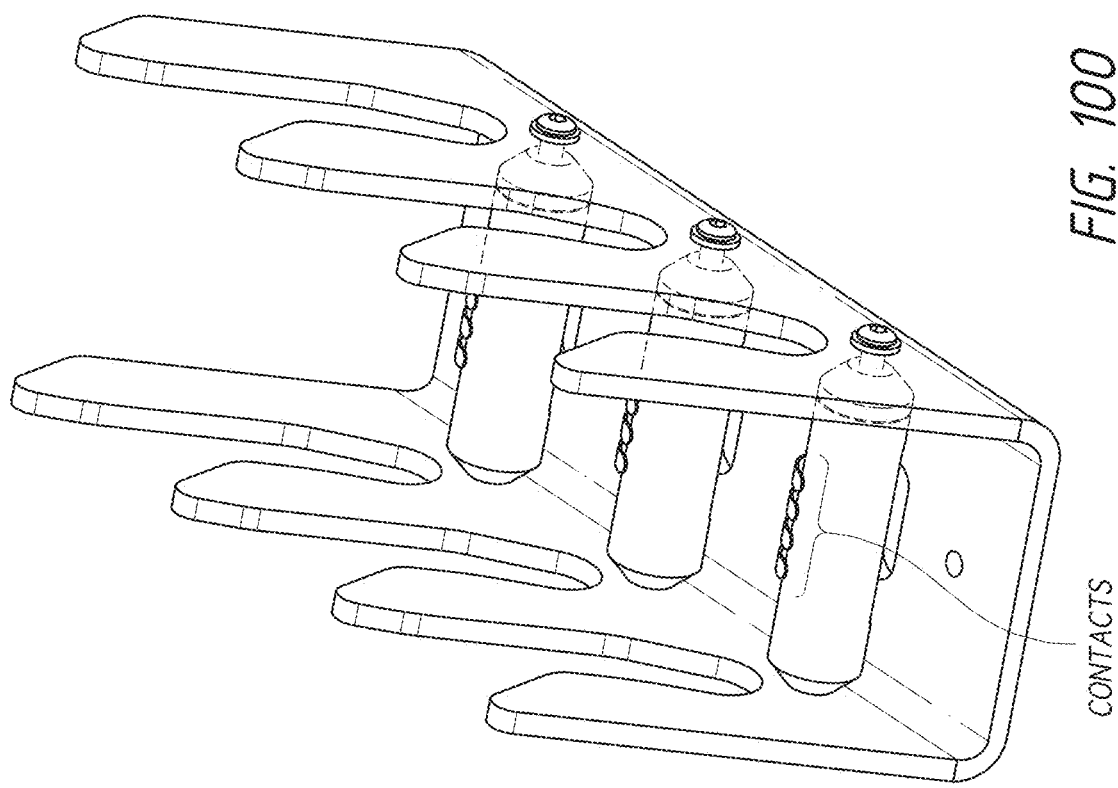

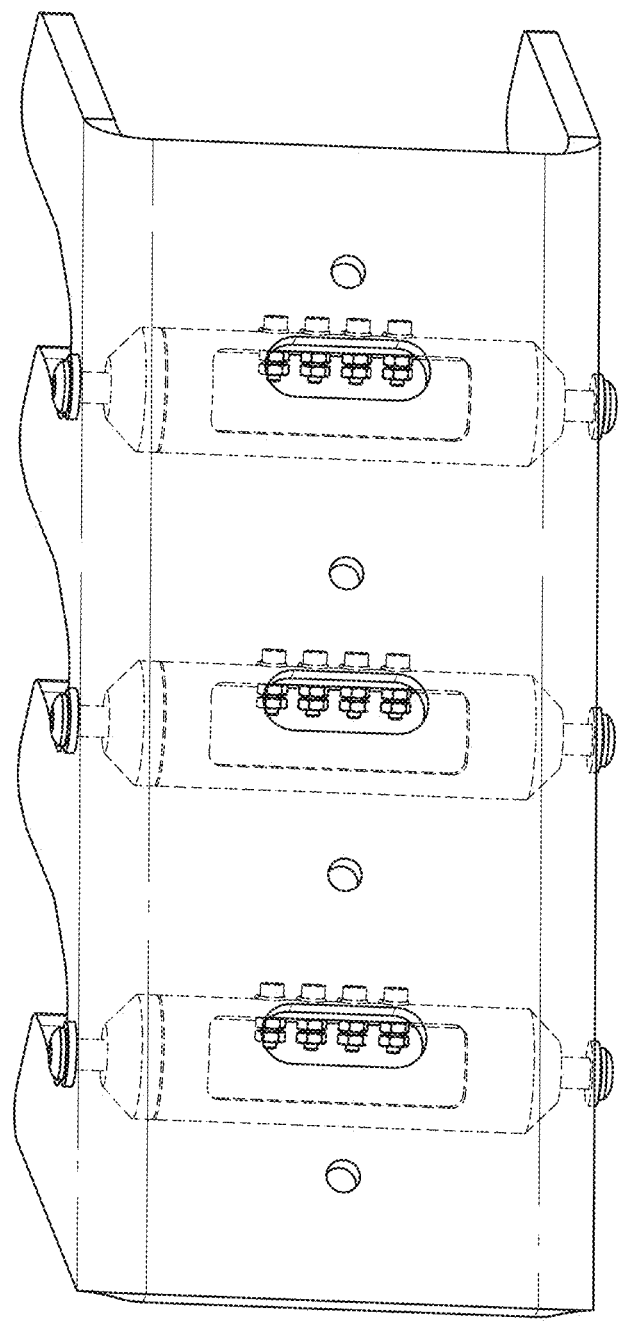

FIG. 12H

METHODS AND APPARATUS FOR A TABLET COMPUTER SYSTEM INCORPORATING A BATTERY CHARGING STATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The field of the invention relates to portable computer devices having displays.

Description of the Related Art

Portable devices, such as smart phones, have become an ever more integral part of peoples' daily lives. Such devices are used for phone calls, messaging, accessing calendar information, entertainment, and the like. However, as such portable devices are increasingly used throughout the day, their batteries are often depleted at an inopportune time. Conventional battery technology has failed to provide an adequate solution for ensuring users are able to use their devices throughout the day.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the disclosure relate to a charging station, such as, by way of example a tablet-charging station combination, a hinged-computer charging station, a pyramid-shaped charging station (which may include some or all of the features of the tablet-charging station, but in a pyramid shape with a vertical or inclined display on a face of the pyramid), or other-shaped computer-charging station combination. The charging station is optionally configured to charge other electronic products. Aspects of the disclosure related to distributed, networked applications hosted by such charging stations. A tablet computer includes a housing optionally having a plurality channels formed thereon, a display, a processor, a camera, a first battery system, and a second battery system. The first battery system is configured to power the display, the processor, and the camera. The second battery system, isolated from the first battery system, is configured to charge an external device. A first cable may optionally removably reside in a first channel, where a first end is coupled to the second battery system, and a second end has a connector of a first type configured to mate with a first type of external device connector. A second cable may optionally removably reside in a second channel, where a first end is coupled to the second battery system, and a second end has a connector of a second type configured to mate with a second type of external device connector.

Aspects of the disclosure relate to a charging station, such as, by way of example a tablet-charging station combination, a hinged-computer charging station, a pyramid-shaped charging station (which may include some or all of the features of the tablet-charging station, but in a pyramid shape with a vertical or inclined display on a face of the pyramid), or other-shaped computer-charging station combination. The charging station is optionally configured to charge other electronic products. Aspects of the disclosure related to distributed, networked applications hosted by such charging stations. A tablet computer includes a housing optionally having a plurality channels formed thereon, a display, a processor, a camera, and at least a first battery system. The first battery system is configured to power the display, the processor, the camera, as well as charge an external device. One or more charging interfaces may be provided to charge other device. For example, a first cable may have a first end coupled to the first battery system, and a second end has a connector of a first type configured to mate with a first type of external device connector.

Aspects of the disclosure relate to a tablet computer comprising a housing, a display, a processing system, a camera system comprising a camera sensor, and a battery system, the battery system positioned within the housing and configured to charge an external device. A charging cable retainer is configured to retain one or more cables against or within the housing. One or more integral cables are provide. The one or more integral cables include a first end fixedly coupled to the battery system, a first connector of a first type configured to mate with a first type of external device connector, a second connector of a second type configured to mate with a second type of external device connector, and a lens configured to form images on the camera sensor. The charging cable retainer comprises a cable channel and/or a magnet.

An aspect of the present disclosure relates to a tablet computer, comprising: a housing, the housing comprising a plurality of sides having a plurality channels formed thereon; a display; a processing system; a camera system comprising a camera sensor; a battery system, positioned within the housing, configured to power the display, the processing system, the camera system, and configured to charge an external device; a first cable comprising: a first end fixedly coupled to the battery system; a second end with a first connector of a first type configured to mate with a first type of external device connector; a second cable comprising: a first end fixedly coupled to the battery system; a second end with a second connector of a second type configured to mate with a second type of external device connector; wherein the first cable removably resides in a first of the plurality of channels so that the first connector of the first type can be removed from the first channel and mated with the first type of external device connector, and wherein the first end of the first cable remains coupled to the battery system; wherein the second cable removably resides in a second of the plurality of channels so that the first connector of the second type can be removed from the second channel and mated with the second type of external device connector, and wherein the first end of the second cable remains coupled to the battery system; and a wide angle lens providing a field of view within a range 180-300 degrees, the wide angle lens configured to form images on the camera sensor.

An aspect of the present disclosure relates to tablet computer, comprising: a housing; a display; a processing system; a camera system comprising a camera sensor; a battery system, the battery system positioned within the housing, configured to power the display, the processing system, the camera system, and configured to charge an external device; a cable retainer configured to retain one or more cables against or within the housing; one or more integral cables comprising: a first end fixedly coupled to the battery system; a first connector of a first type configured to mate with a first type of external device connector; a second connector of a second type configured to mate with a second type of external device connector; and a lens configured to form images on the camera sensor.

An aspect of the present disclosure relates to a distributed computer system, comprising: a first plurality of geographically distributed tablet computers, wherein a given tablet computer comprises: a housing; a display; a processing system; a camera system comprising a camera sensor; a battery system, positioned within the housing, configured to power the display, the processing system, the camera system, and configured to charge an external device; a first cable comprising: a first end coupled to the battery system; a second end with a first connector of a first type configured to mate with a first type of external device connector; a second cable comprising: a first end coupled to the battery system; a second end with a second connector of a second type configured to mate with a second type of external device connector; a computer system configured to communicate with the plurality of tablet computers, the system comprising: one or more processing devices; a network interface; computer-readable memory that stores instructions that when executed by the one or more processing devices cause the computer system to perform operations comprising: use information received using the network interface from a given tablet computer in the first plurality of tablet computers to determine a location of the given tablet computer; receive, using the network interface, from the given tablet computer images captured using the given tablet computer camera system; determine if a user face is within one or more of the images received from the given tablet; in response to determining a user face is within the one or more images, generate a model of the user face; use the model of the user face to determine whether a record, corresponding to historical user interactions with content, exists; in response to determining that a record, corresponding to historical user interactions with content, exists, use the record and the determined location of the given tablet computer to identify content that is to be displayed to the user; cause the identified content to be displayed on the given tablet computer.

Optionally, the battery system comprises: a first battery subsystem configured to power the display, the processing system, and the camera system; and a second battery subsystem isolated from the first battery subsystem, the second battery subsystem configured to charge the external device. Optionally, the given tablet computer is configured to: detect when a charge level of the battery system falls to a first level; and in response to detecting the charge level of the battery system has fallen to the first level: disable charging of the external device, while stilling enabling transmission of tablet computer location data from the given tablet computer to the computer system configured to communicate with the plurality of tablet computers. Optionally, the operations further comprising: use one or more of the user images to determine a response of the user to the identified content; and use the response determined from the one or more user images to select another item of content for display to the user. Optionally, the record, corresponding to historical user interactions with content, comprises user preferences inferred from images of the user captured while content was displayed to the user. Optionally, the distributed computer system further comprises a deep neural network utilized in generating the model of the user face. Optionally, the operations further comprising: use the images to determine a gaze direction of the user; associate the gaze direction with content displayed on the given tablet computer; and use the association of the gaze direction with content displayed on the given tablet computer in selecting at least one item of content to be displayed to the user. Optionally, a first of the plurality of tablet computers has a housing comprising a first channel configured to receive the first cable and a second channel configured to receive the second cable. Optionally, a first of the plurality of tablet computers comprises a wide angle lens providing a field of view within a range 180-300 degrees, the wide angle lens configured to form images on the camera sensor. Optionally, the operations further comprising: generate a user interface that enables content to be scheduled to be displayed by tablet computers at one or more specified locations; receive the content schedule via the user interface; and enable content to be displayed by the tablet computers at the one or more specified locations. Optionally, the operations further comprising: generate a user interface that enables content to be scheduled to be displayed by tablet computers at one or more specified locations; receive the content schedule via the user interface; and automatically modify the schedule with respect to given tablet computer in response to an analysis of the record corresponding to historical user interactions with content. Optionally, the operations further comprising: receive a low charge message from a first of the tablet computers; determine a notification destination associated with the first tablet computer based on an identifier received from the first tablet computer or a location associated with the first tablet computer; and transmit a low charge notification to the determined notification destination.

An aspect of the present disclosure relates to a distributed computer system, comprising: a first plurality of geographically distributed tablet computers, wherein a given tablet computer comprises: a housing; a display; a processing system; a camera system comprising a camera sensor; a battery system, positioned within the housing, configured to power the display, the processing system, the camera system, and configured to charge an external device; a first cable comprising: a first end coupled to the battery system; a second end with a first connector of a first type configured to mate with a first type of external device connector; a computer system configured to communicate with the plurality of tablet computers, the system comprising: one or more processing devices; a network interface; computer-readable memory that stores instructions that when executed by the one or more processing devices cause the computer system to perform operations comprising: receive, using the network interface, from a given tablet computer images captured using the given tablet computer camera system; determine if a user face is within one or more of the images received from the given tablet; in response to determining a user face is within the one or more images, generate a model of the user face; use the model of the user face to determine whether a record, corresponding to historical user interactions with content, exists; in response to determining that a record, corresponding to historical user interactions with content, exists, use the record in identifying content that is to be displayed to the user; cause the identified content to be displayed on the given tablet computer.

An aspect of the present disclosure relates to computer system configured to manage remote tablet computers, comprising: one or more processing devices; a network interface; computer-readable memory that stores instructions that when executed by the one or more processing devices cause the computer system to perform operations comprising: generate a user interface that enables content to be scheduled to be displayed by tablet computers at one or more specified locations; receive the content schedule via the user interface, the content schedule including a content schedule for at least a first tablet computer; receive, using a network interface, from a given tablet computer images captured using the given tablet computer camera system; determine if a user face is within one or more of the images received from the given tablet; in response to determining a user face is within the one or more images, generate a model of the user face; use the model of the user face to determine whether a record, corresponding to historical user interactions with content, exists; in response to determining that a record, corresponding to historical user interactions with content, exists, determine, using the record, whether the content schedule for the first tablet computer is to be modified; in response to determining that the content schedule for the first tablet computer is to be modified, automatically modifying the content schedule for the first tablet computer; causing content to be displayed on the first tablet computer in accordance with the first tablet computer.

Optionally, the operations further comprising: use one or more of the user images to determine a response of the user to an item of content; and use the response determined from the one or more user images in selecting another item of content for display to the user. Optionally, the record, corresponding to historical user interactions with content, comprises user preferences inferred from images of the user captured while content was displayed to the user. Optionally, the computer system, further comprising a deep neural network utilized in generating the model of the user face. Optionally, the operations further comprising: use the images to determine a gaze direction of the user; associate the gaze direction with content displayed on the given tablet computer; and use the association of the gaze direction with content displayed on the given tablet computer in selecting at least one item of content to be displayed to the user. Optionally, the operations further comprising: receive a low charge message from a first of the tablet computers; determine a notification destination associated with the first tablet computer based on an identifier received from the first tablet computer or a location associated with the first tablet computer; and transmit a low charge notification to the determined notification destination. Optionally, the generation of the model of the user face, comprises: convert an image from color to black and white; associate image pixels with brightness gradients; divide the image into blocks; determine brightness gradient vectors corresponding to respective image blocks; use the brightness gradient vectors to detect the user face; generate a facial fingerprint of the user face, the facial fingerprint comprising a plurality of points corresponding to facial features of the user face.

BRIEF DESCRIPTION OF THE DRAWINGS

Embodiments will now be described with reference to the drawings summarized below. Throughout the drawings, reference numbers may be re-used to indicate correspondence between referenced elements. The drawings are provided to illustrate example embodiments described herein and are not intended to limit the scope of the disclosure.

FIGS. 1G-1Z, 1AA-1TT illustrate additional examples of display devices comprising a charging station and of power bank stations that may be used to power/charge one or more display device charging stations.

FIGS. 12A-12K, 13A-13B illustrates example user interfaces.

DETAILED DESCRIPTION

Figure 1A:
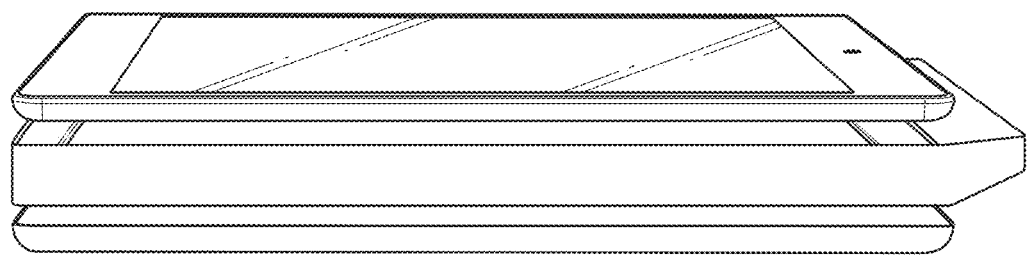
FIG. 1A(a)-1A(c), 1B(a)-1B(e), 1C, 1D(a)-1D(d) illustrate examples of a display device comprising a charging station.
Figure 1A:
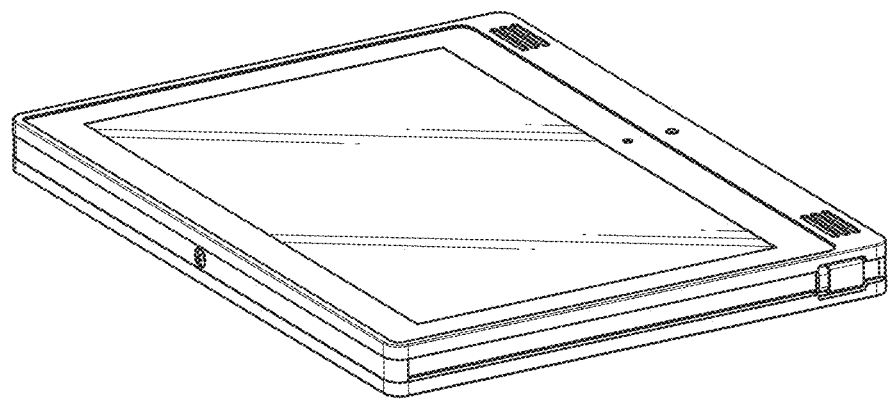
Figure 1A:
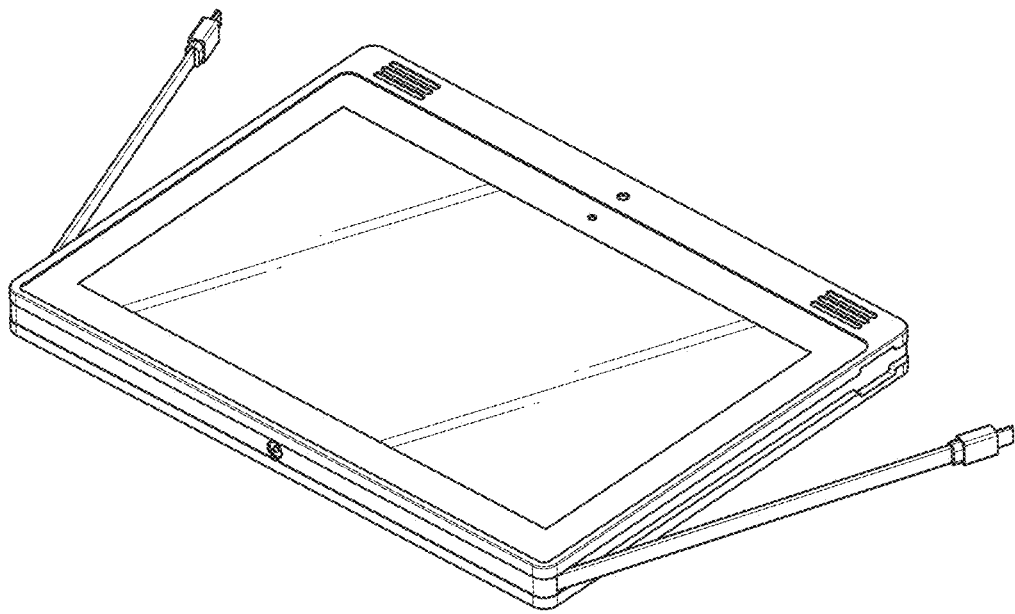

Aspects of the disclosure relate to a charging station combination, configured to charge other electronic products, and to distributed, networked applications therefor. It is understood that although the description herein may refer to a tablet charging station combination, other charging station configurations may be used, such as a hinged-computer charging station or a pyramid-shaped charging station (which may include some or all of the features of the tablet-charging station, but in a pyramid shape with a vertical or inclined display on a face of the pyramid).

As similarly discussed elsewhere herein, portable devices, such as smart phones, laptops, and wireless earbuds/headphones have become an ever more integral part of peoples' daily lives. Such devices may be used for or during phone calls, for messaging, for accessing calendar information, for browsing the Internet, for entertainment, and the like. However, as such portable devices are increasingly used throughout the day, their batteries are often depleted at an inopportune time causing low battery anxiety among users. Conventional battery technology has failed to provide an adequate solution for ensuring users are able to use their devices throughout the day.

In order to address these and other technical problems, a tablet-charging station combination, configured to charge other electronic products, is disclosed. In addition to being configured to charge other devices, the disclosed tablet-charging station combination may be used to request and/or receive digital content from remote networked systems. The digital content may optionally be targeted to the user based at least in part on the user's physical location. The determination of the user's physical location may be based on knowledge of the location of the tablet-charging station combination.

Combining a tablet computer with a battery charging station offers technical advantages and functionality not provided by a tablet computer and a separate, standalone battery charging station. For example, a standalone battery charging station is not configured to determine and wirelessly report the charge status of a user device being charged by the standalone battery charging station or the amount of charge used by the user device. Further, a standalone battery charging station is not configured to determine and wirelessly report the charge status of the standalone battery charging station itself.

Still further, a standalone battery charging station is not configured to enable content to be selected based in part on a charge level. Additionally, a standalone battery charging station is not configured to prompt a user to enter user identification information in response to a user device being connected to the standalone battery charging station. Yet further, a standalone battery charging station is not configured to provide faster charging in response to a user providing certain user information or data.

A standalone tablet would not be able to charge multiple devices without itself needing to be recharged. In addition, a standalone tablet would not be able to provide faster charging to a user device in response to receiving user information or data. Nonetheless, certain advantageous and functionality described herein may be achieved by a standalone battery charging station or a standalone tablet computer, even if some of the benefits of a combined tablet computer-battery charging station are not achieved.

As will be described, tablet-charging stations may be distributed by a central operator to a plurality of physical locations. For example, the physical locations may be restaurants, airports, hotels, retail stores, and/or other locations. The tablet-charging stations may be provided for the convenience of users visiting the locations so that such users may charge their electronic devices. The tablet-charging station may be equipped with a relatively large battery to enable the tablet-charging station to charge multiple user devices serially and/or at the same time without having to be recharged itself. Optionally, when the tablet-charging station detects that the battery charge level has dropped to a preset threshold or dynamically determined threshold, the tablet-charging station will respond by entering a low-power mode, were certain circuitry and functions are still enabled (e.g., a GPS/locator module), while other functions are disabled to conserve power (e.g., the display, the streaming of video content, etc.). Optionally, the tablet-charging station may be equipped with two sets of batteries, one set to power the tablet-charging station itself, and another set to charge user devices. This enables the tablet-charging station to communicate with remote systems and reproduce content, even if the battery for charging user devices is discharged so that it cannot charge user devices.

FIGS. 1A-1D illustrate example tablet-charging station combinations. FIGS. 1G-1TT illustrate additional examples of display devices comprising charging stations and of power bank stations that may be used to power/charge one or more display device charging stations.

Referring to example (a) in FIG. 1A, in this example a top level includes a touchscreen and bezel and a middle level includes a housing in which some of all of the station batteries are mounted. Optionally, a battery management circuit is included in the middle level. A bottom level includes other portions of the station circuitry (e.g., wireless interfaces, processor(s), graphics processing units, memory, a GPS radio, power management circuits, etc.). Speakers may be mounted to the bezel, the middle level, or the bottom level. The speakers may be front facing, rear facing or side facing. Optionally, audio may be played via the speakers and/or via wired or wireless (e.g., BLUETOOTH) headphones/ear buds of the user connected to the station.

Figure 1B:
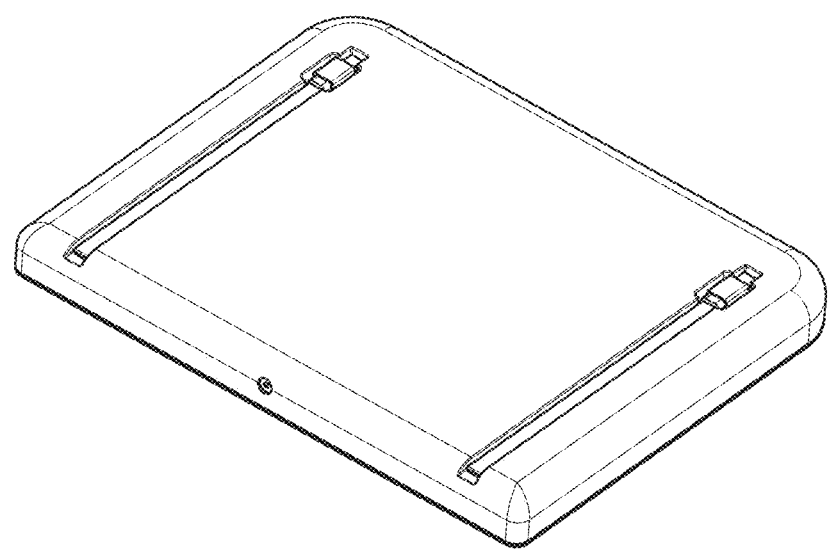
Figure 1B:
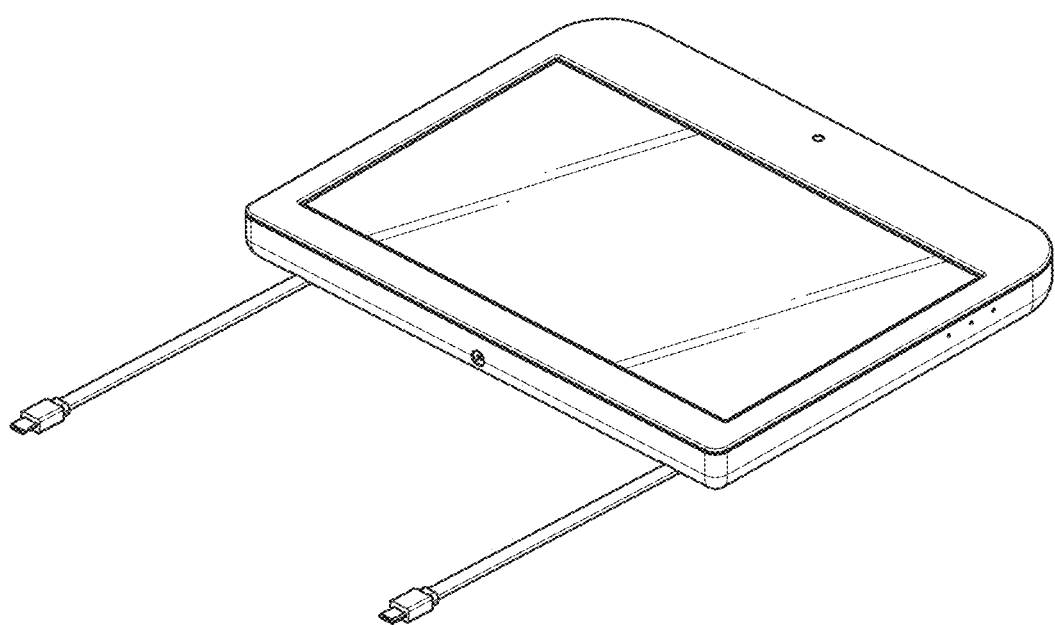
Figure 1B:
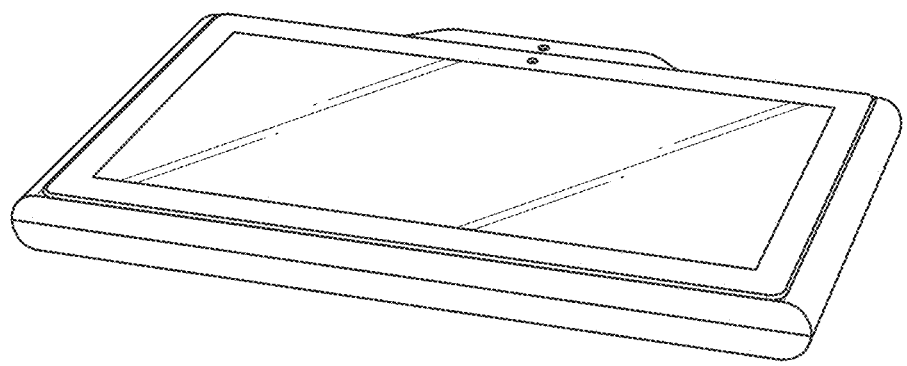
Figure 1B:
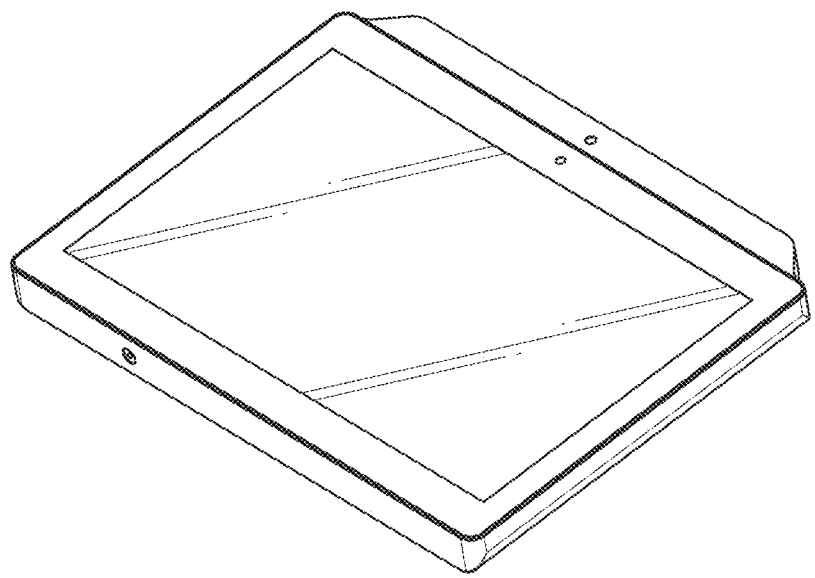
Figure 1B:
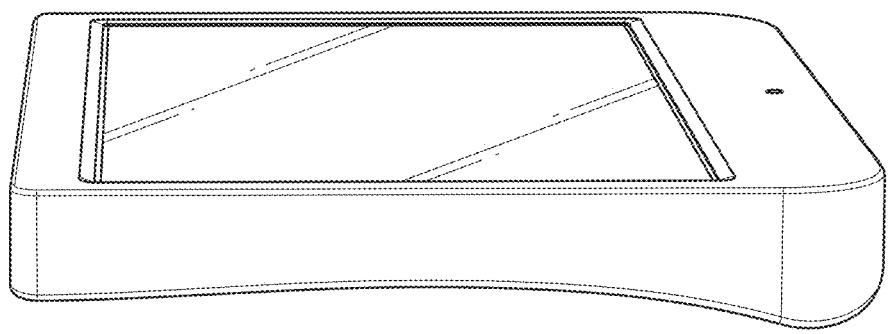

With reference to examples (b) and (c) in FIG. 1A, and examples (a) and (b) in FIG. 1B, the station housing may include one or more recessed retention channels via which respective one or more charging cables may removably reside for storage. For example, the channels may be positioned on one or both sides of the housing (see, e.g., FIG. 1A(b), FIG. 1A(c), FIG. 1C) on the bottom of the housing (see, e.g., FIG. 1B(a), FIG. 1B(a)), and/or on the top of the housing (not shown). A given cable may optionally be flat or rounded. The exterior of the cable may be of a resilient material (e.g., a rubber or rubber-type material, a polymer material, etc.) that is compressible. A given cable retaining channel may compress the cable and/or may be expanded by the cable, with the resulting pressure and/or friction securely retaining the cable within the channel, while still allowing the cable to be easily withdrawn from the retaining channel by hand. In addition or instead, tabs or other protrusion extending from one or both sides of the retaining channel to about 20%-50% of the channel width may be used to removably retain the cable.

A given channel may extend to the end of a side of the station, where the corresponding cable may be anchored to a point inward a certain distance from the end of the side of the station (see, e.g., FIG. 1B(a)).

Other cable retention structures may be used to retain cables. For example, a given cable structure (e.g., a retaining spring in which the cable resides, a cable connector configured to mate with a connector of a user device, etc.) may include ferrous material. One or more magnets may be positioned on or within the housing body and/or on or within the cable insulator or cable connector. When the portion of the cable that includes ferrous material is placed near or over a magnet, the magnet will removably retain the cable (see, e.g., FIGS. 1H, 1I, 1J, 1K, 1Q, 1T, 1U (detail A)). The one or more magnets may be located on the back, front, and/or sides of the housing. A retaining spring (e.g., a ferrous, nickel plated steel spring) may be wrapped around the cable, with one end attached to the housing, to protect the cable and to aid in the cable automatically being positioned in a stowed position so that the spring and/or the cable connector is positioned over or near one or more magnets (see, e.g., FIGS. 1H, 1I, 1J, 1K, 1Q, 1T, 1U). A cable cutout may be provided via which the cable extends. An internal cord grip may be provided within the cable cutout to aid in retaining the spring in a vertical orientation thus aiding the "self-finding" of the charging cable onto the magnets so that the charging cable is in a stowed position. Further, the positioning of the charging cable enables the length of the charging cable to be minimized.

One side of a given cable may pass through an orifice in the station housing and may be connected to a power bank (e.g., a battery pack) within the station via hardwire or via a connector. Optionally, a grommet may be used to seal the orifice. The other side of the cable may include a connector configured to mate with a connector of a user device. Different cables may have different mating connectors (e.g., micro-USB connectors, USB-C connectors, USB-A connectors, LIGHTNING connectors, and/or other connectors) to connect to different models or types of user devices. Thus, a user can pull the appropriate cable from its channel and connect the mating connector to the user device.

Optionally, a given cable may have a first connector configured to mate with a first type of user device connector, and an attached adapter which may be placed on the first connector to enable the cable to be connected to a second type of user device connector (see, e.g., FIGS. 1H, 1I, 1J, 1K, 1Q, 1T, 1U). For example, an adaptor cap may be provided that has a first adaptor connecter (e.g., a female connector) that mates with the first connector of the cable, and a second adapter connector (e.g., a male connector) configured to mate with a second type of user device connector, thereby enabling the cable to connect to user devices having different types of connectors. By way of illustration, the first connector of the cable may be a USB-C male connector and the second adapter connector may be a male LIGHTNING connector. Optionally, the cap may be retained to the cable (e.g., using a flexible strap, such as a rubber, polymer, or metal retaining strap). Thus, a single cable, using an attached adapter, may be utilized to connect to multiple connector types. Optionally, a given cable connector may be configured mechanically and electrically to fit two different types of user device connectors that comply with respective different standards (e.g., a micro USB connector and a LIGHTNING connector, see, e.g., FIG. 1U). Optionally, to enhance a user's privacy, a cable may only include power lines and/or connector terminals (e.g., pins, sockets, traces, and/or the like) and not data lines and/or connector terminals so that the cable may be used to charge a user device, but cannot be used to extract or receive data from the user device.

The station housing may include a retractable or folding stand (e.g., a hinged retractable stand or a foot/base member configured to rotate around a pivot point of a hinge located on one side of the housing, where the foot/base rotates from a housing recess to a tablet supporting position) configured to be swung outwards or downwards from the housing to support the housing at an incline in a landscape or portrait orientation (see, e.g., FIG. 1U). The stand may optionally be relatively narrow to enable more components to be included in the hinge assembly. As will be described, the positioning of the housing relative to the base member may be under software control. Optionally, the base member may be configured to rotate outwards from the housing to one or more fixed set points (e.g., in the range of 50-75 degrees). A magnet may be positioned in or on the base member and/or in or on the housing, wherein when the base member is in a retracted position, the magnet may retain the base member against the housing. A channel or other recess may be formed in the housing configured to receive the base member when in the retracted/folded position. Optionally, a biasing member may be attached to the stand and/or case. A biasing member may enable extension of the retractable stand from a retracted position to a first extended position, and from the first extended position to a second extended position.

Figure 1C:
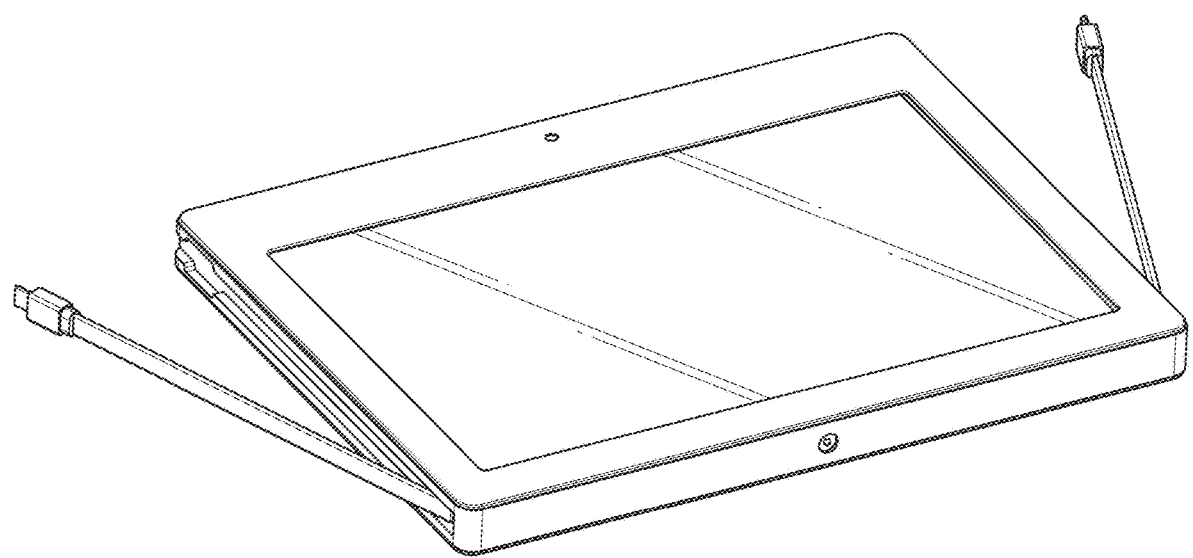
Figure 1D:
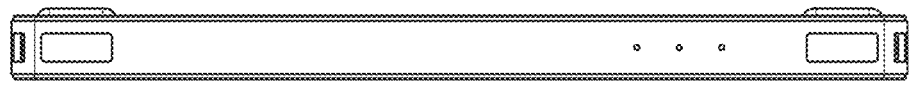
Figure 1D:
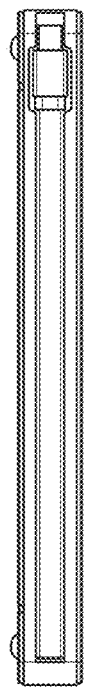
Figure 1D:
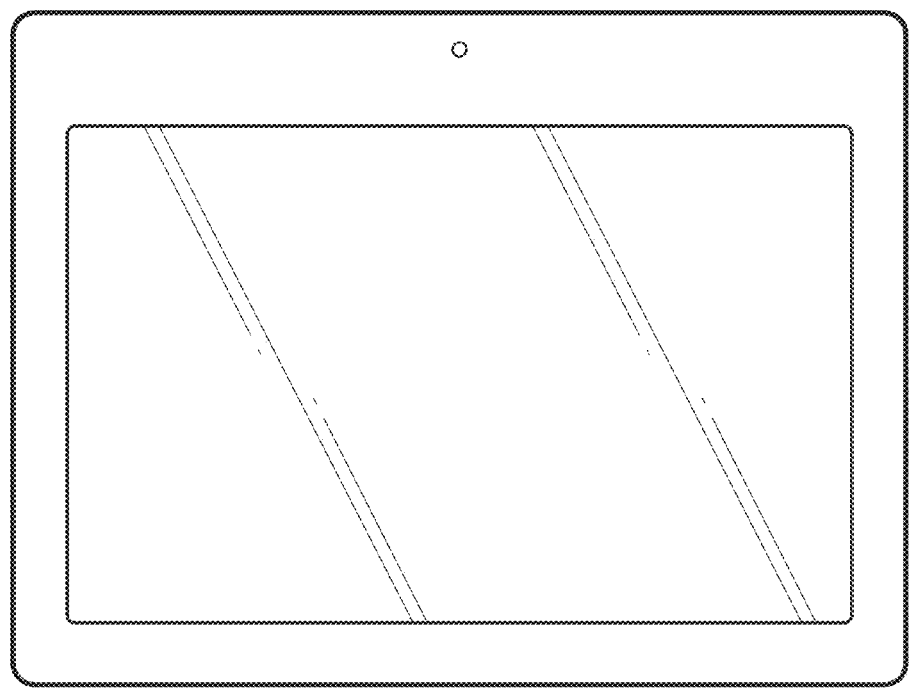
Figure 1D:
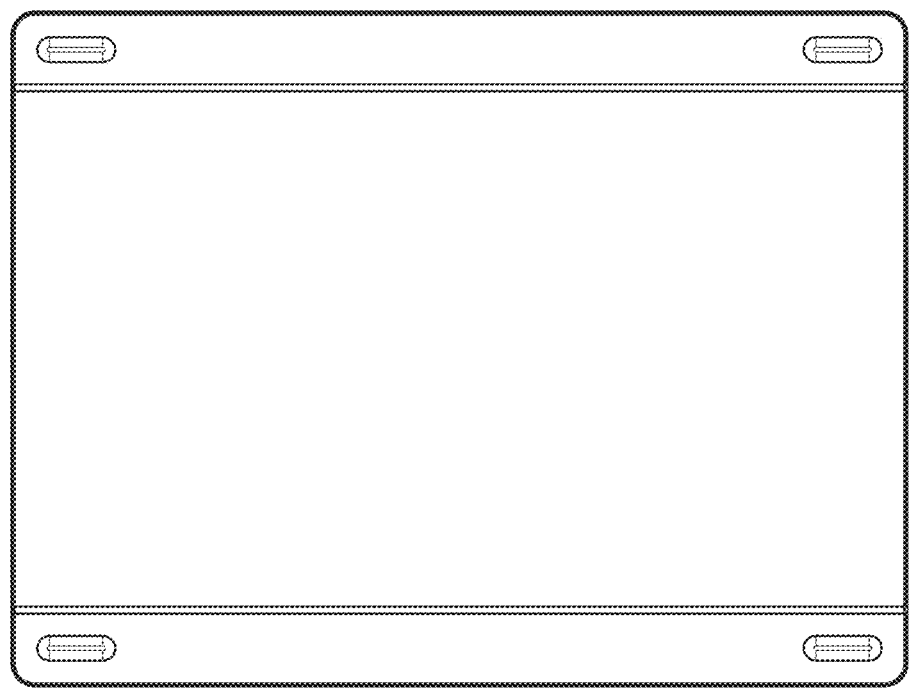
Figure 1E:
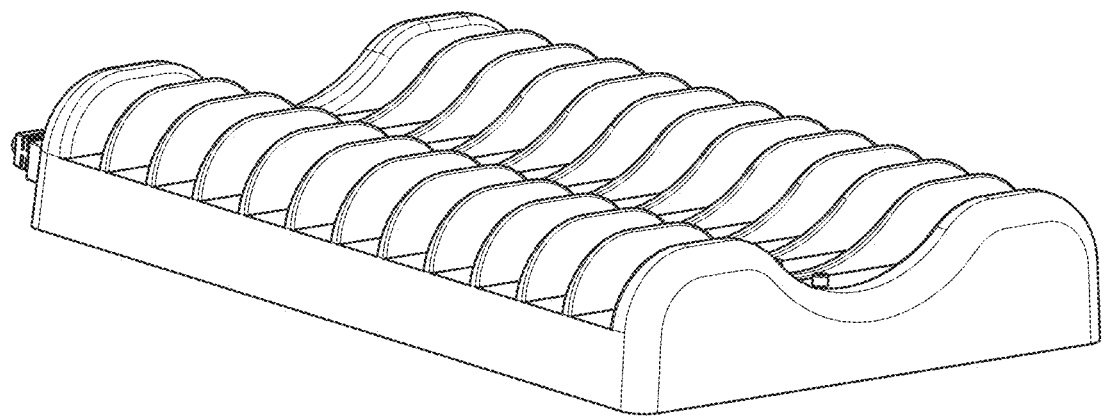
FIGS. 1E(a)-1E(b), 1F(a)-1F(b) illustrates examples of a power bank station that may be used to power/charge one or more display device charging stations.
Figure 1E:
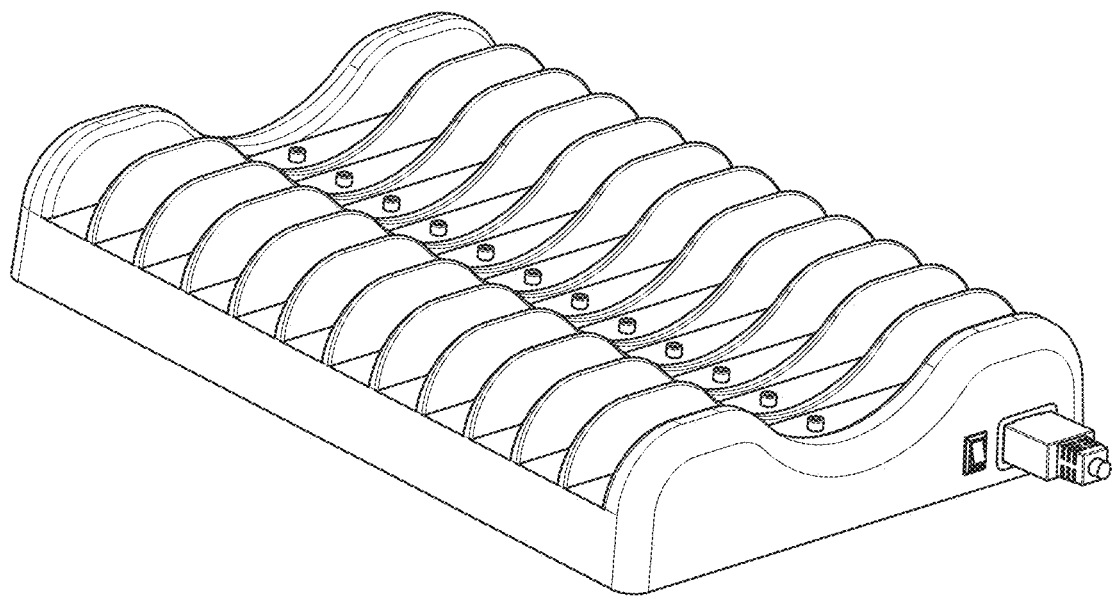
Figure 1F:
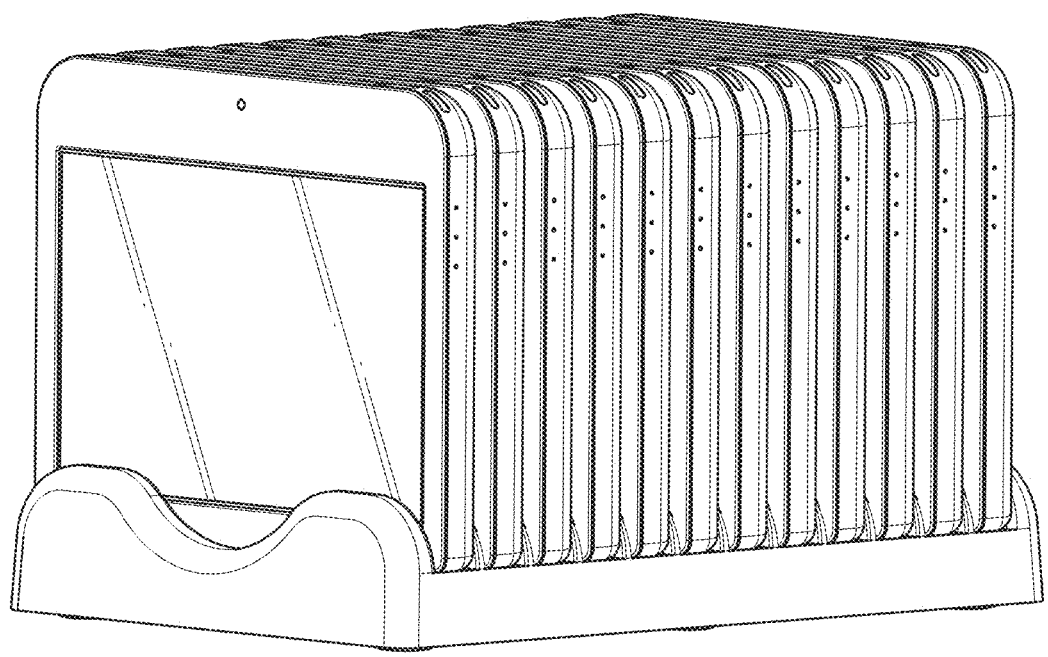
Figure 1F:
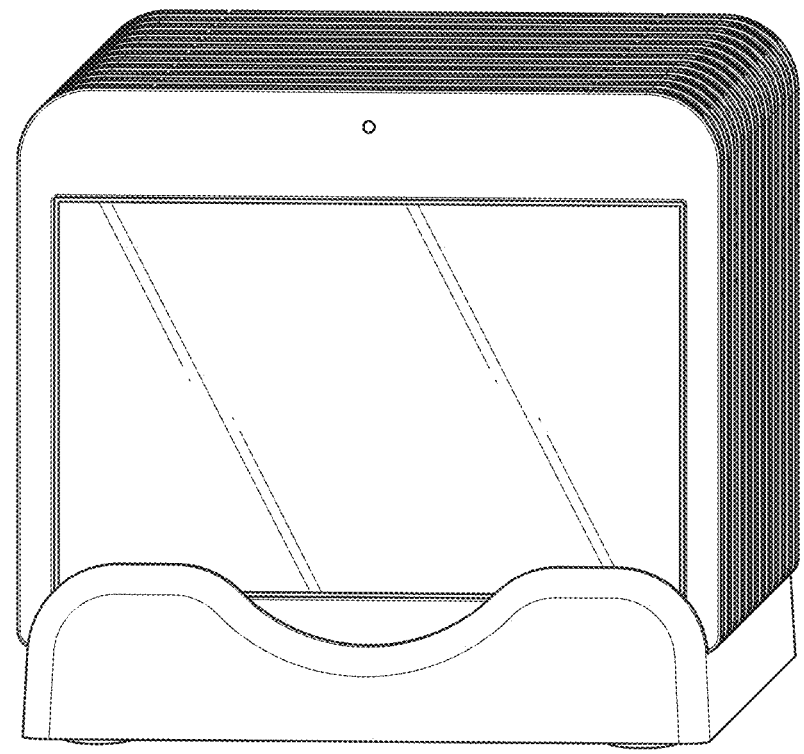
Figure 1G:
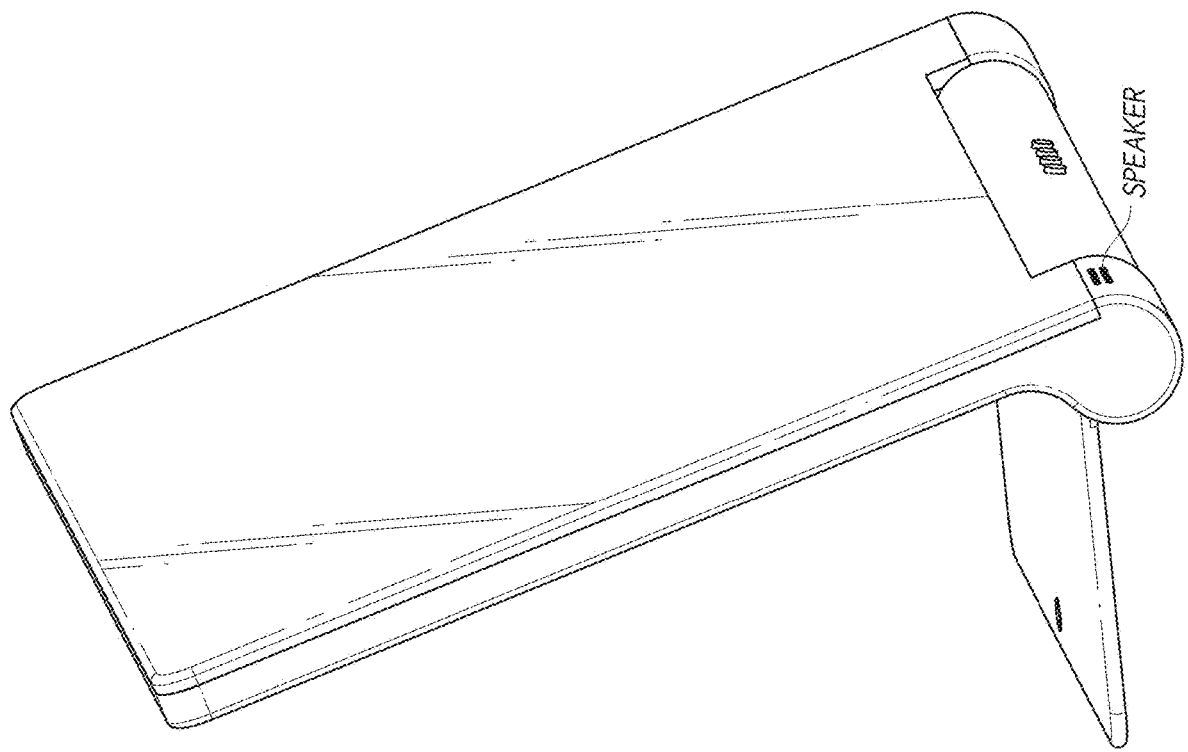
Figure 1L:
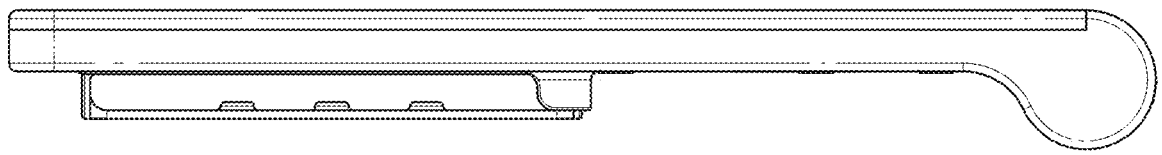
Figure 1M:
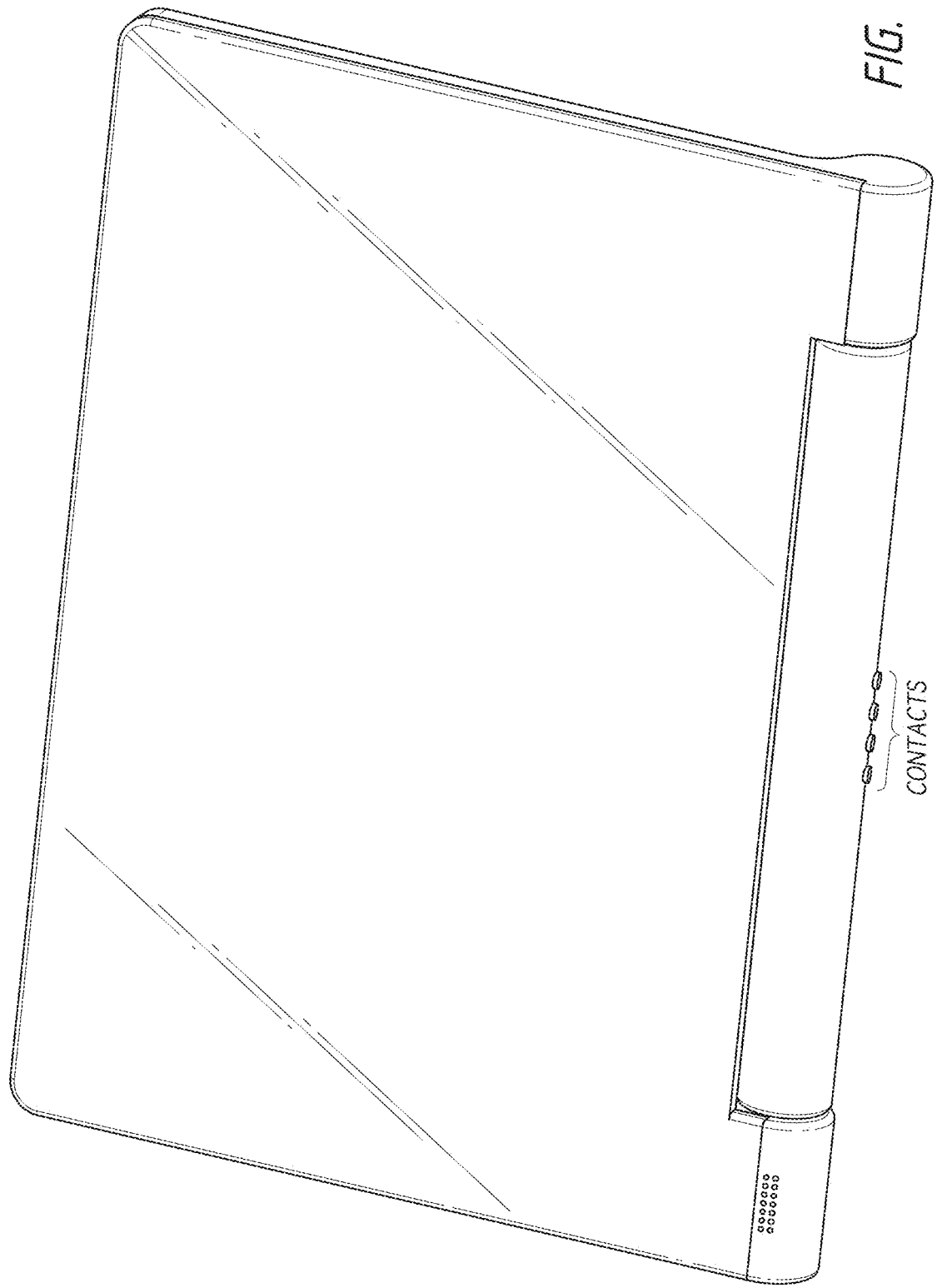
Figure 1P:
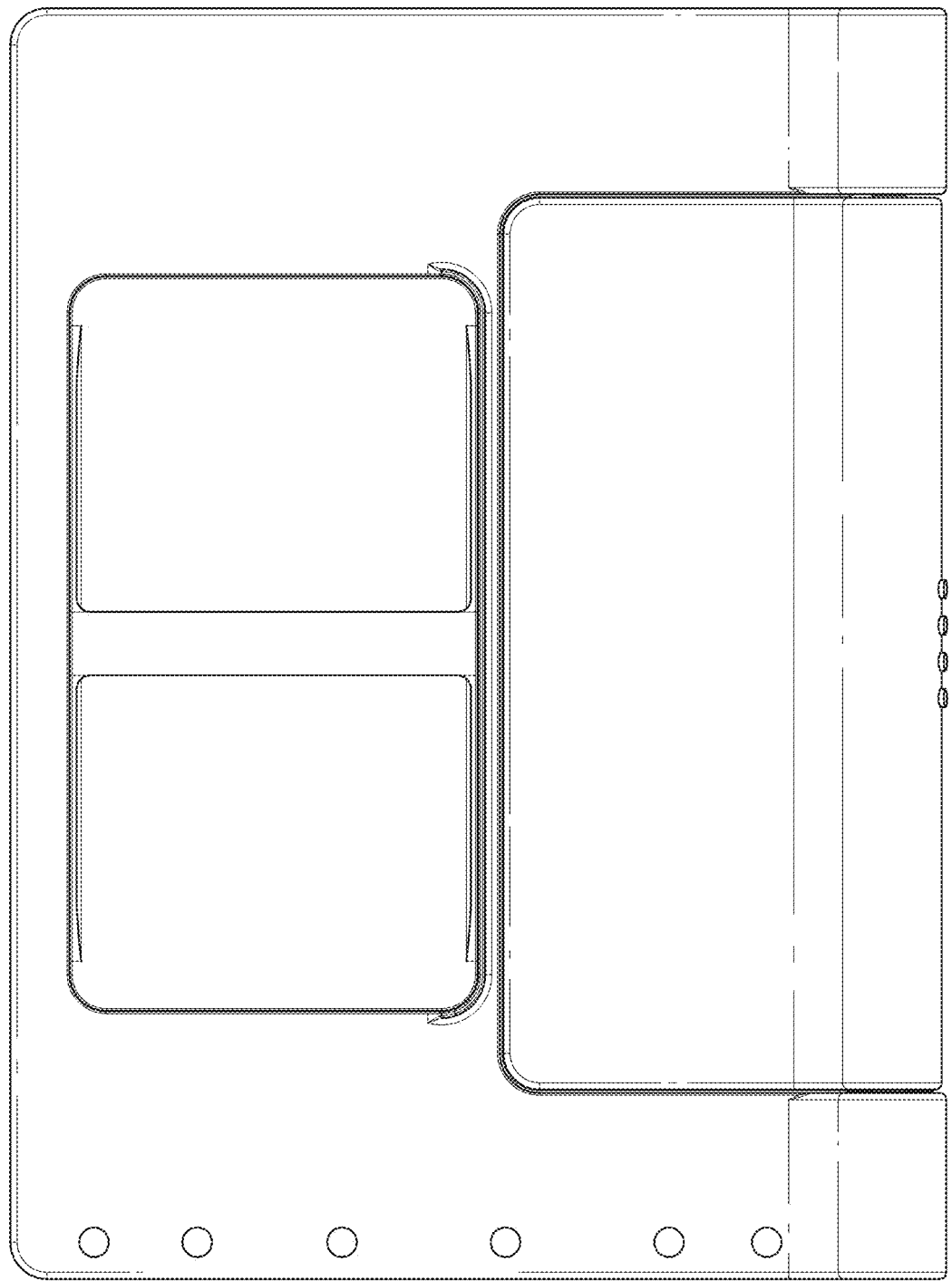
Figure 1R:
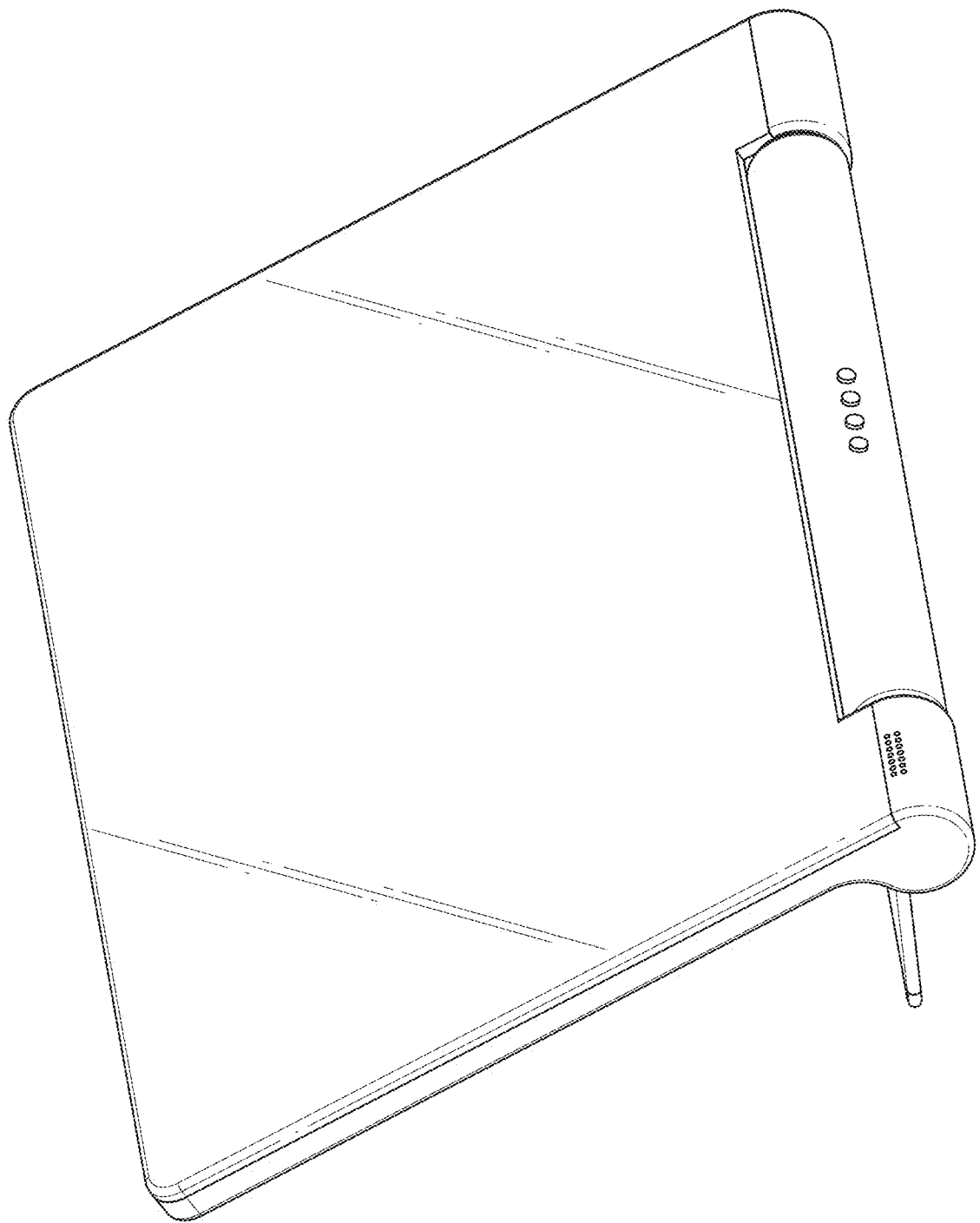
Figure 1S:
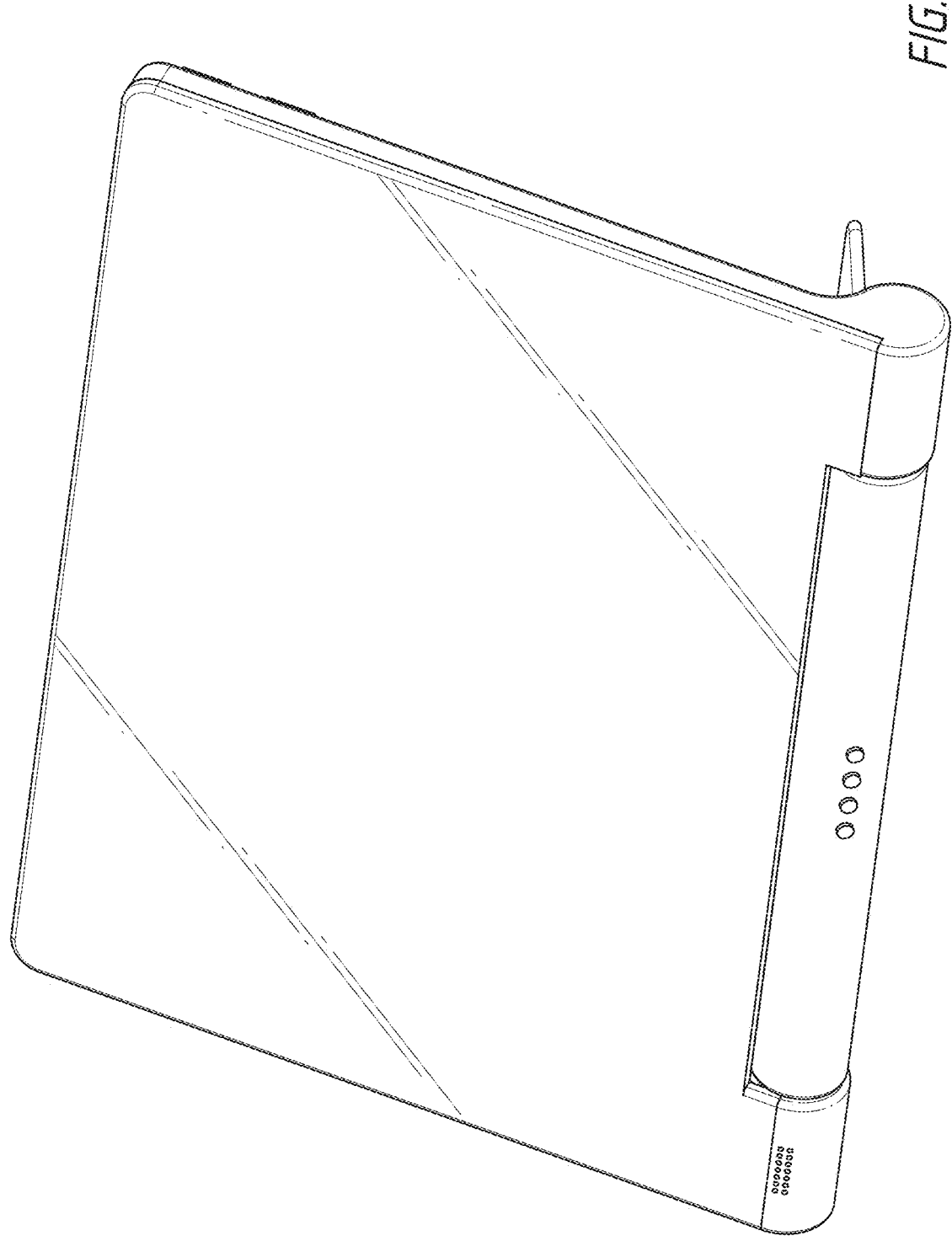
Figure 1T:
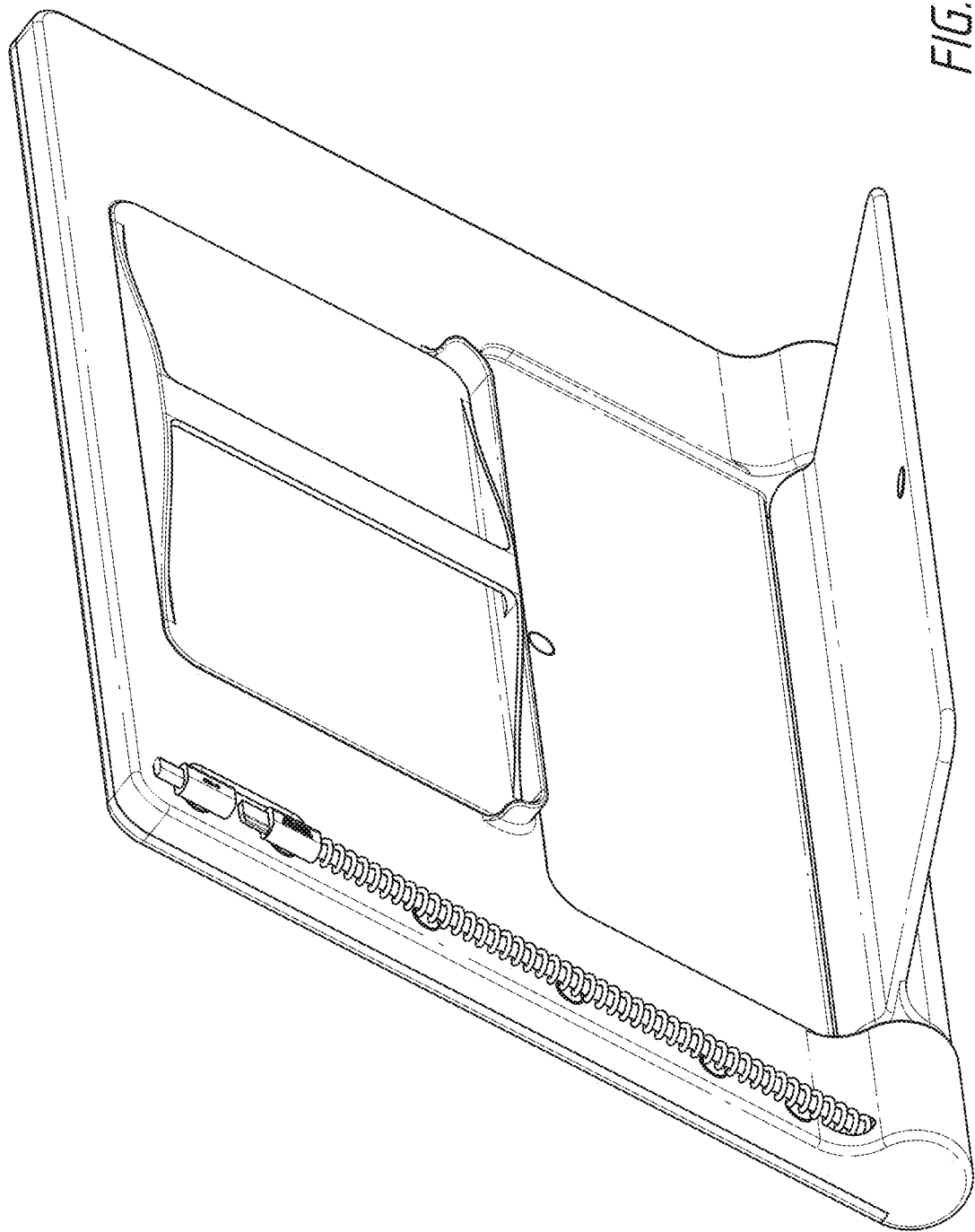
Figure 1V:
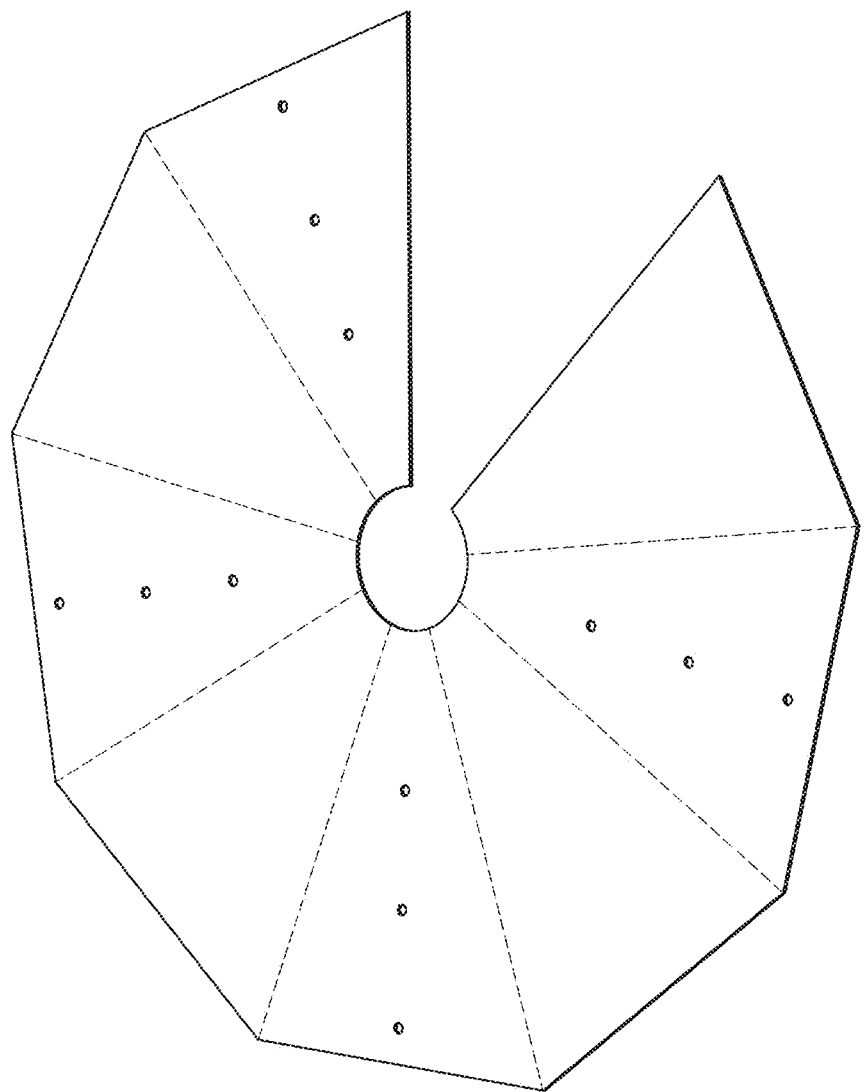
Figure 1W:
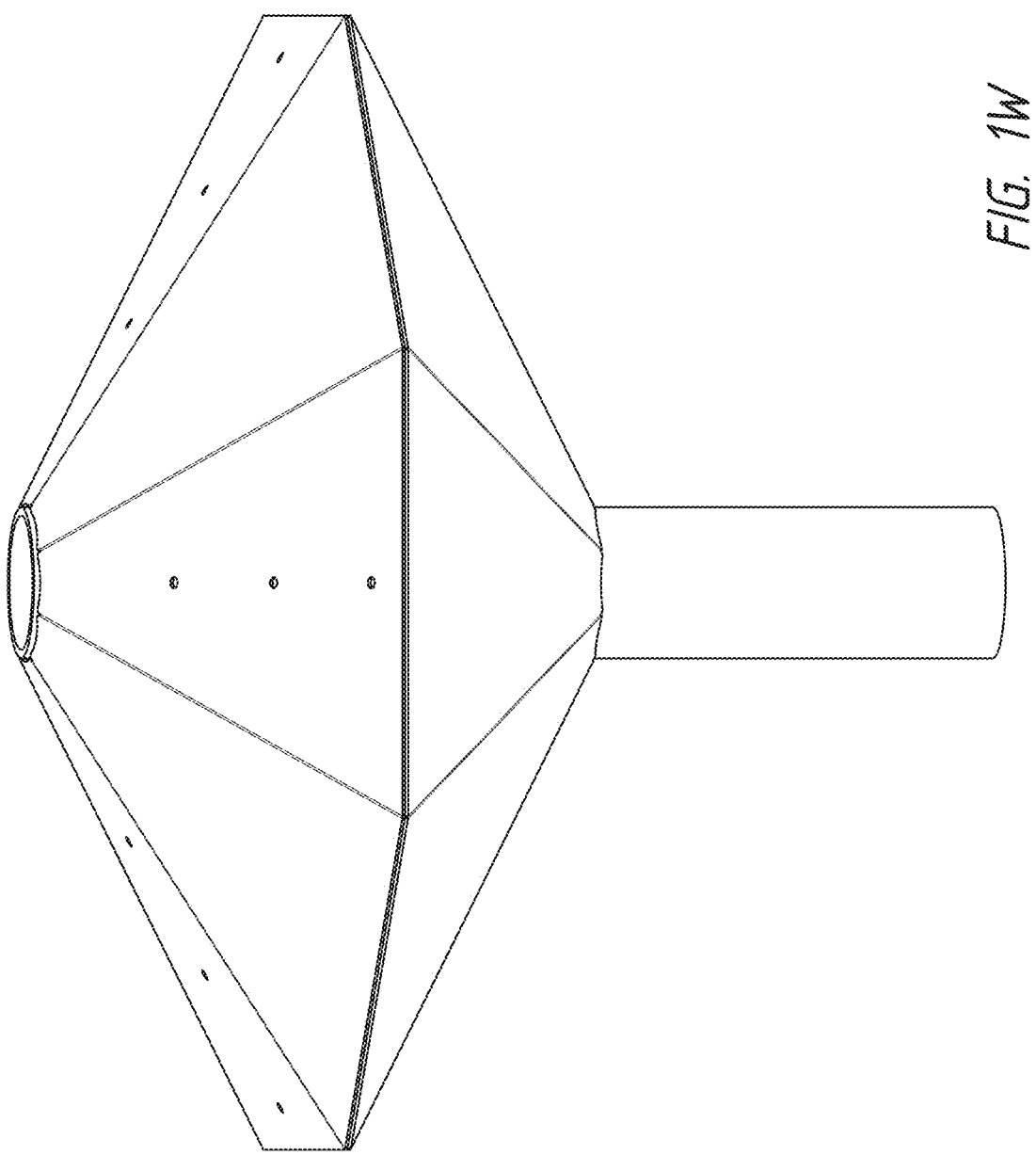
Figure 1X:
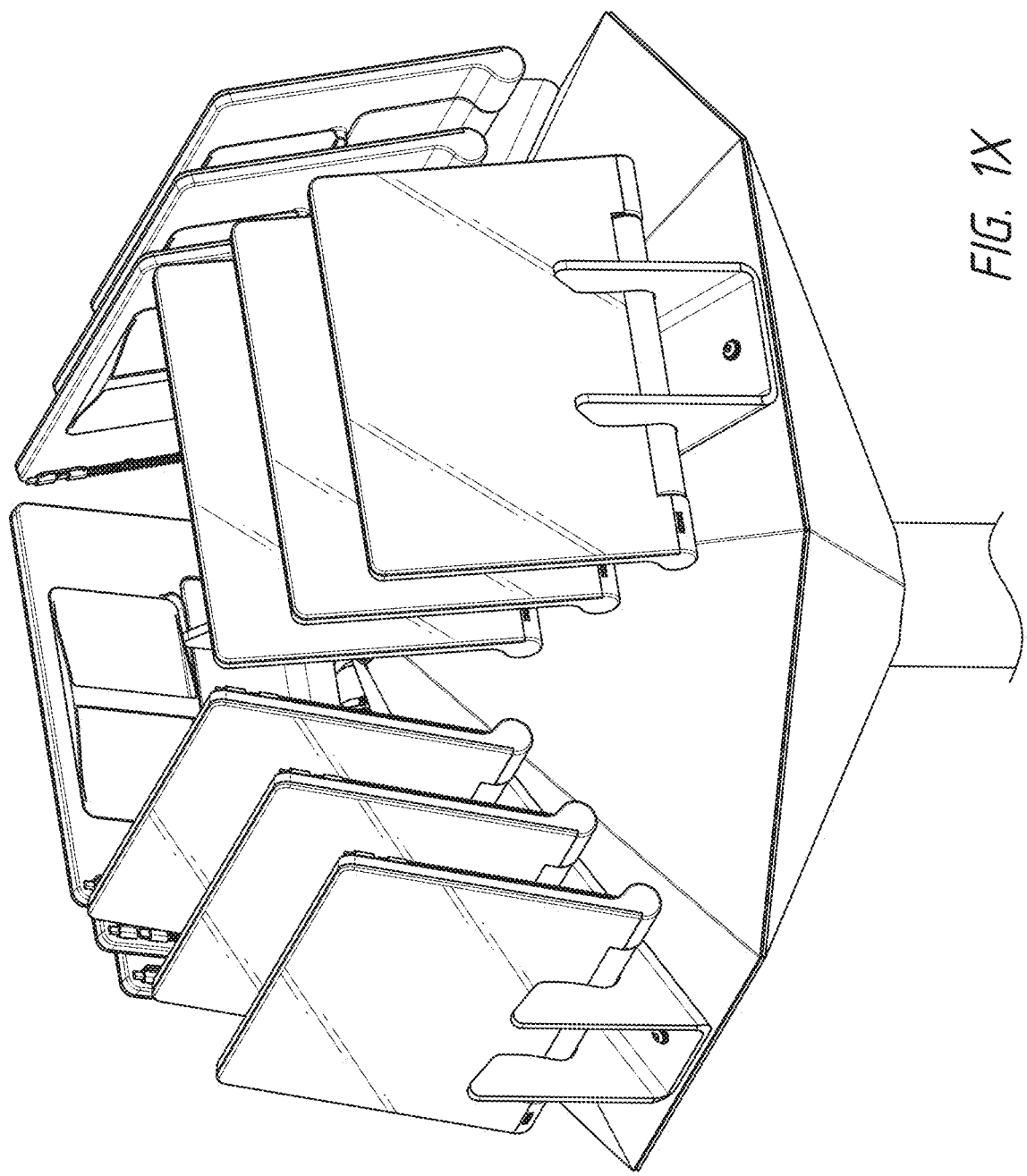
Figure 1Y:
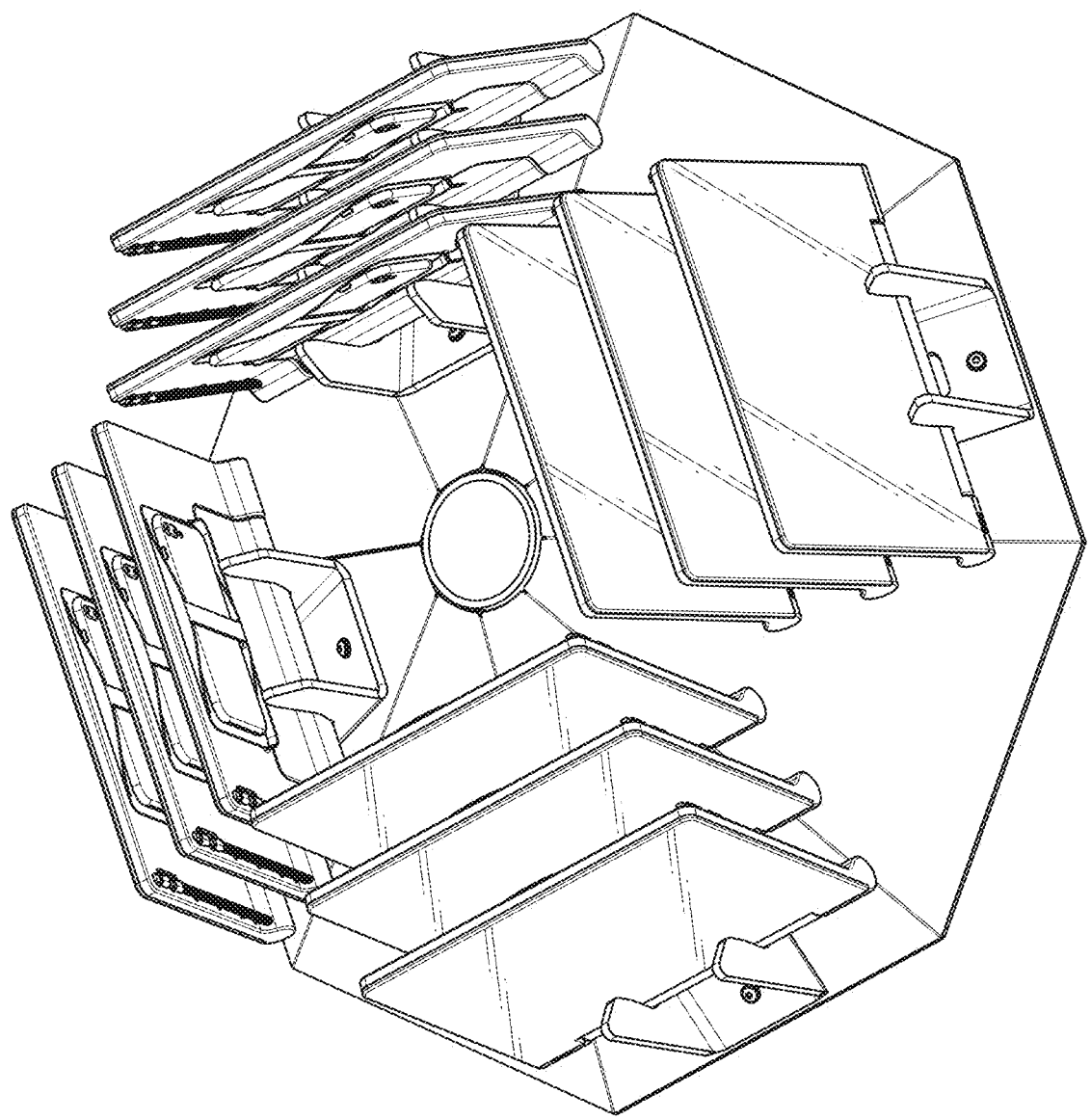
Figure 1Z:
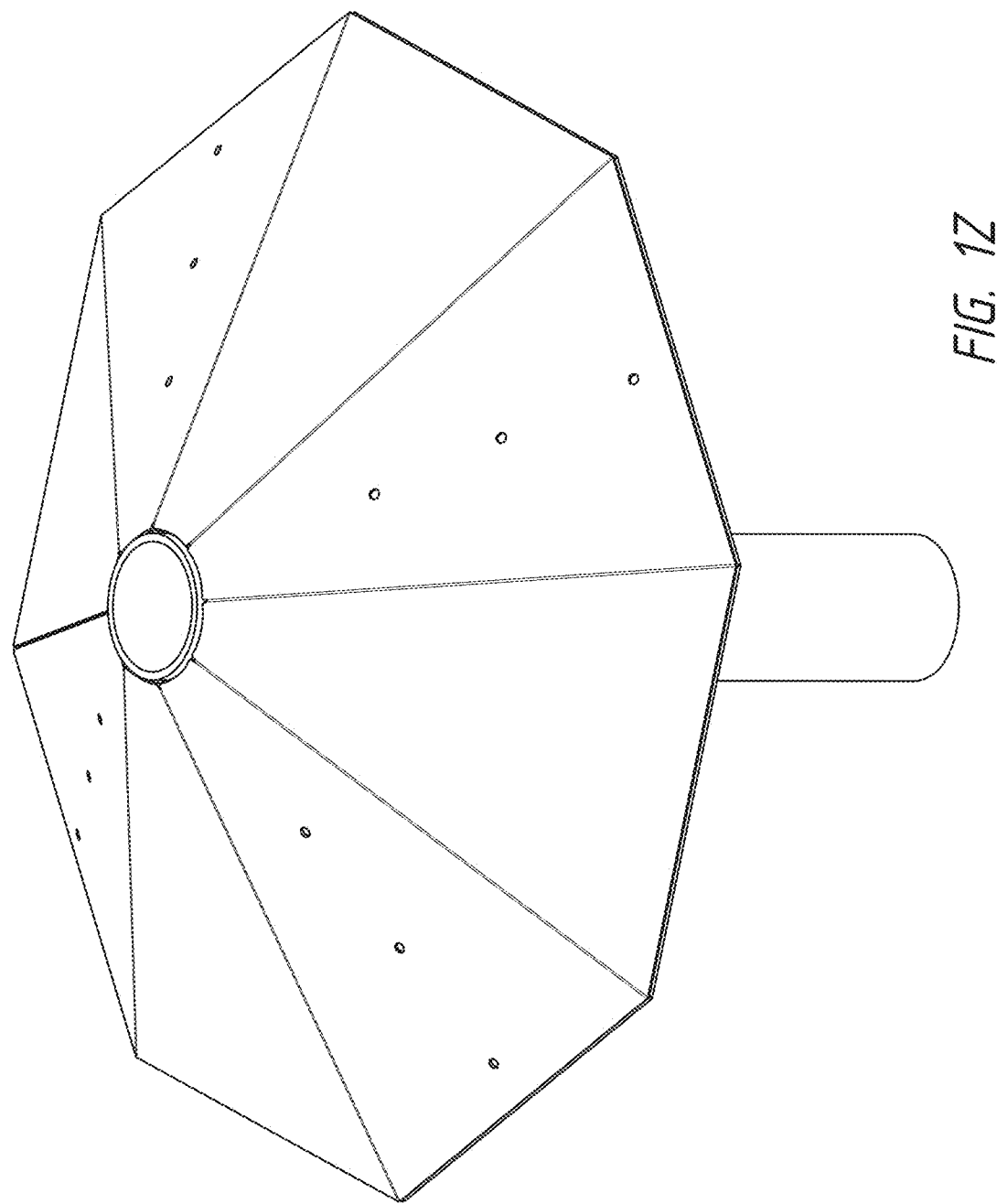
Figure 1A:
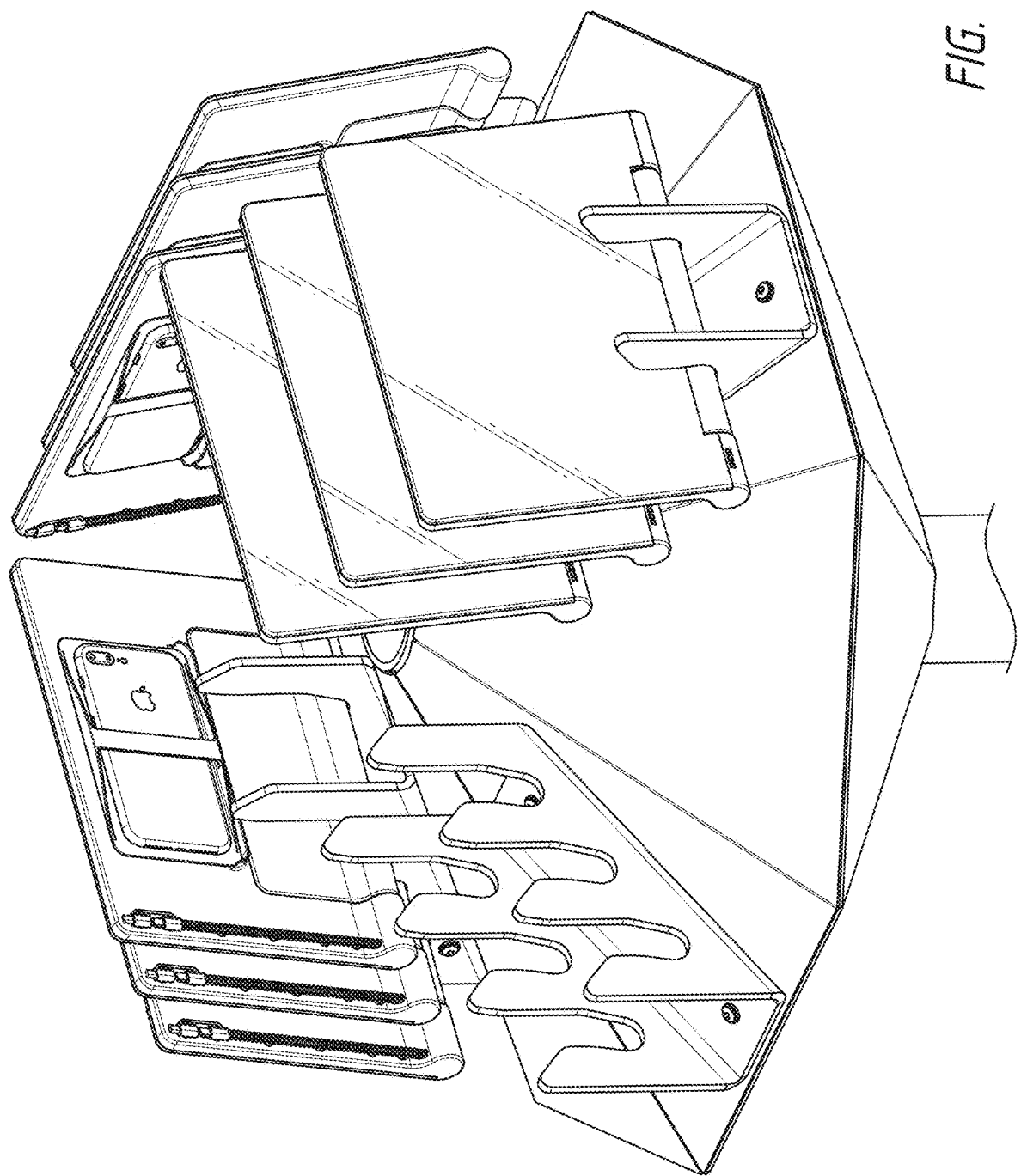
Figure 1B:
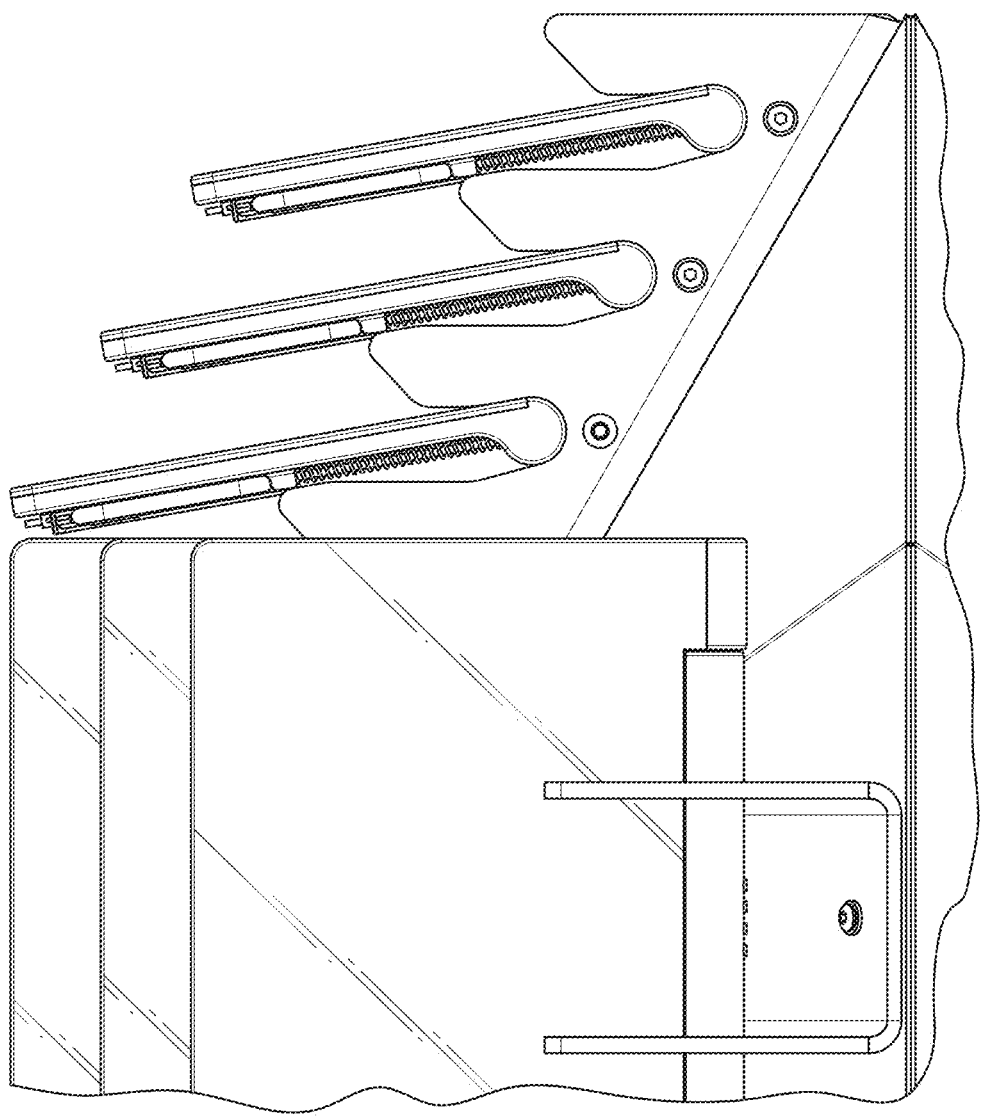
Figure 1C:
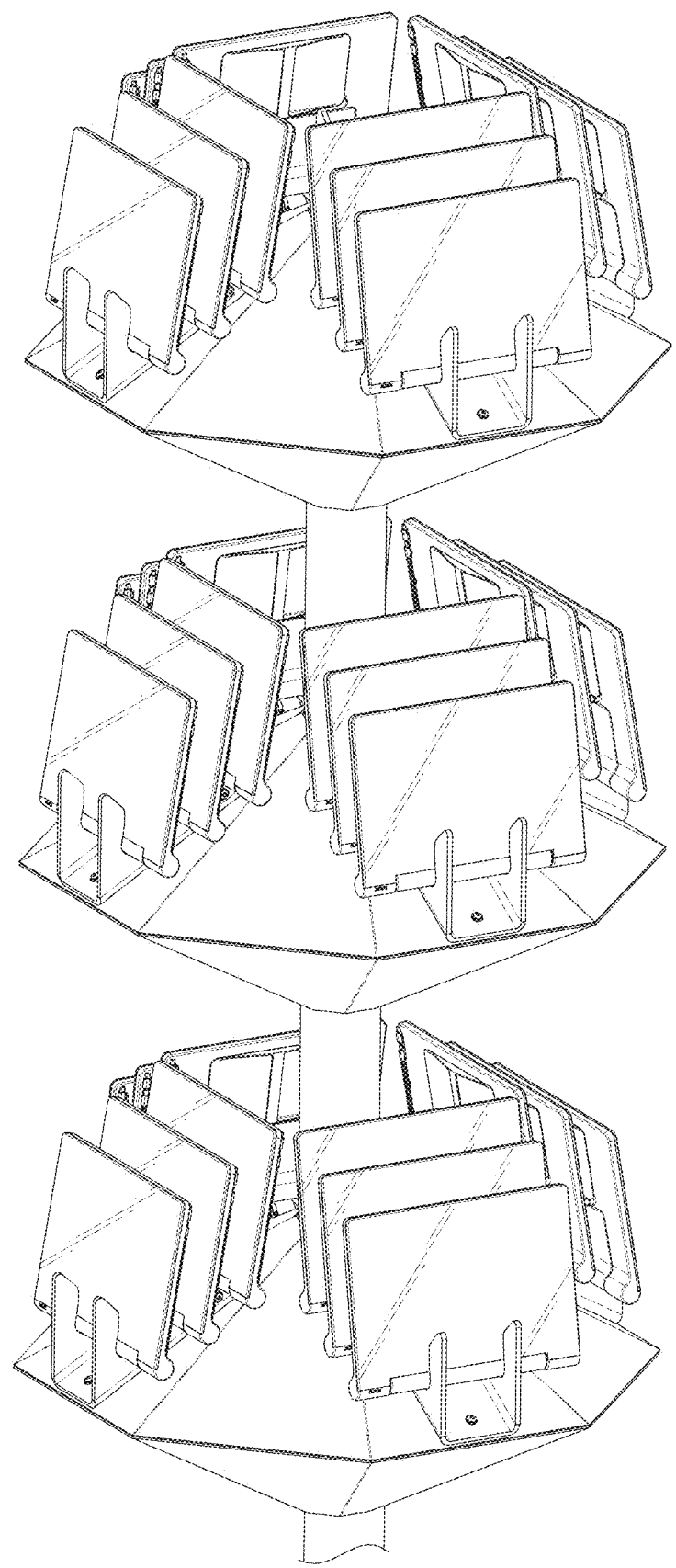
Figure 10D:
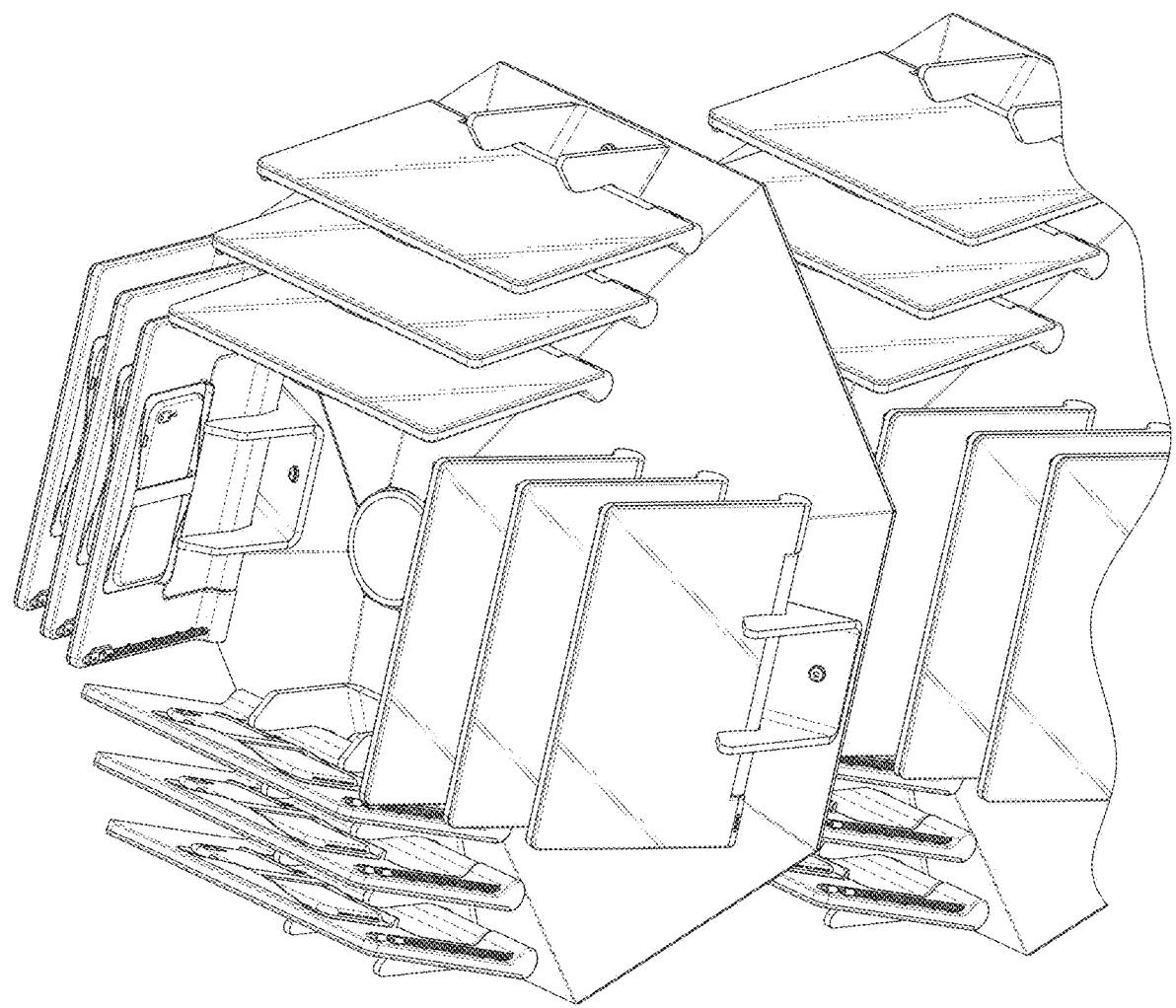
Figure 1E:
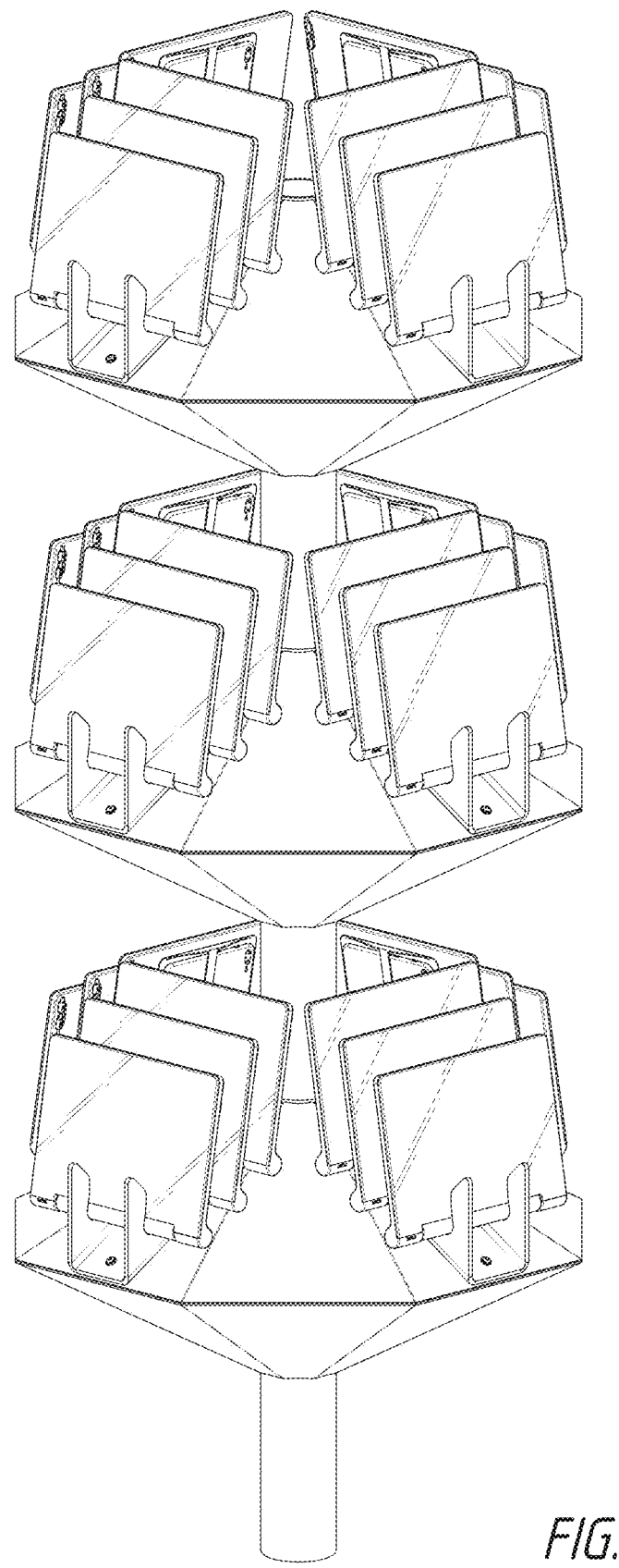
Figure 1F:
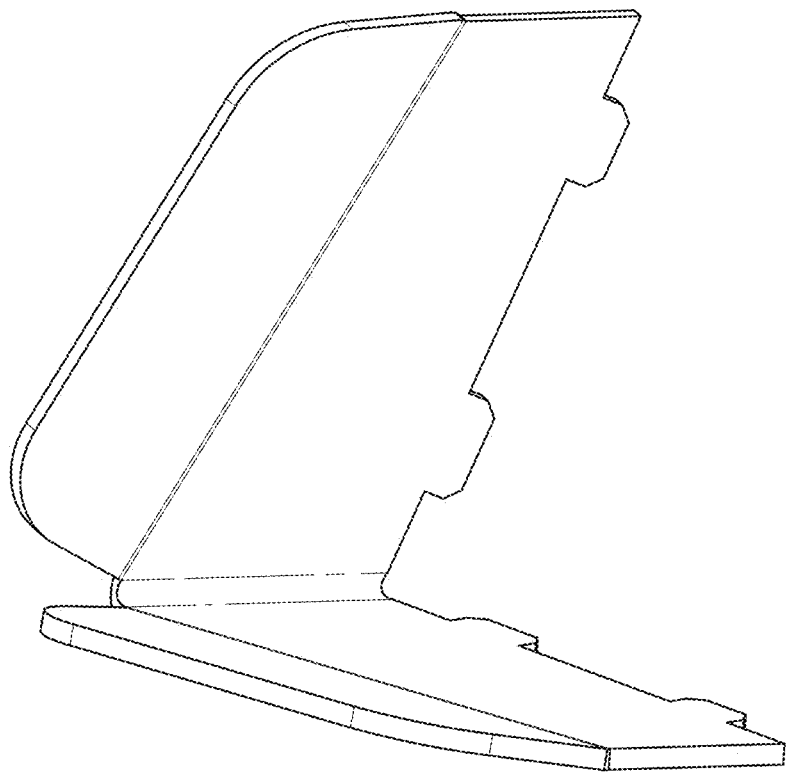
Figure 1G:
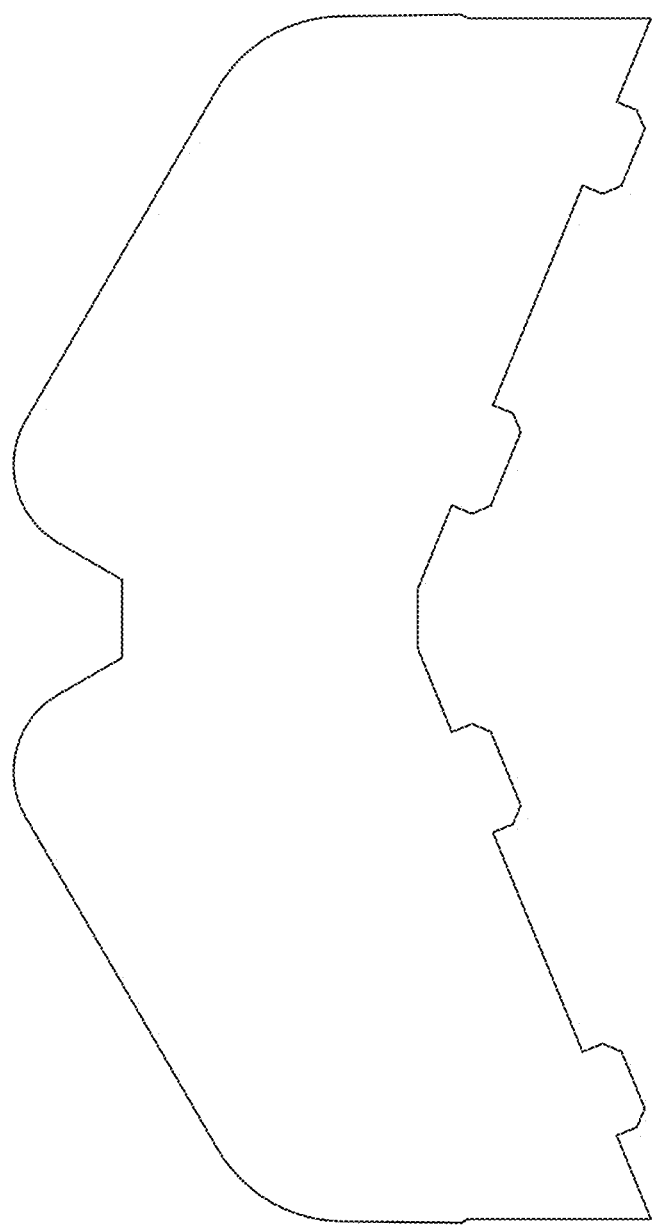
Figure 1H:
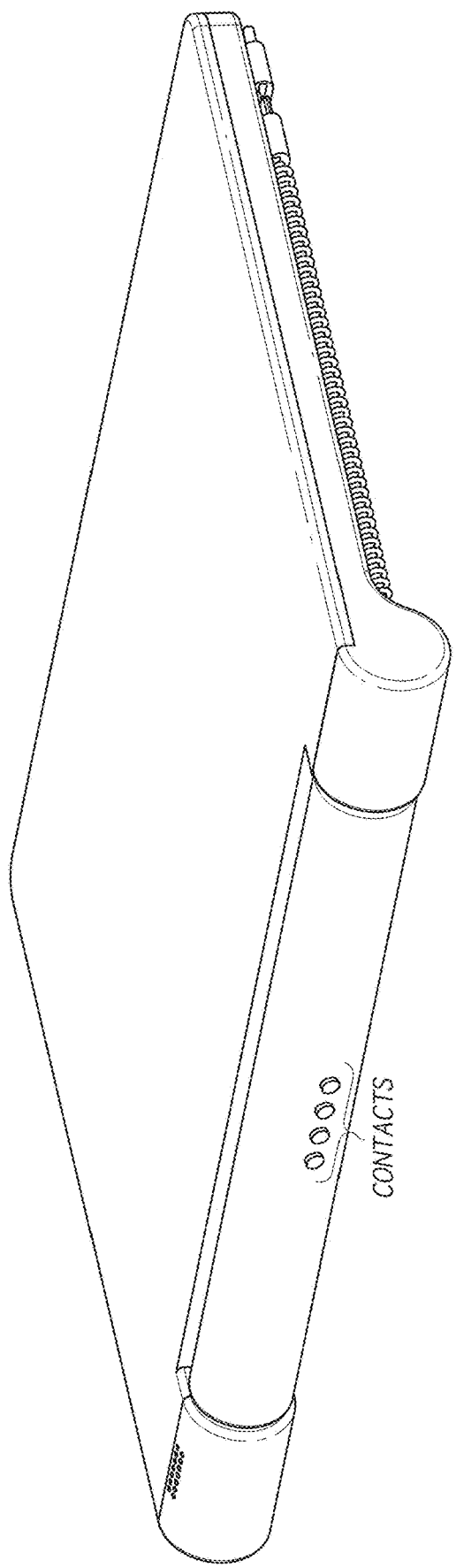
Figure 1J:
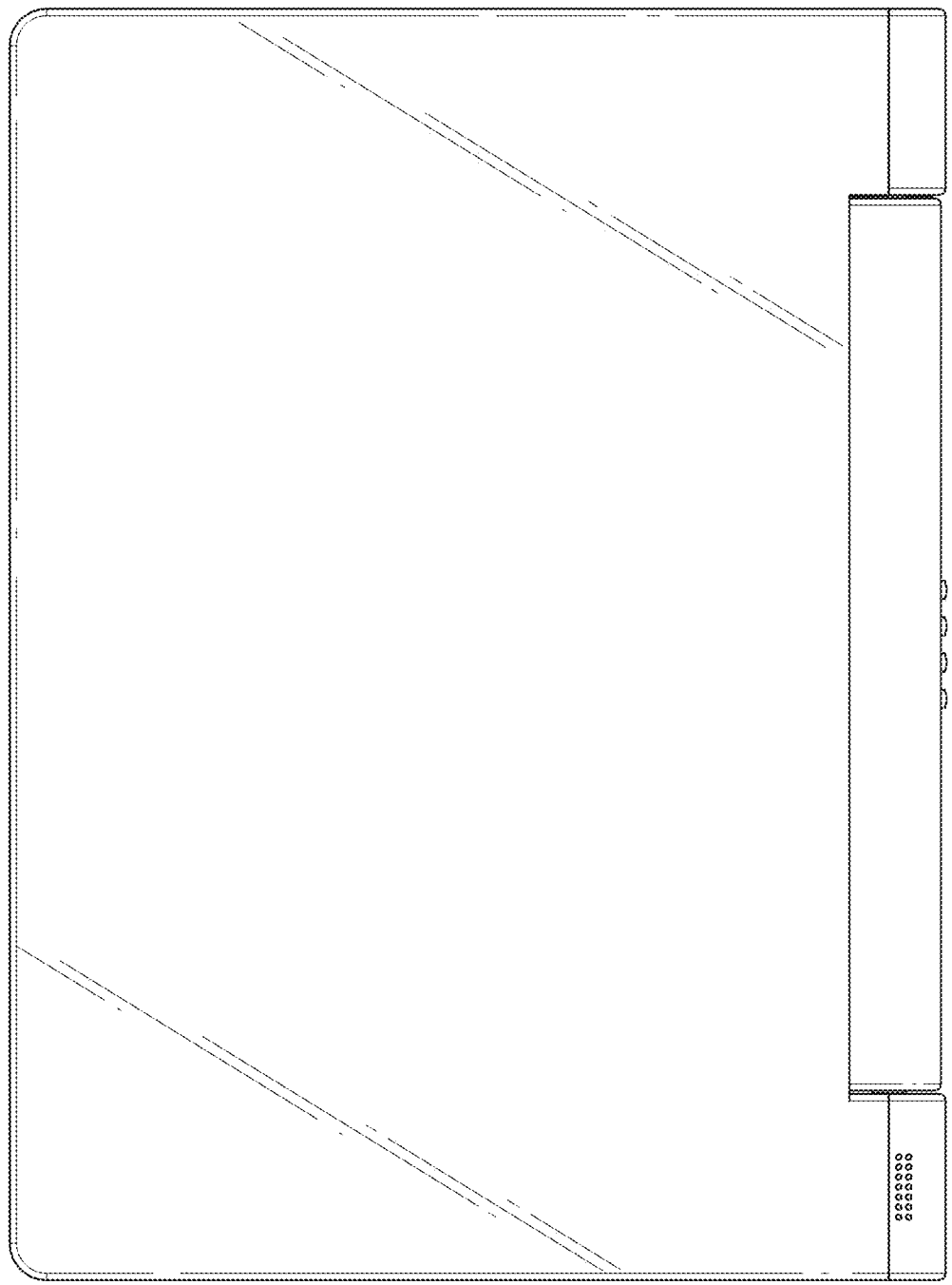
Figure 1K:
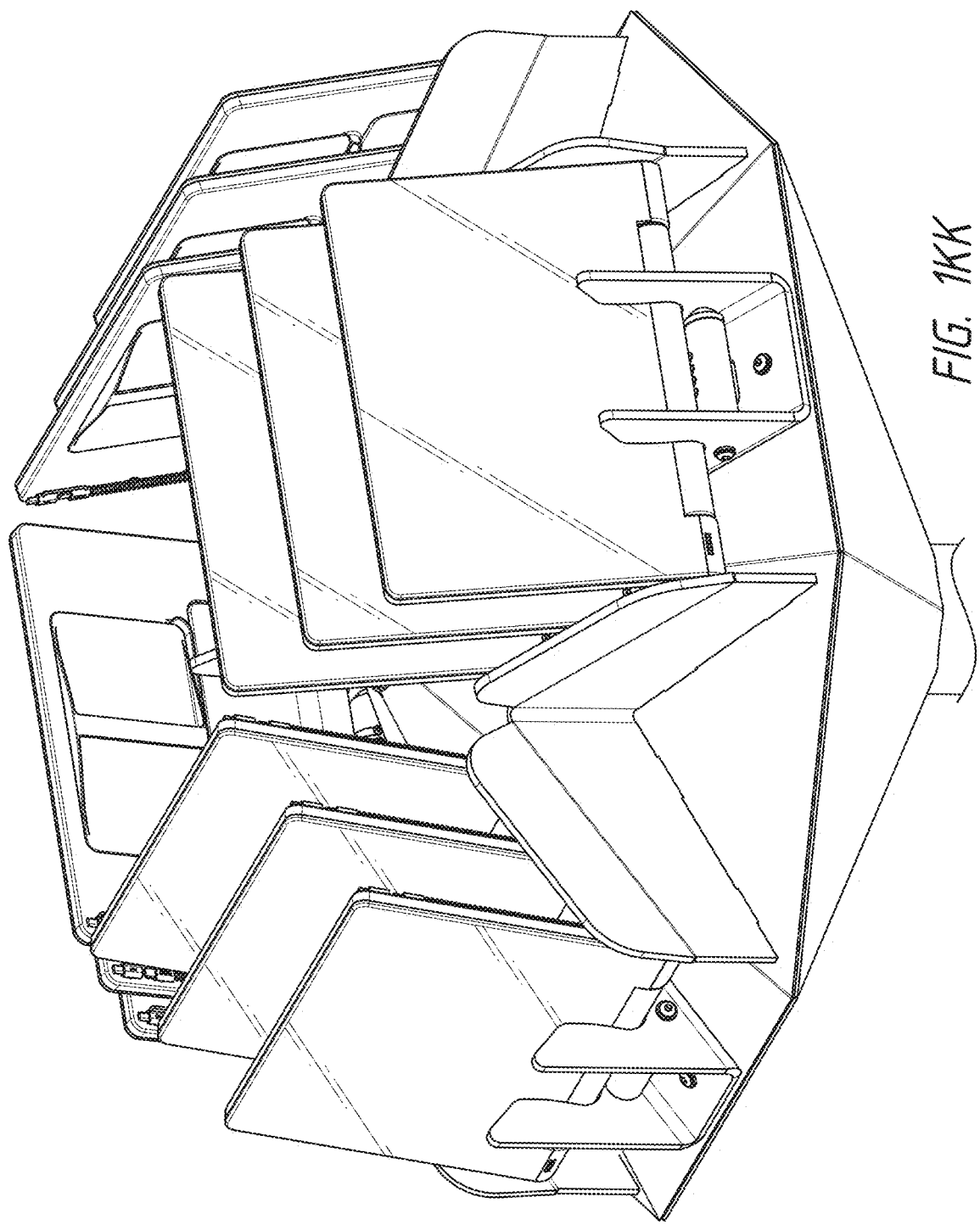
Figure 1L:
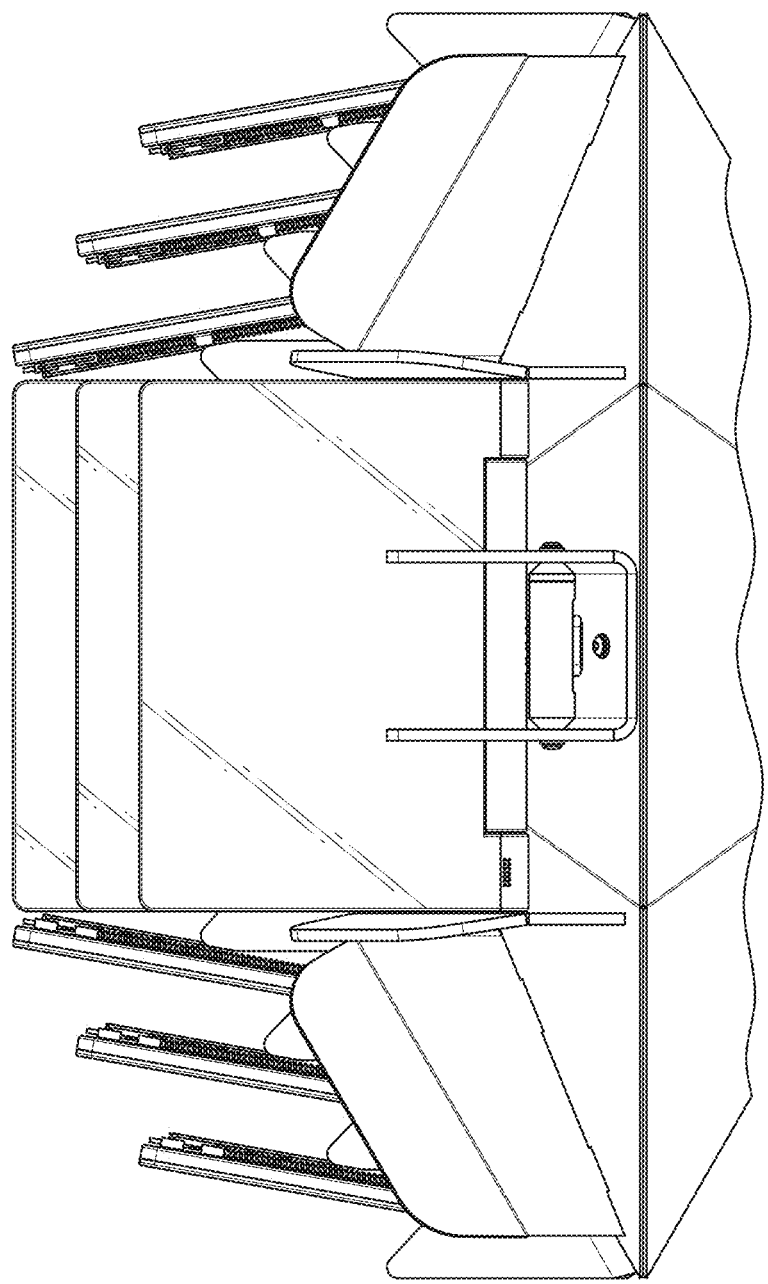
Figure 1M:
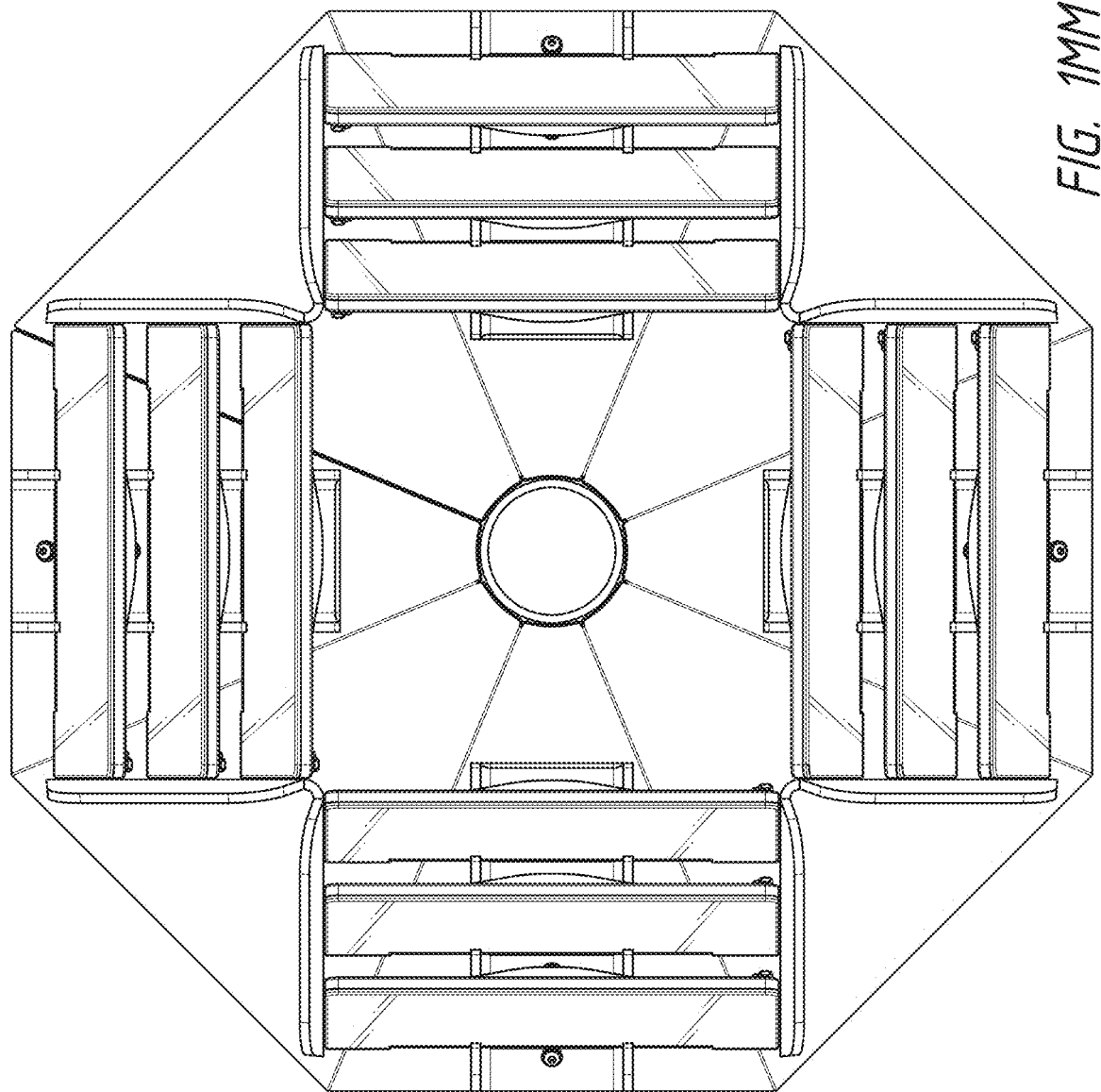
Figure 1N:
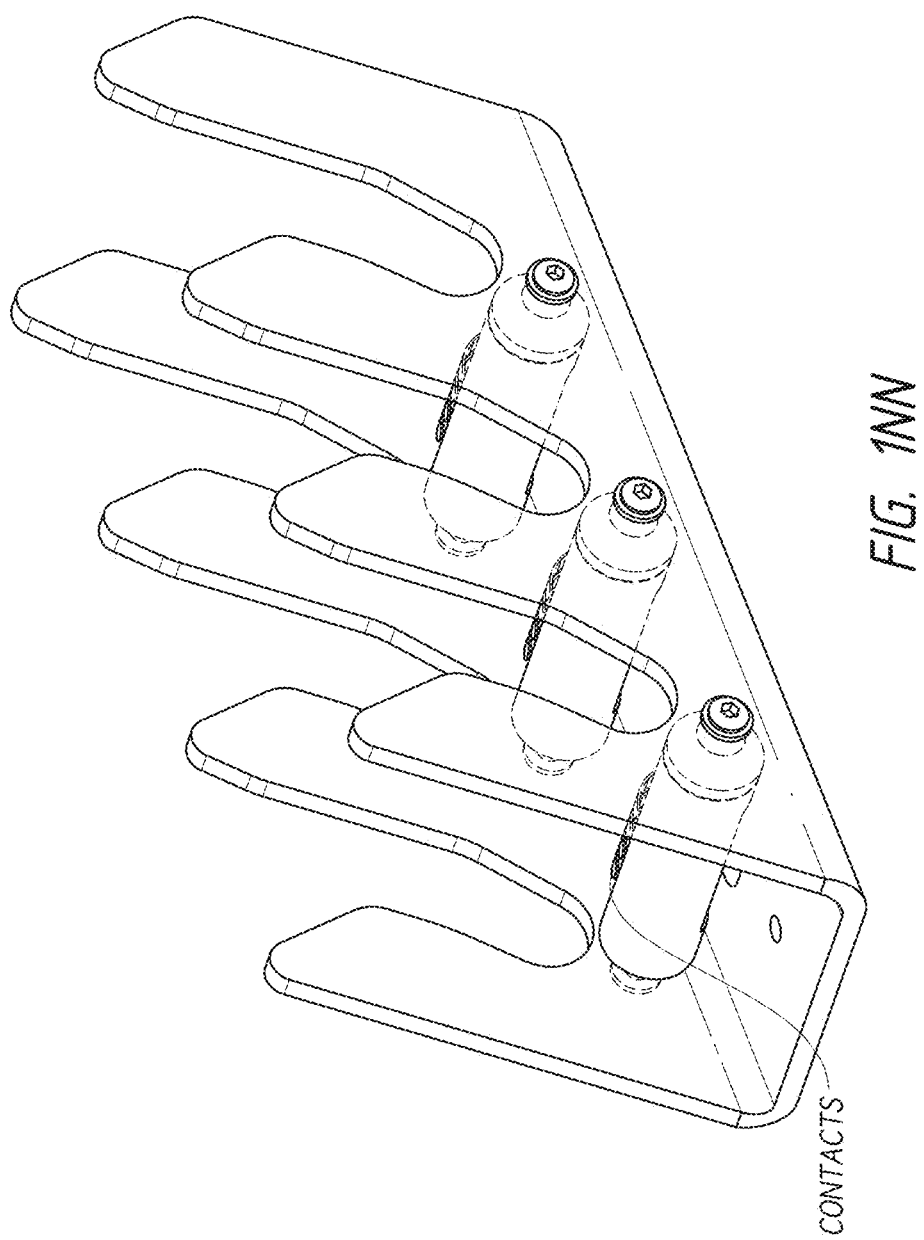
Figure 1Q:
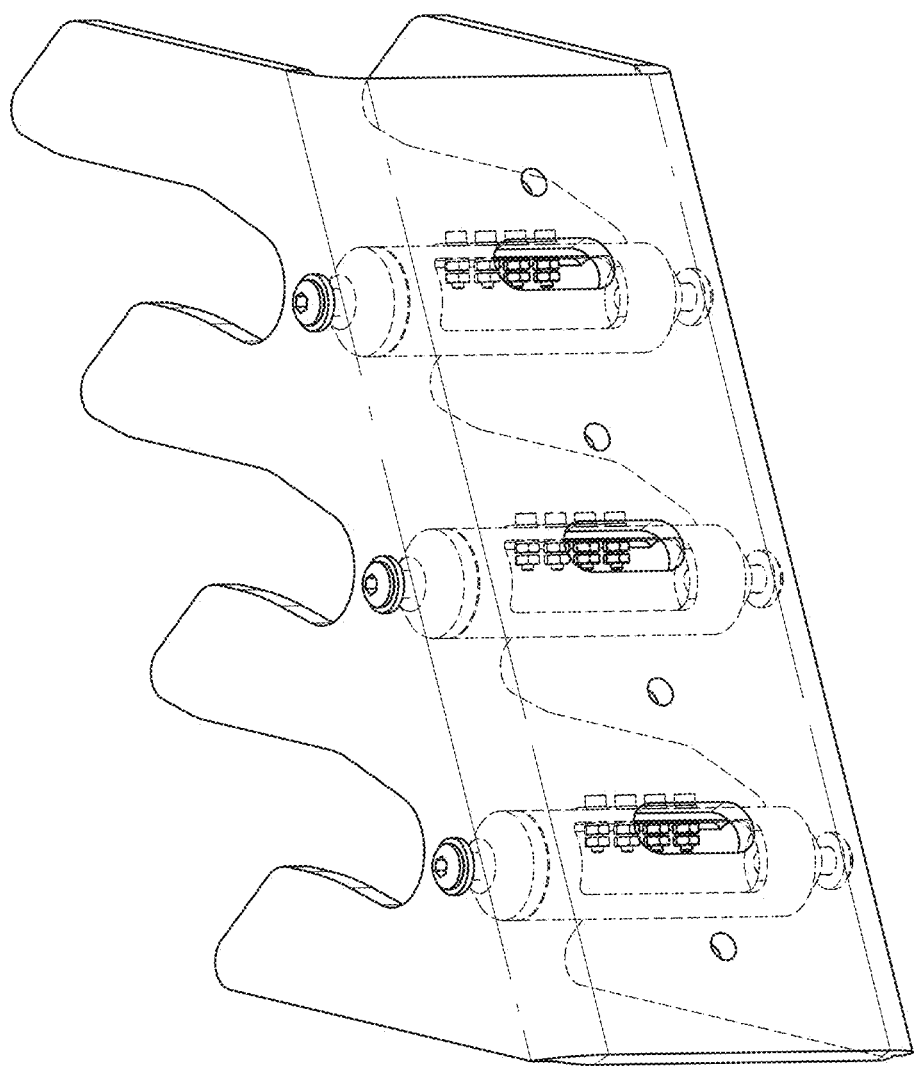
Figure 1R:
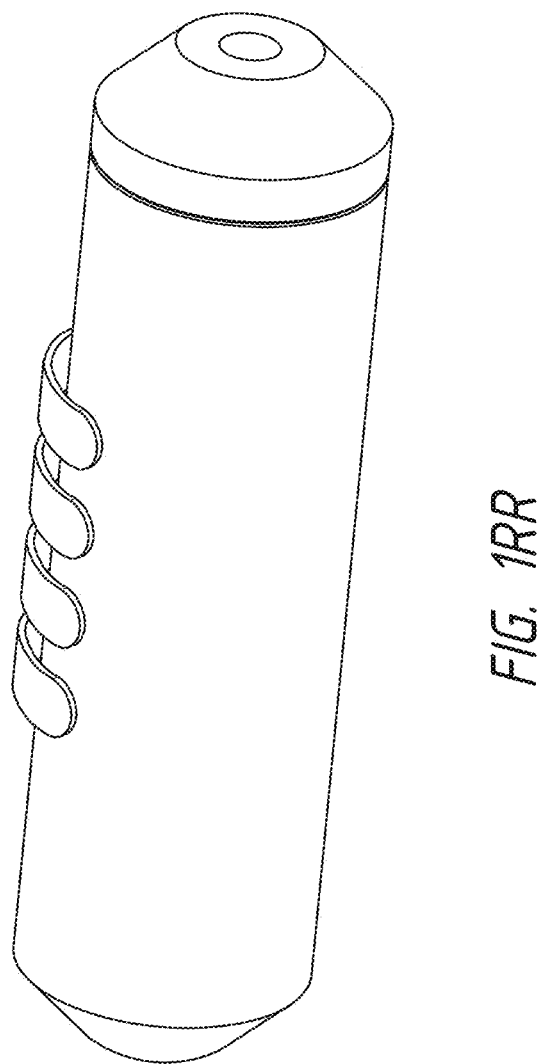
Figure 1S:
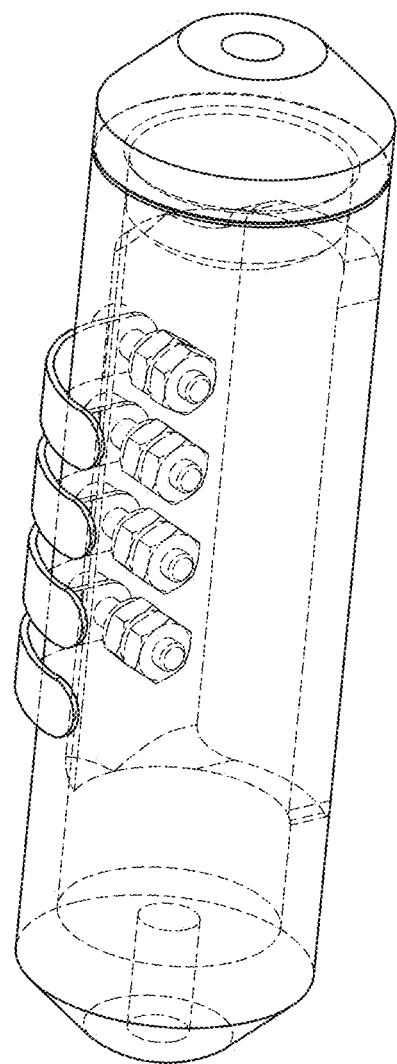
Figure 1T:
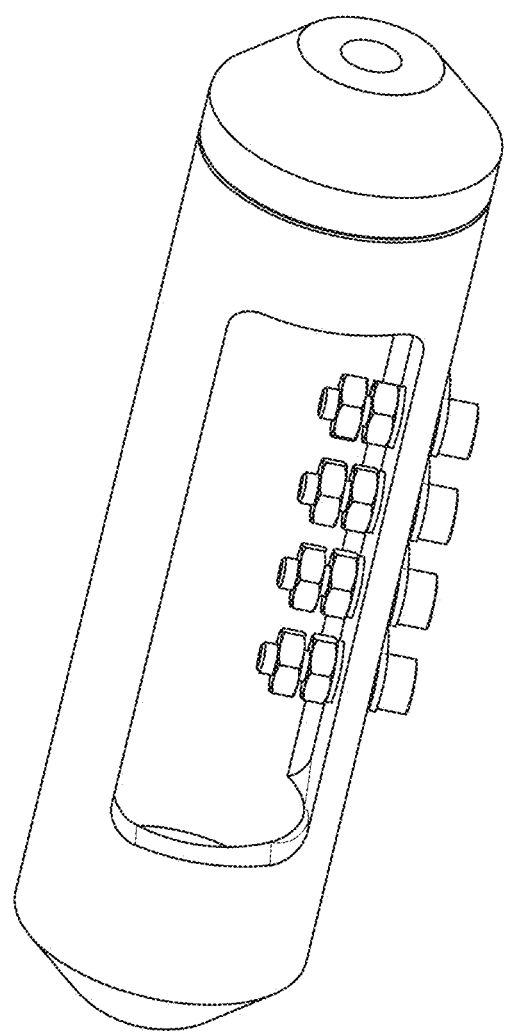

FIGS. 1G-1U and 1HH-1JJ illustrate example stations including a base member that is rotatable about a pivot to support the station display at a desired position. When not deployed the base member may be rotated by hand or via a motor into a recess on the back of the station or may simply lie flat against the back of the station. In these examples, the pivot comprises a cylindrical hinge positioned at the bottom of the display, although other shapes may be used. The cylindrical base provides a useful and intuitive way of indicating to a user the bottom and top of the station. The cylindrical base may include charging contacts on a fixed portion of the hinge (a fixed hinge knuckle). Optionally, the charging contacts are mounted to (on or within) the same hinge knuckle as a speaker. Orifices or a mesh may be provided in one or more hinge components via which the speaker may emit sound (see, e.g., FIG. 1G, 1M, where there are speaker orifices on one side of the hinge).

Optionally, the hinge may be ratcheted. The hinge ratchet mechanism may be used to hold the display at a given position/angle. The hinge pin may be in the form of a stainless steel shaft placed through a hollow receiving column (see, e.g., FIG. 1U, Section B). Each end of the pin may reside in a saddle receiving area. A removable access plate may be provided to enable the hinge pin to be inserted and/or to enable a ball spring plunger mechanism (if used) to be adjusted. The mechanism (e.g., ball spring plunger mechanism, stepper motor, etc.) used to retain the station display in a desired position may be configured to have sufficient torque hold capability to hold the display/tablet at any permitted angle at a given stand set-point.

In certain implementations, the base member supports the station display in portrait mode (see, e.g., FIGS. 1G, 1H, 1I, 1J, 1K, 1L, 1T, 1HH), and in certain implementations, the base member supports the station display in landscape mode (see, e.g., FIGS. 1M, 1N, 1O, 1P, 1Q, 1R, 1S, 1U, 1JJ).

As illustrated in certain of the foregoing figures, the cylindrical base may also include a speaker and associated speaker opening (e.g., a speaker grille). Optionally, only one speaker is provided to reduce weight and size. In addition, the cylindrical base may also include charging contacts/electrodes (e.g., 3 to 8 contacts), which may be in the form of cantilevered leaf springs (or otherwise self-sprung) or may be spring loaded to enable the station to be charged without the use of a plug-in connector. For example, when the charging contacts are placed in contact with charging contacts of a charging station, current may be conducted via the charging contacts to charge the station batteries. The electrodes may be nickel or gold plated brass electrodes to provide enhanced conductivity. FIGS. 1M, 1N, 1O, 1P, 1HH, 1II, 1JJ, illustrate examples with 4 contacts on the cylindrical base/hinge.

Optionally, the stand may be motorized using a stepper or other motor so as to position the housing (and hence the camera) at a given desired angle (e.g., using a piston arrangement, such as a pneumatic strut). For example, the stand base member may be rotated outward/downward to support the station (e.g., in a landscape position or a portrait position) when the station is positioned on a supporting platform (e.g., a table). The motor may rotate the station (e.g., the tablet) relative to the supporting platform and base member so that the camera 206 is at a height and angle so that the detected user's face or eyes are within a desired position in the field of view. A motor angle command may be transmitted to the motor wirelessly (e.g., Bluetooth) or via a wired connection by the station via an API. User accessible rotation controls may be displayed via the station touch screen and/or may be provided as physical buttons to enable the user to control the station display angle. The motor may be configured with a voltage operating range (e.g., 2V-7V) compatible with available battery power. Optionally, where a hinged base member is used that rotates to a supporting position, the hinge may be positioned on a bottom side of the user device (e.g., in a cylindrically-shaped hinge housing). Optionally, the batter(ies) may be positioned off-center within the housing, towards the base of user device (where the hinge is at the base) to provide a low center of gravity and greater stability (e.g., so the tablet/display will not topple when position at an angle of 0-85 or 0-90 degrees relative to the base member).

The stand (including the motor) may optionally be configured as a separate unit from the station (tablet/display), with a receiving area configured to removably receive the station. For example, the receiving area may include clips to hold the station, a slot in which the station is position, and/or the like. Optionally, the stand (including the motor) may be integral to the station, and is not configured to be removed by a user without tools.

The station motor may be scheduled to automatically raise the tablet from a horizontal or other lowered position to a more upright position on certain days and/or at certain times of day (e.g., at about an opening time of a venue to customers where the station is located). Optionally, the station motor may be scheduled to automatically lower the tablet from a relatively upright position to a relatively more horizontal position (e.g., after closing time of a venue to customers where the station is located). Optionally, a remote system may transmit a command to the tablet for the station motor to raise the tablet from a horizontal or other lowered position to a more upright position, and/or to lower the tablet from a relatively upright position to a relatively more horizontal position. Optionally, the station motor may raise the tablet from a horizontal or other lowered position to a more upright position in response to detecting a user's presence via the station camera or otherwise as similarly described herein. Optionally, in response to not detecting a user's presence for a specified time period (e.g., 5 minutes, 10 minutes, 30 minutes, or other time period), the station may command the station motor to automatically lower the tablet from a relatively upright position to a relatively more horizontal position (e.g., to thereby indicate the stations availability to users).

The sides of the station housing may optionally be curved to make the station more comfortable to hold in a user hand (see, e.g., FIG. 1B(c)). A bezel may be positioned on a side of the display, and a camera may be positioned on the bezel (see, e.g., FIG. 1B(d)). The back of the station may optionally be curved/arched to raise the station display further off the station's resting area (e.g., a table) and to provide a gap between the resting area platform (e.g., table top) via which a user can insert fingers to pick-up the station (see, e.g., FIG. 1B(e)). FIG. 1C illustrates a station with a power input connector (e.g., a USB-C, a micro-USB, or other connector).

FIG. 1D(a) illustrates a front side of the tablet, include speaker ports. FIG. 1D(b) illustrates a left side of the station. FIG. 1D(c) illustrates a top side of the tablet. FIG. 1D(d) illustrates a bottom side of the station, including rubberized strips or feet (e.g., circular or rectangular rubber, polymer, or silicone feet positioned at each corner) to provide friction when placed on a surface. The feet, by raising the body of the tablet off the resting surface, provides enhanced ventilation of the bottom of the station, and provides added grip and friction, thereby better ensuring that the station does not slide off or be accidently pushed off the platform. Optionally, the bottom face of the station may be rubberized in whole or in part (e.g., a rubberized strip at the top and the bottom) to provide added grip and friction.

With reference to FIGS. 1E and 1F(a), (b), a power bank station may be provided that may be used to power/charge one or more tablet-charging stations at a time. For example, the power bank station may include multiple slots (e.g., 4, 6, 12 or other number of slots) configured to receive respective tablet-charging stations for charging. A given slot may include a connector (e.g., a LIGHTNING, micro-USB, USB-C, or other connector) that mates with a tablet-charging station connector when inserted into the slot. FIGS. 1E(a) and 1E(b) illustrate front and rear top perspective views of the power bank station when unpopulated. FIGS. 1F(a) and 1F(b) illustrate front perspective and front views of the power bank station when populated with tablet-charging stations.

Optionally, in addition or instead of using physical connectors, wireless charger circuits (e.g., Qi or PMA compatible wireless charger circuits including primary coils) may be used to charge the tablet-charging station is they are configured for wireless charging. Optionally, the power bank station may include a processor and network interface (e.g., a wired or wireless network interface) and may be used to receive and store content and/or programs/applications or updates thereof from a remote source (e.g., a remote management system). The power bank station may then install the content and/or programs/applications to a given tablet-charging station when the tablet-charging station is connected to the power bank station for charging.

FIGS. 1V-1GG, 1KK-1TT illustrate still additional charging stations and components thereof. The charging station may include one or more vertical tiers (see, e.g., FIGS. 1X, 1CC) where each tier includes one or more receiving areas configured to receive and charge respective tablet-charging stations. The tiers may be supported by a central support structure that passes through the middle of each tier. The tiers may be supported by one or more support structures connected to a side of each tier.

A given tier may have a bowl-shaped bottom portion with a planar top panel (see, e.g., FIG. 1X). The bottom portion and/or top plate may comprise polygon shapes (e.g., triangles) that meet at respective shape edges to provide a futuristic appearance. The bottom portion may be made of metal (e.g., aluminum, steel, etc.) or plastic. The top panel may include rows of receiving slots mounted thereon, where the rows may be positioned as spokes to provide 360 degree access to the receiving slots. A slot may be angled to better receive the tablet-charging station and to enable a support person to view the tablet-charging station display. A receiving slot may be made of a transparent (e.g., a solid transparent plastic optionally made of polymethyl methacrylate) (see, e.g., FIGS. 1KK, 1LL, 1NN, 1OO, 1PP, 1QQ) or a non-transparent material. A receiving slot may be configured to hold a tablet-charging station in portrait more or in landscape mode.

Optionally, a given tier may have an inverted bowl-shaped portion (see., e.g., FIGS. 1AA, 1CC, 1DD, 1EE), which may comprise polygon shapes (e.g., triangles) that meet at respective shape edges, Rather than having the slots positioned on a flat panel, the slots may be positioned on the exterior slopping wall(s) of the inverted bowl-shaped portion in a staggered manner.

Each receiving slot may include a charging interface to provide charge current to the tablet-charging station. The charging interface may be in the form of metal contacts/electrodes. The electrodes may be held in place using an M2.5 capscrew/washer/nut. The contacts/electrodes may be spring loaded rods or may be in the form of cantilevered leaf springs (or otherwise self-sprung springs) configured to come into contact with corresponding contacts of the tablet-charging station when the tablet-charging station is inserted into the slot (see, e.g., FIGS. 1KK, 1LL, 1OO, 1QQ, 1RR, 1SS, 1TT). The electrodes may be nickel or gold plated brass electrodes to provide enhanced conductivity. The charging interface may be in the form of a connector configured to mate with a connector of the tablet-charging station when the tablet-charging station is inserted into the slot. The charging interface may be in the form of a wireless charging coil configured to be in parallel with a coil of the tablet-charging station when the tablet-charging station is inserted into the slot. The slot may include physical guides to ensure that the charging interface is properly position with respect to the tablet-charging station. The guides may be formed of stainless steel or of line bent transparent polycarbonate. The guides may tab and slot bonded into a stainless steel panel. Optionally, a charge indicator (e.g., an LED light) may be provided for each slot indicating whether the tablet-charging station is charging. Optionally, the color of the indicator may change depending on whether the tablet-charging station is charging or is fully charged. Optionally, ultraviolet (UV) lights or an SPI/ozone generator may be used to kill spores, mold, and bacteria to thereby maintain hygiene. The UV lights may be discrete lighting elements or may be LED strip lights positioned under, on the side of, of over the station slots. For example, two LED light strips may be mounted underneath a given station. Optionally, switches may be provided to turn the lights/SGI generator on and off.

Optionally, a separate or integral cover may be provided that when deployed covers the charging station (see, e.g., FIGS. 1W, 1Z). Optionally, an electronically or keyed lock is provided that enables the cover to be locked in a closed position to protect tablet-charging stations within. Optionally, when a separate cover is used it may be lowered onto the charging station. Optionally, the cover is formed from a plurality of separate hinged leafs that fold downwards to cover all or portions of the exterior surface of the bottom of the charging station. Optionally, latches or magnets and ferrous materials may be provided on the bottom of the charging station and on the leafs to hold the leafs against the bottom of the charging station.

Figure 2:
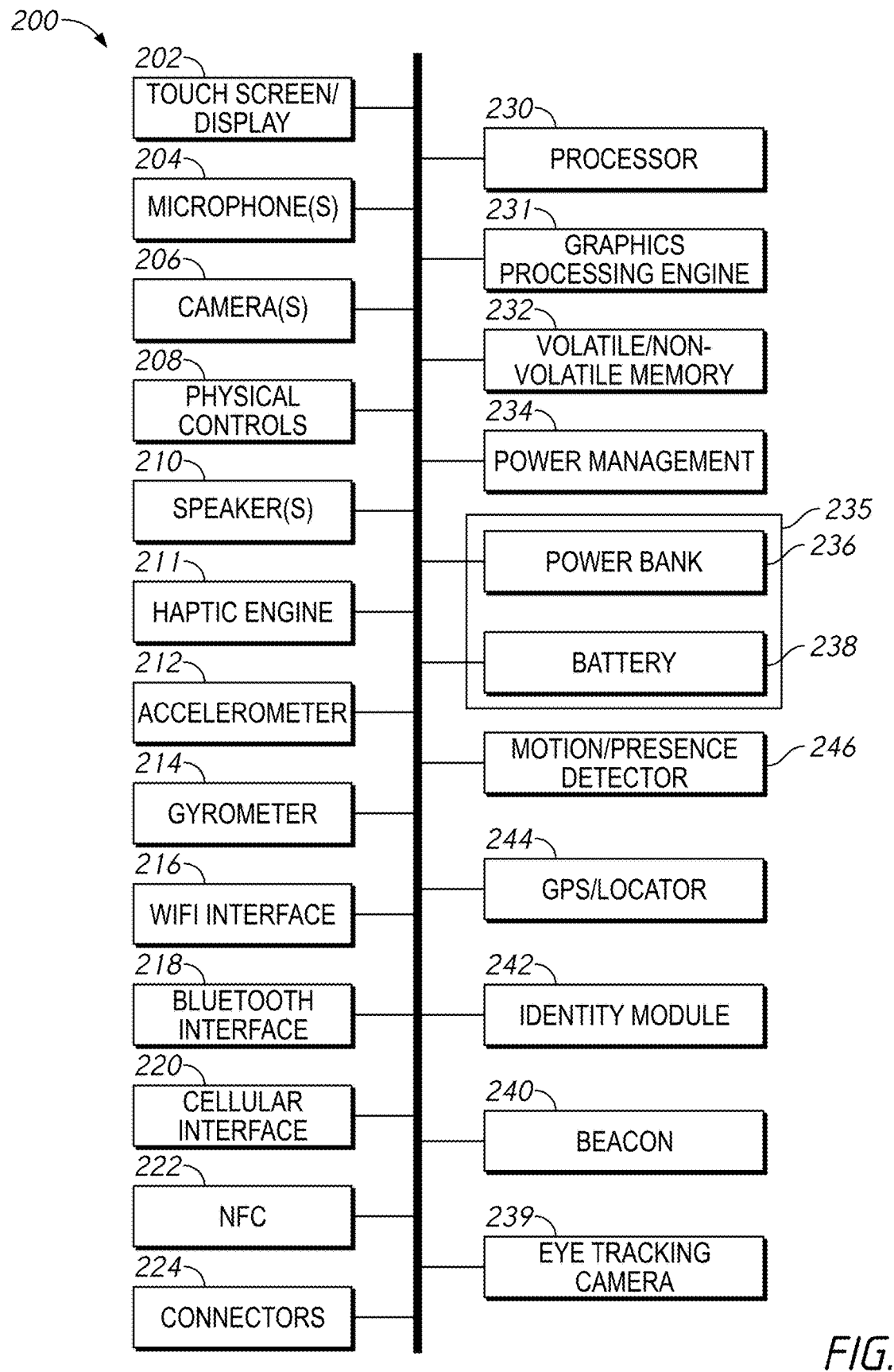
FIG. 2 illustrates an example architecture of the display device comprising a charging station.
Figure 3:
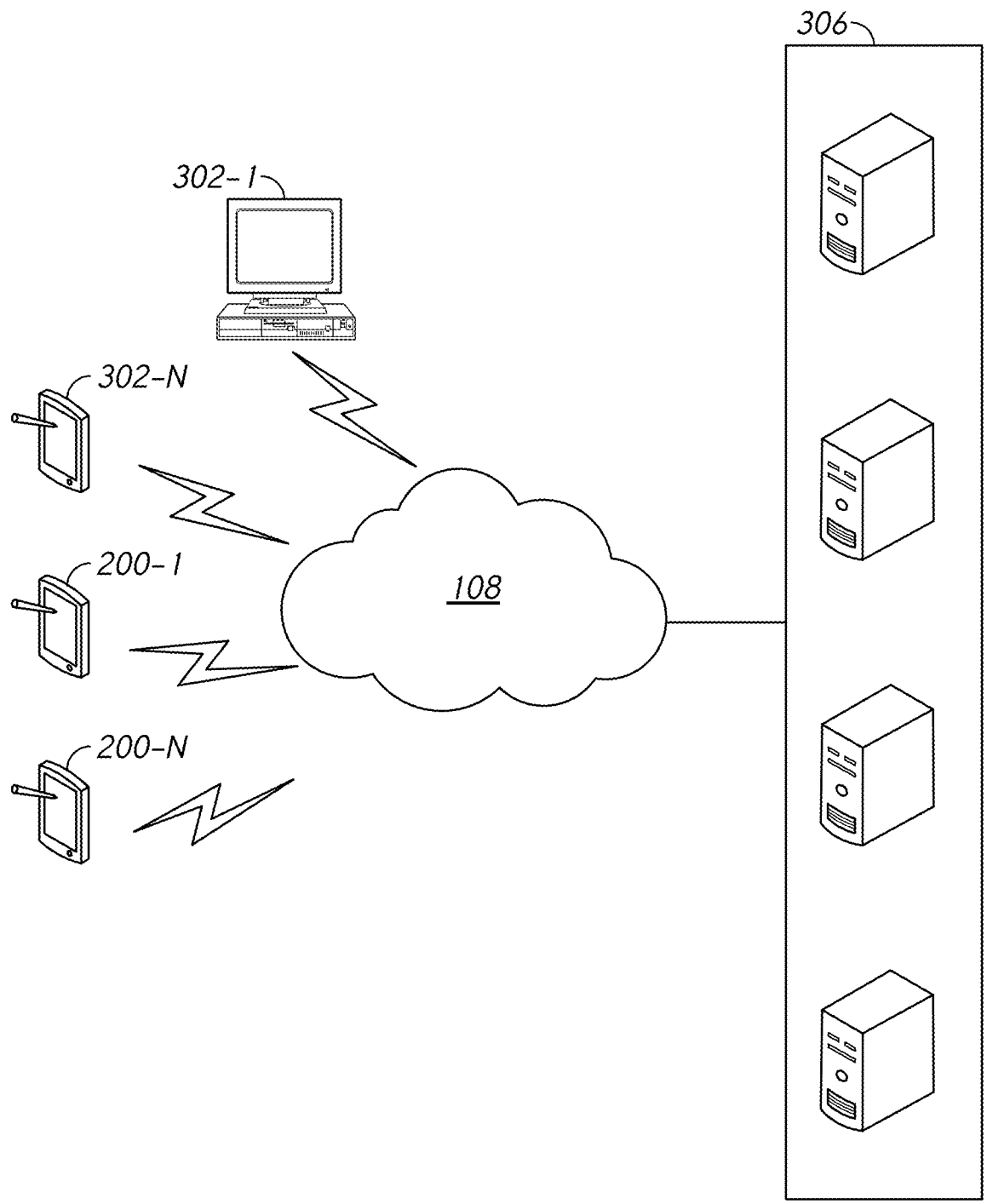
FIG. 3 illustrates an example environment include display devices and a remote system.

FIG. 2 illustrates an example architecture of a tablet-charging station combination 200 (which may be referred to as a "tablet-charging station" or simply as a "station"). FIG. 3 illustrates an example architecture including one or more tablet-charging station combinations 20-1 . . . 200-N and one or more administrator terminals 302-1 . . . 302-N. Tablet-charging station combinations 200-1 . . . 200-N and one or more administrator terminals 302-1 . . . 302-N may be wirelessly networked to a remote cloud system 306 (e.g., a remote management system) over one or more networks 108 (e.g., wide area networks, the Internet, an intranet, etc.).

In the example illustrated in FIG. 2, the tablet-charging station combination 200 includes various user input/output devices, such as a touchscreen/display 202. The tablet-charging station combination 200, may include a variety of sensors. For example, the sensors may include sound, image, orientation, pressure, light, acceleration, pupil trackers, and/or other sensors, configured to detect user input and interaction with the tablet-charging station combination 200. The tablet-charging station combination 200 may include one or more microphones 204, one or more cameras 206 (e.g., a front facing camera, a rear facing camera, a camera with a magnifying lens, etc.), physical controls 208 (e.g., a power on/off control, a volume control, a home control, etc.), one or more speakers 210, and/or other user input/output devices. The tablet-charging station combination 200 may optionally include a haptic engine 211 that provides kinesthetic communication to the user (e.g., via vibrations or taps, which may be used to confirm a user input or to provide a notification), an accelerometer 212 that measures acceleration in 2-3 directions, and/or a gyrometer (e.g., a 3-axis gyroscope) 214 that measures orientation in three axis. The tablet-charging station combination 200 may be equipped with an external or integral physical keyboard, trackpad, joystick, electronic pen, and/or other input device.

The tablet-charging station combination 200 may include one or more wireless and/or wired interfaces. For example, the tablet-charging station combination 200 may include a WiFi interface 216, a Bluetooth interface 218, a cellular interface 220 (which may optionally include or be coupled to a SIM (subscriber identification module) device), an NFC (near field communication) interface 222, beacon module (e.g., a BLUETOOTH beacon module) 240, an identity module 242 (which may comprise an RFID circuit), and/or one or more physical connectors 224. The tablet-charging station combination 200 may further comprise a processor device (e.g., a microprocessor) 230, a graphics processing unit (GPU) 231, volatile memory (e.g., RAM solid state memory) and non-volatile memory (e.g., FLASH/NAND memory) 232, and a power management device 234. In addition, a GPS/locator module 244 may be included that may be utilized in locating the physical location of the station 200. Optionally, a dedicated motion detector 246 may be provided that detects motion in the immediate vicinity, to thereby detect the presence of a user. The motion detector 246 may include an infrared sensor that detects heat being radiated by a person when the person moves into the field of view of the infrared sensor. Optionally, motion detection may instead or in addition be performed using the camera 206. The tablet-charging station combination 200 may include one or more slots configured to receive SIM cards and/or memory cards (e.g., a version of an SD memory card) which may be respectively used for wireless cellular communication and to store programs, content, or data.

Optionally, an eye tracking camera 239 may be provided and used to track a user's gaze. For example, the eye tracking camera may include an infrared or near infrared light source and an infrared camera. The infrared light (or near infrared) light is directed towards the center of the user's eyes (the pupils), causing visible reflections in the cornea. These reflections (e.g., in the form of a vector between the cornea and the pupil) are tracked by the infrared camera to determine the user's gaze. In particular, the infrared light that reaches the user's pupil will have much less reflection than the infrared light the reaches the iris, thereby enabling the differentiation between the pupil and the iris, and enabling the tracking of the iris. Optionally, instead of or in addition to using a dedicated eye tracking camera 239, the 206 may be used to capture images of the user's eyes (including the pupils) and use computer vision to identify the pupils, and track the movement of pupils over time and while content is being presented.

Optionally, one or more motors 250 may be provided to enable the camera 239 to be tilted, panned, or rotated so as to appropriately position the user's face or eyes within the camera field of view. Optionally, the motors 250 may include a motor to move a lens closer or further from the camera sensor for zoom-in, zoom-out functionality. Optionally, the motors 250 may include a motor that rotates the station housing relative to a base so as to position the camera 239 to better view the user's face or eyes. Optionally, the motors 250 may include stepper motors, linear motors, ball spring plunger mechanisms, and/or other mechanisms may be provide for the indexing and accurate positioning of the lens and/or stand. The motors 250 may be under the automated control of the processor 230 or other control device and/or may be manually controlled by the user via corresponding touch screen or physical controls.

Optionally, the station 200 includes a multi-core, always-on vision processor unit (VPU) to enable certain of the computer vision functions described herein to be performed in a power-constrained system, such as the station 200. The VPU may include one or more vision/imaging accelerators. The VPU may be configured to accelerate machine learning and artificial intelligence execution (e.g., including the use of convolution neural networks).

Optionally, the housing of the tablet-charging station combination 200 may include a unique optical code (e.g., a barcode, such as a QR matrix barcode, or a linear barcode) that uniquely identifies the tablet-charging station combination 200 from other tablet-charging stations. The optical code may be printed on a sticker affixed to the station 200 or may be molded into a or etched into the body of the station or on a removable protective case. The tablet-charging station combination 200 may host an operating system (e.g., Android, iOS, Windows, or other operating system).

Optionally, the physical connectors 224 may include an input connector used to charge the tablet-charging station combination 200. As similarly discussed above, the physical connectors 224 may include one or more charge output connectors configured to receive mating connectors via which user devices may be connected for charging. The connectors 224 may include one or more micro-USB connectors, USB-C connectors, USB-A connectors, LIGHTNING connectors, and/or other connectors. Optionally, the input connector used to charge the tablet-charging station combination 200 may also be used to connect a trouble shooting device to troubleshoot and repair the tablet-charging station combination 200. For example, the troubleshooting process may include loading certain data into memory and reading the data out, and verifying that the data matches. Optionally, instead, a separate connector may be provided for debug purposed.

Optionally, one or more of the connectors (e.g., a connector of a cable for charging a user device) may be a magnetic connector providing a strong, secure connection with a matching magnetic cable. The magnetic cable may include multiple types of connectors (e.g., a micro-USB connector, a USB-C connector, a USB-A connector, a LIGHTNING connector, and/or other connector) on the user device end to enable the connector to be used with different device types. The use of a magnetic connector may reduce connector damage as compared to conventional mechanical connectors. Additionally, the use of a magnetic connector may avoid damage to the tablet-charging station combination 200 that might otherwise result from a user tripping over the cable or inadvertently yanking the cable, as the cable will safely disconnect rather than pulling the tablet-charging station combination 200 to the ground.

The GPU 231 may include a dynamic shut down functionality to reduce power consumption with the GPU 231 is not needed for graphics processing or when the charge level of the battery 238 falls below a preset level. The GPU 231 may enhance and provide faster game play for video games and for video playback.

In addition, the illustrated tablet-charging station combination 200 includes a battery system 235, including a power bank 236 configured to charge other devices and a battery system 238 configured to power the tablet-charging station combination 200. The power bank 236 may include one or more batteries, such as one or more lithium batteries. The capacity of the power bank 236 may be selected as appropriate for the charging application. For example, in a low volume user base location or for a physically small tablet-charging station, a relatively small battery capacity may be used (e.g., 1000-4000 mAh (milli-ampere hour) at 3.7V). By way of further example, in a high-volume user base location or for a physically larger tablet-charging station, a relatively large battery capacity may be used (e.g., 4000-25000 mAh at 3.7V). By way of further example, the battery 238 may include multiple batteries (e.g., two 4,000 mAh batteries) while the power bank 236 may include a different number of batteries (e.g., a 8,000 mAh battery).

Optionally, the power bank 236 and/or the battery 238 may be configured to be wirelessly charged. For example, the power bank 236 and/or the battery 238 may be configured with Qi or PMA compatible wireless charging circuits (including a planar receiving/secondary coil) enabling inductive charging. The coil(s) may be positioned towards the back of the housing. Optionally, a recess, sleeve, cradle, or other user device receiving area may be affixed to or formed on the back of the tablet-charging station 200 configured to receive a user device for wireless charging (see, e.g., FIGS. 1I, 1J, 1K, 1L, 1O, 1P, 1Q, 1T, 1U). If a sleeve is used, the sleeve may be an elastic sleeve (e.g. a mesh nylon or other polymer sleeve) so as to fit a variety of different size devices (e.g., different size smart phones). The sleeve may be so positioned over the charging coil of the tablet charging station 200 so that it is in charging range of the coil of the user device. Similarly, if cradle or recess is provided to receive the user device, a fixed bar, openable bar, or elastic strap (e.g., a polymer/elastomer strap) may be provided to hold the user device within the cradle or recess.

Optionally, a ratchet assembly may be provided that enables the user to incrementally tighten a strap to hold the user device against the rear of the station 200. For example, a pawl may be configured to engage in teeth formed on or attached to the strap (e.g., a strap buckle). A user-accessible release actuator may be provided to enable the user to disengage the pawl to thereby loosen the strap and release the user device. Optionally, the ratchet and release actuator may be motor controlled, where the motors may be commanded to tighten the strap or loosen the strap in response to a user activation of a tighten control or release control respectively.

The sleeve, cradle, or recess may have a soft material, such as a polyurethane, polymer or cloth pad where the sleeve, cradle, or recess will come into contact with the user device housing so as to avoid scratching or otherwise damaging the user device housing. A bottom lip may be provided to better support the user device while being retained by a sleeve, a fixed bar, an openable bar, or an elastic strap. This technique enables the user to carry or hold the tablet-charging station 200 while still charging the user's device.

Optionally, rather than having a separate power bank 236 and battery 238, the battery system 235 may include a single battery bank, where the same battery bank is be used to power both the tablet-charging station and to charge another device. If a single battery bank is used, optionally it may be operated as a "virtual" two bank system that gives priority to certain circuits and functions of the tablet-charging station 200 over charging external devices. For example, when the tablet-charging station 200 detects that the battery charge level of the single battery bank has dropped to or below a preset threshold or dynamically determined threshold, the tablet-charging station will respond by entering a low-power mode, were certain tablet-charging station circuitry and functions are still enabled (e.g., a GPS/locator module, a wireless network interface for reporting location information from the locator module), while other functions are disabled to conserve power (e.g., the charging of external devices, the display, the streaming of video content, and/or other functions and corresponding circuit). This technique enhances the likelihood that the tablet-charging station 200 may still perform certain important functions for a relatively longer period of time, and optionally, for long enough that it is likely the battery bank will be recharged prior to being so discharged that is cannot perform those certain important functions.

The power management 234 device may provide overcharging and over discharging protection with respect to charging user devices via the power bank 236.

One or more visual indicators 243 may be provided (e.g., LED indicators, e-ink indicators, or the like) that indicate the level of charge of the power bank 236 and/or the battery 238.

The front facing camera 206 may be positioned so that it may view a user's face when the tablet-charging station combination 200 is placed on its planar backside on a flat surface, or when the station 200 is supported at an incline via a built-in stand (as similarly discussed elsewhere herein), with the camera positioned on the tablet-charging station combination 200 front side. The tablet-charging station combinations may utilize the camera 206 to capture, record, and/or stream video (and/or still image) data (which may be stored or streamed in association with captured audio data) to other systems.

The front facing camera 206 (which includes a lens mounted on or protruding through the tablet housing) is optionally configured to optimally scan faces that are within a certain distance from the camera 206 (e.g., 16-22 inches away, or more particularly 18 inches). Optionally, the camera 206 may be zoomable under processor control to obtain a desired magnification of a user face. The camera 206 may have a relatively wide field of view (e.g., a 180-300 degree field of view, or more particularly, a 270 degree field of view). Optionally, the camera may have a fish eye lens (e.g., a hemisphere lens that takes in about a 180° hemisphere field of view and projects it onto a camera imaging sensor) and/or a macro lens. Optionally, a difishing software module may be used to undistort the image captured using the fisheye lens. For example, the difishing software module may remap the captured image into a rectilinear projection. By way of further example, a remapping algorithm may optionally be utilized that only corrects distortion along one axis in order to retain more of the image and so that lines running vertically in a landscape image will be corrected to appear straight, while still proving a wide field of view. Optionally, the front facing camera 206 may be motorized (e.g., using one or more servo motors) so as to rotate, tilt, or pan the camera under processor control to center a detected user face (or portion thereof, such as the user's eyes) within the captured image/onto the camera sensor, and/or to track the user face in real time.

The tablet-charging station camera 206 may be utilized to monitor motion and/or user interactions content presented by the tablet-management charging station. For example, the output of the camera 206 may be monitored by the device management program and/or by the remote management system to detect user presence and/or motion (e.g., head movement). Optionally, in addition or instead, motion detection may be performed using the dedicated motion/presence detector 246 as discussed elsewhere herein.

In particular, the camera 206 may be configured to observe a user of the tablet-charging station 200 and determine if the user is viewing content presented by the tablet-charging station 200. The camera 206 may be utilized to perform facial recognition to identify and/or authenticate a user based on facial features. The camera 206 may be configured to detect motion within its field of view. As discussed above, the camera 206 may be configured to automatically rotate, tilt, or pan to center or otherwise move the camera 206 so that the user's face is within a desired position in the field of view. Certain actions may be taken in response to the detection of motion and/or such motion detection data may be stored.

Figure 11:
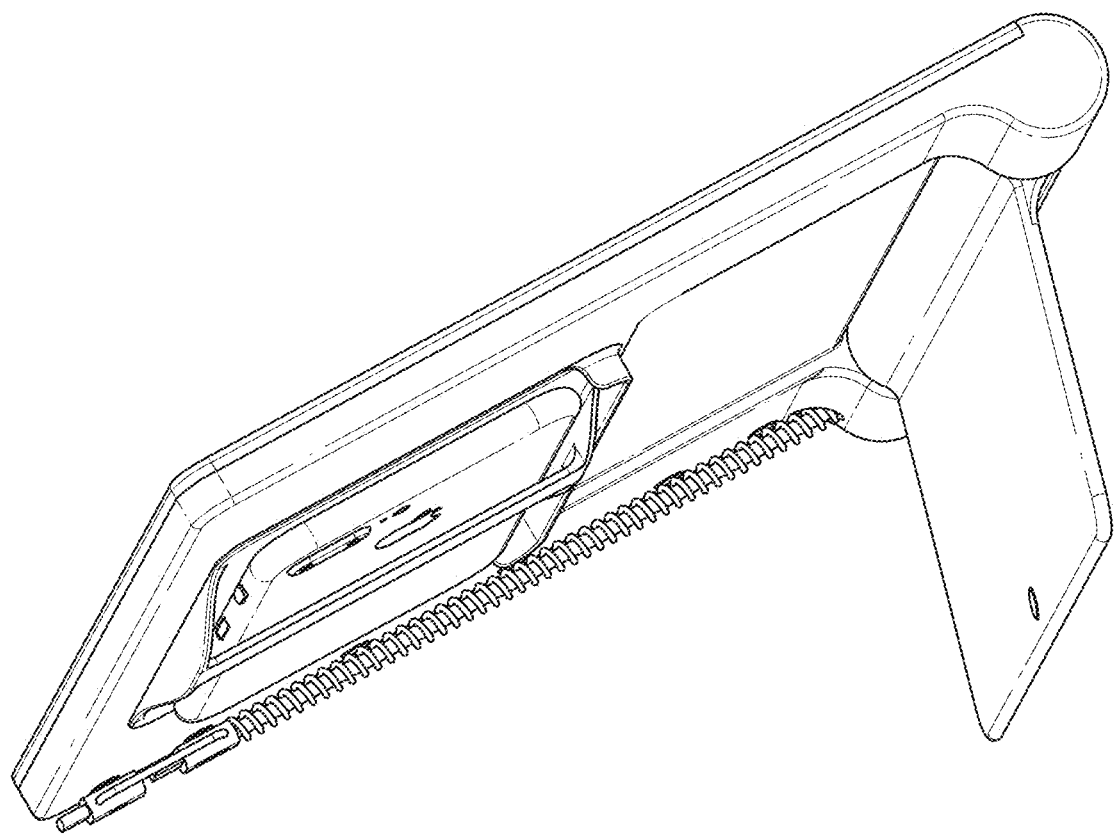
FIG. 11 illustrates example eye/gaze tracking grids.

The camera 206 may be configured to detect a user's pupils, including the position and movement of the user's pupils so as to determine what the user is looking at may optionally detect pupil dilation. Such pupil information may be used in determining content that is of interest to the user and in selecting other content for presentation to the user. For example, with reference to FIG. 11, an eye 1100 may be detected in an image (or a series of images, such as frames in a video), and a virtual grid 1102 may be overlaid on an image of the eye 1100. The grid may contain numerous cells or quadrants (e.g., 24, 45, or 90 quadrants). The position of the pupil 1104 with respect grid cells/quadrants may be determined. For example, a determination may be made as to which grid cells (e.g., relative to reference point, such as grid cell 1, 1) are fully occupied by a portion of the pupil 1104, which grid cells are fully occupied by a portion of the pupil 1104, and which grid cells are not occupied by a portion of the pupil 1104. Based on the foregoing and the distance of the edges of the pupil from the reference point, a determination may be made as to which direction the pupil is gazing at. Referring to FIG. 11(*a*), the pupil position indicates the user is gazing directly towards the tablet camera. Referring to FIG. 11(*a*), the pupil position indicates the user is gazing towards the bottom left area of the tablet display. Referring to FIG. 11(*c*), the pupil position indicates the user is gazing upwards to the right, and away from the tablet display.

By way of further example, the pupil movement may be tracked using the center of the pupil and using light (e.g., visible light or infrared/near-infrared non-collimated light) to create corneal reflections. A vector between the pupil center and the corneal reflections can be used to compute the gaze direction.

A given tablet-charging station combination 200 may include or be configured with media players that enable the tablet-charging station combination 200 to play video and/or audio content, and display still images.

The camera 206 may also be utilized to capture an image of the user for purposes of recognizing the user during later utilization of the same or a different tablet-charging station combination. For example, an image of a user may be captured by a tablet-charging station combination and stored by the remote system. As discussed above, a motorized charging station stand may be utilized so as to change the height and/or angle of the camera 206 so as to center or otherwise appropriately position the user's face/eyes within a desired portion of the field of view. In addition or instead, the camera 206 may be motorized and controlled so as to rotate, tilt, or pan the camera 206 so as to center or otherwise appropriately position the user's face/eyes within a desired portion of the field of view. Advantageously, in order to enhance privacy and reduce storage memory utilization, the image of the user is not stored in persistent memory by the remote system, Instead, a set of brightness gradient vectors corresponding to certain characteristics of the user's facial features are stored. The station or remote system may extract facial features and identify distinguishing features, and/or use a photometric/statistical analysis technique, which distills an image into values and compares the values with templates to reduce or eliminate variances. For example, a user's face may be modeled using a certain number of points (e.g., 64 points, 128 points, 256 points, 512 points). Such points may be used in generating a fingerprint of the user's face and may be stored in association with information related to the user's interactions with content.

Prior to performing a facial analysis, the image may be converted from color to black and white to simplify processing. The number of points used may be selected based on need for accuracy and need to reduce processing power bandwidth consumption. In generating the points, pixels in the image may be associated with generated gradients indicating the flow from light to dark across the image to reduce variations related to the brightness or darkness of the image as a whole. Optionally, the image may be divided into square blocks of pixels (e.g., 4×4, 8×8, 16×16, 32×32, etc.). For a given square, a determination may be made as to how many gradients point in a given direction (e.g., up, up-right, up-right, right, left, down, down-right, down-left, etc. A given block may then be associated with (replaced by) an arrow or vector indicating which directions were the strongest. The resulting gradient may be used to detect and isolate a user face in the image for further processing. Optionally, any misalignment/non-centering of the face may be identified and corrected by applying a transform to center the face in the image (e.g., based on the location of eyes and bottom lip). Optionally, if two faces are present and detected, the larger face (closet to the camera) will be used to generate the facial fingerprint. The actual photograph image and/or gradient data may be deleted from memory to enhance privacy and security and to reduce memory utilization. The fingerprint of the user's face may be encrypted and stored to provide further security and privacy.

The fingerprint of the user's face may be compared against previously captured reference facial fingerprints stored in a facial fingerprint data store. If a match is found, then the corresponding records (e.g., of past user interactions with content, likes of content, dislikes of content, etc.) associated with the facial fingerprint may be accessed and used as described elsewhere herein. If a match is not found, then new records may be created and associated with the facial fingerprint.

Optionally, a Deep Convolutional Neural Network (CNN) may be utilized to generate the points. The points may be in the form of a list of computer-generated numbers generated through an embedding process. A distance based classification (e.g., where the vector distance may be determined to calculate how similar two faces are) may optionally be utilized as it is more scalable as compared to a model classification which will become more computationally expensive as the database grows. The distance based classification may be performed using a machine learning classification algorithm (e.g., a Linear Support Vector classifier that utilizes supervised learning models with associated learning algorithms that analyze data used for classification and regression analysis, an Extreme Learning Machine-based single layer feed forward network, and the like).

Optionally, in order to account for a user face in an image being tilted or being at a different angle than a reference facial fingerprint, an image may be warped (e.g., using face landmark estimation) so that certain features (e.g., lips and eyes) are always in the same location in the image. For example, an image of a face may be scaled and sheared so that the lips and eyes are relatively centered.

Optionally, the front facing camera may be configured to capture three dimensional images of a user's face. For example, the front facing camera may be configured to capture information about the shape of a face by projecting thousands of dots (e.g., 10,000-60,000 dots) using a dot projector that includes a laser diode, such as a vertical-cavity surface-emitting laser (VCSEL). This information may be used to identify distinctive features on the surface of a face, such as the contour of the nose, lips, chin, eye sockets, etc.

The use of a dot projector enables a two dimension image to be created from a three dimensional source. Advantageously, the use of a dot projector reduces effects from changes in ambient lighting. Further, the foregoing three dimensional image capture techniques may be utilized to recognize a user from a wide range of viewing angles, such as from a profile view.

Thus, when a user's image is captured, a facial fingerprint may be generated and a search may be performed to find a file with a matching facial fingerprint. If a match is found, a determination may be made as to whether there is an associated user profile (e.g., that indicates the user's responses to previous content, such as user emotions, likes or dislikes, clicks, other responses discussed herein, or the like). The user profile may be used in selecting content or content types to be displayed to the user. The user profile may exclude data (e.g., email address, physical address, name, credit card information, social security number, driver's license number, etc.) that can be used to determine the actual identity of the user, thereby preserving user anonymity and privacy.

The user's image may also be analyzed to determine age, gender, and/or ethnicity of the user. This information may also be stored in the user profile and may be used in selected and targeting content to the user in the future, as described elsewhere herein. For example, a Deep Convolutional Neural Network (Deep CNN) may use an age classification model, a gender classification model, and an ethnicity classification model to determine the foregoing demographic data from an image. Still further, the image may also be analyzed to identify objects in the image, such as whether the user is wearing a tie, a suit, jewelry, or is holding a drink or eating food. For example, a Deep CNN may be utilized to perform object detection and classification. By way of further example, the VGG, Inception, or YOLO algorithm may be utilized to perform object detection and classification. Such object information may provide additional insights into the user's age, gender, ethnicity, income, food preferences, clothing preferences, jewelry preferences, and/or the like. Thus, detected objects may be added to a user profile and used to select content for display to the user. For example, if the user is wearing jewelry, jewelry-related content (e.g., jewelry advertisements) may be selected and displayed to the user.

An application may be utilized to request and/or receive data from remote systems and to transmit data to remote systems, optionally including audible input received from a user via the microphone(s) 204 (and digitized using an analog-to-digital converter) and video content captured via the camera(s) 206 transmitted over a network to the system 106. The data transmitted from the application may include a unique identifier associated with the application and/or station 200. The data transmitted from the application may include location information (e.g., GPS data) from the station 200. The audible and video content may be stored locally on the tablet-charging station combination and/or on the system 106 for later access and playback. The tablet-charging station combinations may utilize one or more microphones 204 to receive voice data and/or commands. For example, multiple microphones may be used to provide directionality. One or more speakers 210 and/or wired or wireless headphones/ear buds of the user connected to the station, may be utilized to play audible content.

User inputs (e.g., commands and/or data) may also be received by the tablet-charging station combination 200 via a keyboard, a stylus, via voice entry (provided via the microphone 204) which may be converted to text via a voice-to-text module, and/or via pupil movement captured by the camera 206. As noted above, the keyboard and/or stylus may optionally be included with the tablet-charging station combination 200.

Optionally, one or more game controllers may wired to the tablet-charging station combination 200 to facility the playing of games provided by the tablet-charging station combination 200. Optionally, in addition or instead, the game controllers may be wirelessly paired to the tablet-charging station combination 200 using Bluetooth or other protocol.

The identity module 242 (which may comprise an RFID circuit and/or may be included in the NFC interface 222) and/or the external optical code (e.g., a QR code) may be scanned periodically by an administrator (e.g., using a phone or other mobile device with an NFC or RFID sensor and/or a camera capable of photographing optical codes). The scanned identification information may be used for tablet-charging station combination setup and/or to track tablet-charging station combination inventory, tablet-charging station combination repairs, assign a station to a location, activate a station, and/or the like.

Optionally, the display 202 may be between 7-12 inches in diagonal to provide a display large enough to display content that is easily visible to users, while still enabling the tablet-charging station combination 200 to be easily portable. Optionally, the display 202 may have a relatively high resolution (e.g., 2048×2732, 2224×1668, 1536×2048, 1125×2436, 1080×1920, 750×1334, etc.) to provide a sharp and legible display.

Optionally, the display 202 comprises a 3D (three dimensional) autostereoscopic display. For example, optionally the display utilizes a lenticular lens, a parallax barrier, a volumetric display, or a holographic display, to provide 3D effects without requiring the user to wear special glasses. Optionally, upon determining an identify of a user, the tablet-charging station combination renders, via the display, a character to greet the user that the user has previously selected. Optionally, the character is rendered in 3D.

Using the WiFi interface 216, the tablet-charging station 200 may be configured to, as a default, connect to and communicate via WiFi networks identified by the tablet-charging station that the tablet-charging station has been configured to connect to (e.g., the tablet-charging station has the corresponding WiFi network password). Optionally, if such a WiFi network is not located by the tablet-charging station, the tablet-charging station may switch communications to a secondary network (e.g., a cellular network accessible using the cellular interface 220).

The tablet-charging stations 200 may communicate with remote systems, such as a remote management system (e.g., network operations center (NOC) system) configured to manage tablet-charging station combinations at a plurality of different physical locations, receive battery charging status data, and facilitate the targeting of third party digital content (e.g., digital music, videos, movie or television previews, images, advertisements, video games, and/or the like). Certain content may be streamed to the tablet-charging stations and certain content may be stored on the tablet-charging stations, as discussed elsewhere herein. Non-limiting examples of content may include information on products (e.g., wine or food guides), on cities (e.g., city guides), and regarding a specific establishment (e.g., menus, product availability, etc. of the establishment). Further examples of content include video podcasts, audio (e.g., songs, audio books, podcasts, etc.), games, advertisements, blogs, microblogs, image galleries, and/or the like.

Data transmitted or received by the tablet-charging station combination 200 or the remote management system may be secured by establishing a virtual private network (VPN) which establishes an encrypted transmission path between the tablet-charging station combination 200 and the remote management system. Optionally, Secure Sockets Layer (SSL) and a secure transfer tunnel may be used to encrypt data in transit between the tablet-charging station combination 200 (e.g., via an app and/or browser hosted on the tablet-charging station combination) and the remote management system. Optionally, some or all of the information may be stored on the tablet-charging station combination 200 and/or the remote management system using file encryption.

The tablet-charging station tablet-charging station combination 200 may have a device management program installed thereon that manages certain device operations and interactions with a user. The device management program may be wirelessly downloaded or loaded via a wired programming device.

The device management program may be initiated by the device management program upon 'power on' of the tablet-charging station 200 and may then activate other device functions discussed herein. Optionally, the tablet-charging station 200 does not include a physical or soft control via which an end user can power the device on and/or off. This ensures that the tablet-charging station 200 is available for immediate use by other end users, and may display content even when not actively being used to charge a user device. Optionally, the remote management system may transmit a power on and/or activate command to the tablet-charging station 200, which will cause the station to power up. Similarly, optionally the remote management system may transmit a power off/deactivate command to the tablet-charging station 200, and the station may power off/deactivate. A deactivation process may identify (e.g., using an associated device identifier) that the tablet-charging station 200 is not currently available to request, receive, and/or display content.

Optionally, the device management program is configured so that it may not be uninstalled by an end user (a user using the tablet-charging station to charge their device) and/or by the location owner/operator. Optionally, the tablet-charging station 200 may be configured to prevent installation of applications by end users or the installation of unauthorized applications by service personnel. The device management program may enable location-based services for the tablet-charging station 200. Optionally, the station 200 may be configured so that location-based services cannot be disabled by end users or by service personnel without appropriate permissions.

Optionally, the device management program is configured to provide the battery status of the tablet-charging station 200 to the tablet-charging station's operating system framework (e.g., the Android framework) to enable the operating system to provide battery charge status functionality, such as the display of the battery status. Optionally, the device management program may be configured to provide or to access one or more content playback engines. A playback engine may provide a playback area, a play control, a reverse control, a forward control, a skip control, a repeat control, a volume control, a like control, a dislike control, and/or other user controls which a user may utilize to control content playback and to provide feedback regarding content. The remote management system may use the received user feedback (e.g., content likes and dislikes, user emotions as determined via facial expressions or voice/speech) to determine what content should be served to the user in the future. The system may utilize user feedback to infer demographics regarding the user. For example, certain content may tend to be more liked or disliked by people of a certain age, income, gender, marital status, etc. The inferred demographics may be stored in association with the user feedback. In addition, the age, gender, and ethnicity of the user may be determined from images of the user, as described elsewhere herein.

Optionally, the tablet-charging station 200 may be remotely configured by the remote management system to wirelessly connect to a local WiFi network at the establishment at which the tablet-charging station is located. Optionally, the tablet-charging station may be locally configurable to wirelessly connect to a local WiFi network via a WiFi connection user interface by authorized personnel (e.g., by an administrator located at the establishment or by a service agent).

Optionally, the tablet-charging station 200 may, upon power-up and/or periodically, transmit a tablet-charging station device identifier (e.g., a heartbeat signal) to the remote management system and an indication that the tablet-charging station 200 is ready and available to receive content for display and/or audible playback. As will be described, the management program may track the charge level of the tablet-charging station 200. The management program may detect when user devices are connected for charging (e.g., day/time), determine their charge level upon connection to the tablet-charging station 200, determine their charge level upon disconnection from the tablet-charging station 200, determine how long they are connected for charging, determine how much charge they used, and determine the location of the tablet-charging station 200 during charging operations. Some or all of the determinations, detections, and other data may be transmitted from the tablet-charging station 200 to the remote management system. Such data may be analyzed and used to determine the efficacy of the current placement of tablet-charging stations, and to determine new placements that would result in more content (e.g., targeted content) being viewed by users.

Optionally, the tablet-charging station 200 and/or remote systems may be inhibited from tracking and storing certain types of user device data to preserve users' privacy. However, optionally, certain user provided data (e.g., user information voluntarily provided using an interface presented by the tablet-charging station) may be received and stored. By way of further example, user responses to content (e.g., advertisements, movies, clips, audio tracks, images, etc.), responses to offers, requests for delivery of items (e.g., a version of the tablet) may be received and stored and used in permitted manners. Optionally, images or models of a user's face will not be stored or used until the user provides explicit consent for such storage and use. The consent may be received via a consent form that explains the intended storage and use of the images and/or model of the user face, where the user clicks on a consent box or otherwise indicates consent. The consent may be stored in association with the images and/or models.

Optionally, in order to use the tablet-charging station 200 the user may need to download a tablet-charging station access application on the user device to be charged. Optionally, upon the initial connection of a user device, a determination will be made by the tablet-charging station 200 or the remote management system as to whether the tablet-charging station access application is installed on the user device. If the remote management system determined that the application is not installed on the user device (e.g., based on a failure to receive a message from such application, the user may be prompted to enter a phone number and/or email address of the user, and the remote management system may text or email a link to download the application. The link may provide a link to a version of the tablet-charging station access application available on an application store applicable to the user device operation system. For example, if the user device utilizes the ANDROID operating system, the link may be to an ANDROID app store, if the user device utilizes the IOS operating system, the link may be to an IOS app store.

Optionally, the tablet-charging station access application may be used to detect if any stations are within a threshold distance or travel time of the user device, and if so, a notification may be provided to the user via the tablet-charging station access application. Optionally, a user interface is provided via which the user can specify the distance or travel time threshold. For example, the notification may be in the form of a map showing the location of stations and their distance and/or travel time from the user device. Optionally, a pop-up notification may be displayed on the user device textually indicating that a station is within a specified distance. Optionally, the support application may track and time stamp the users location (e.g., every 10 feet, every hundred feet, or other elapsed distance). A map and/or text describing the user's movements may be generated and provided to the user and/or other authorized users (e.g., a supervisor).

Optionally, the support application may provide navigation, turn by turn, directions (e.g., textually, and/or graphically via a map) from the user's current location to the location of a station selected by the user. The map and directional information may optionally be generated by a remote system and provided to the tablet-charging station access application for display. Optionally, the tablet-charging station access application may provide a user interface via which the user can specify a travel mode (e.g., car, bike, foot, public transportation) and the distance and/or travel time determination will be based on the specified travel mode. Optionally, the tablet-charging station access application may estimate the user's current travel mode (e.g., by detecting the user's movement speed) and use the estimated travel mode to generating distance and travel time estimates.

Optionally, in response to detecting a user device being connected to the tablet-charging station 200, the tablet-charging station may automatically prompt the user (via a user interface) to provide a user mobile phone number and/or email each time the user connects the user's device to the tablet-charging station 200. The tablet-charging station 200 may transmit the mobile phone number and/or email to the remote management system, which may determine if the user has an associated account/profile stored on the remote management system. If a determination is made that the user has an associated account/profile, the user's profile may be utilized to select and/or schedule content to be displayed to the user via the tablet-charging station. Other techniques may be utilized to identify the user, such as a userID and password provided by the user to the tablet-charging station.

Optionally, a determination is made by the remote management system, by analyzing the user account/profile, as to whether the user has agreed to share the user's contact database. If the user had not previously agreed to share the user's contact database, the user may be prompted to do so. If the user agrees to share the user's contact database (and optionally provides a userID and/or password to access the user's cloud-based contact database), the remote management system may access and download the user's contact database, and may associate the content database with the user's account. The user's consent to share the contact database may be stored in association with the user's account.

Optionally, an application installed or accessed by the station 200 may request the user to provide log in credentials (e.g., userID, password, biometric data, etc.), provide certain user profile data, and/or request user permission to access certain user data, such as user contact database data, calendar data, photographs, and/or social network data (e.g., the user's social graph). The profile data may include gender data, age data, physical address data, income data, interests data, and/or other data. Optionally, when the user device is connected to a tablet-charging station, a user identifier is provided to the remote management system via the application (e.g., wirelessly without use of the tablet-charging station, or via the tablet-charging station). As discussed herein, the user identifier may be utilized to track the user's usage of the tablet-charging station and/or may be utilized to enable content to be targeted to the user, optionally in combination with the user's location as discussed elsewhere herein. The determination of the user's current physical location may be based on knowledge of the location of the tablet-charging station.

Optionally, a tablet-charging station 200 and/or the remote management system is configured to detect and report certain types of information related to the station 200, a set of stations, the remote management system, or the entire system. For example, the remote management system may be configured to detect and report (e.g., based data received from stations and/or from internal data): the number, types, length of content served and/or displayed over a period of time, the number of user interactions (e.g., viewing of content as determined by a camera, clicking on links associated with the content, etc.) with a given type of content over the period of time; the number, types, length of content served and/or displayed while a given user device was attached to and/or charging from a station, the number of user interactions (e.g., viewing of content as determined by a camera, clicking on links associated with the content, etc.) with a given type of content while the given user device was attached and/or charging; the amount of time the tablet-charging station display is on and off; the number of overrides, the number of credit refunds, the amount of credit refunds, and/or the like.

The information may be analyzed and corresponding statistics generated, such as the average or median (or other central tendency) of certain types of the foregoing detected information, such as the total, average and/or median number of: types, length of content served and/or displayed over a specified period of time; the number of user interactions (e.g., viewing of content as determined by a camera and/or clicking on links with a given type of content over the specified time period of time); the number, types, length of content served and/or displayed while user devices are attached and/or charging; the number of user interactions with a given type of content while user devices are attached and/or charging; the total revenue from presenting content; the revenue from presenting content per device; the percentage and/or time booked for showing third party content, the number of overrides, the number of credit refunds, the amount of credit refunds, and/or the like.

The remote management system may collect and aggregate certain data from multiple tablet-charging stations at multiple locations and generate the statistical information based on an analysis of such aggregated data or a subset thereof. Optionally, the analysis may be limited, via a user interface, to a user specified time period (e.g., the current day, a specified data range, a specified month, a specified quarter, a specified year), territory, location, chain, station model, and/or assigned support person. Optionally, for each metric for a specified time period (e.g., the current day, the current week, the current month, the current quarter, the current year, etc.), the corresponding metrics for the corresponding previous time period (e.g., the previous day, the previous week, the previous month, the previous quarter, the previous year, etc.) may be displayed, and the percentage difference between the time period may be generated and displayed. Optionally, trend lines/graphs may be generated and displayed for a given metric for a specified time frame.

Figure 4:
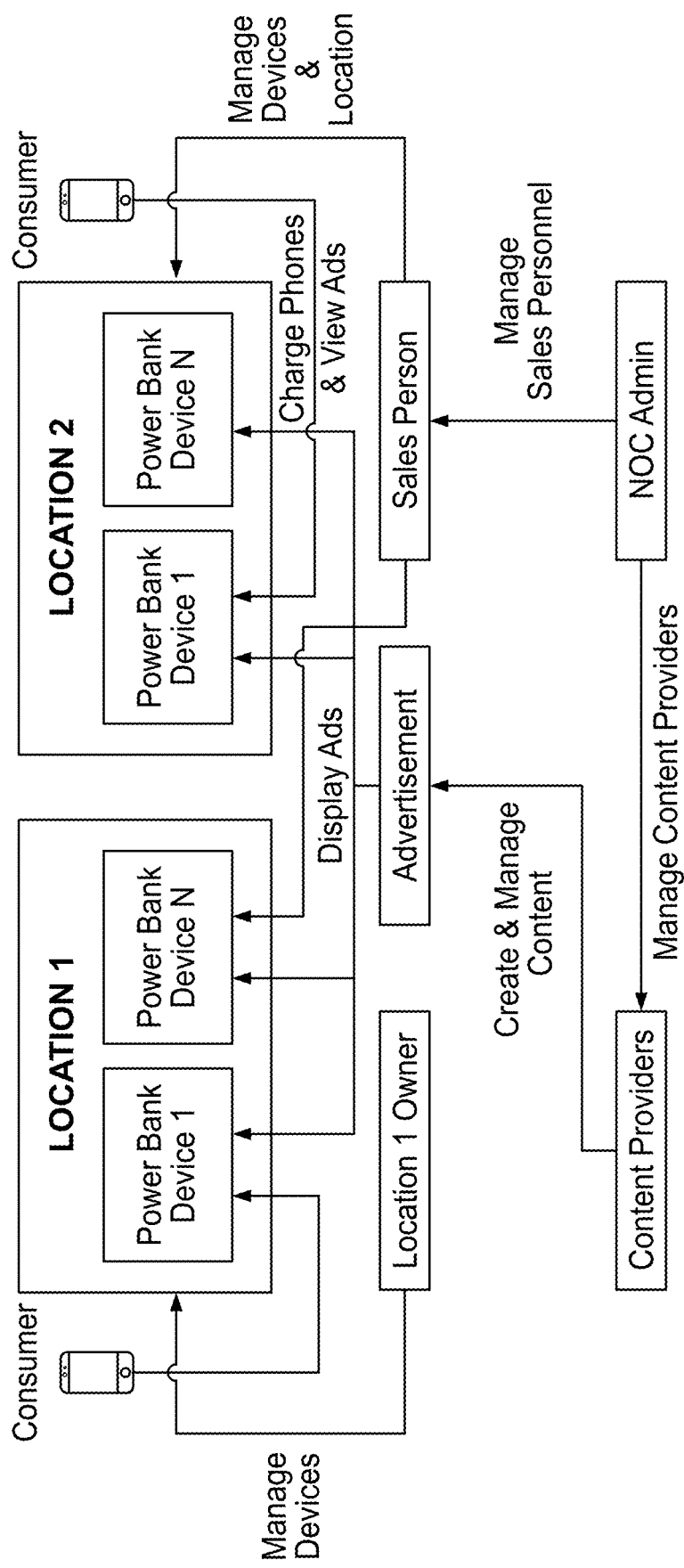
FIG. 4 illustrates an example architecture and environment.

FIG. 4 illustrates an example architecture and environment that further elucidates different user roles. In this example, two physical locations are illustrated, where a given location may be a type of establishment (e.g., a restaurant, a retail store, a movie theater, a hotel, an airport, etc.). A given location may be associated with a location owner or operator. Each location may include one or more tablet-charging stations. One or more of the tablet-charging stations may be connected to a user device (e.g., a user cellular phone, portable game console, etc.). A service person (e.g., a sales person or information technology person) may service tablet-charging stations, download content to tablet-charging stations (via a portable content downloading device), conduct inventory, provide and/or retrieve tablet-charging stations, and/or perform other tasks.

A content provider (e.g., an advertiser) may create and manage content for distribution over a network to tablet-charging stations.

A remote management system, such as a network operations center (NOC) system and console, may be utilized to manage service personnel and content providers, and may be used to provide or manage the provision of content to tablet-charging stations. For example, the NOC system may be enabled to remotely activate or deactivate tablet-charging stations. As part of the activation process, the NOC system may identify a given tablet-charging station as being able to request and receive content (e.g., ads). As part of the deactivation process, the NOC system may identify a given tablet-charging station as being not available to request and receive content (e.g., ads). As noted elsewhere herein, the tablet-charging station may optionally not include end user accessible controls for turning the tablet-charging station on or off. As similarly discussed elsewhere herein, the NOC system may be configured to access and report the charge status of tablet-charging stations. The NOC system may be configured to cause tablet-charging stations to connect to local WiFi networks (e.g., by providing the password and network identifier of the network at the establishment at which the tablet-charging station is located).

As discussed elsewhere herein, the remote management system may detect and track user interactions, current content being displayed, charge status, impressions, amount of time types of content were played while a user was viewing the station display, and other information discussed herein. The system may analyze such data and generate analysis results for display as similarly described elsewhere herein.

In order to maintain high performance and available memory, purge and defragmentation/cleanup processes may be performed with respect to tablet-charging station memory. For example, the purge and defragmentation/cleanup processes may be performed at scheduled intervals. The scheduled intervals may be directly programmed into the tablet-charging station. Optionally, the scheduled intervals may be specified to the tablet-charging station by the remote management system or the remote management system may transmit a purge command and/or a defragmentation command to the tablet-charging station according to an internal schedule and/or in response to a detected event. For example, the detected event may be the tablet-charging station available memory falling below a specified threshold, where the threshold may be specified as an amount of memory or as a percentage of total memory.

The purge process may determine which content and/or content schedules are no longer required. For example, if a content schedule only includes dates in the past, the schedule may be purged. By way of further example, if content downloaded to the tablet-charging station is not included in any schedules with associated playback dates in the future or at the current time, the content may be deleted to free up memory. The defragmentation may enable faster data accesses to be performed. Optionally, the purging and/or defragmentation processes are limited to solid state nonvolatile memory (e.g., a solid state drive).

Figure 5A:
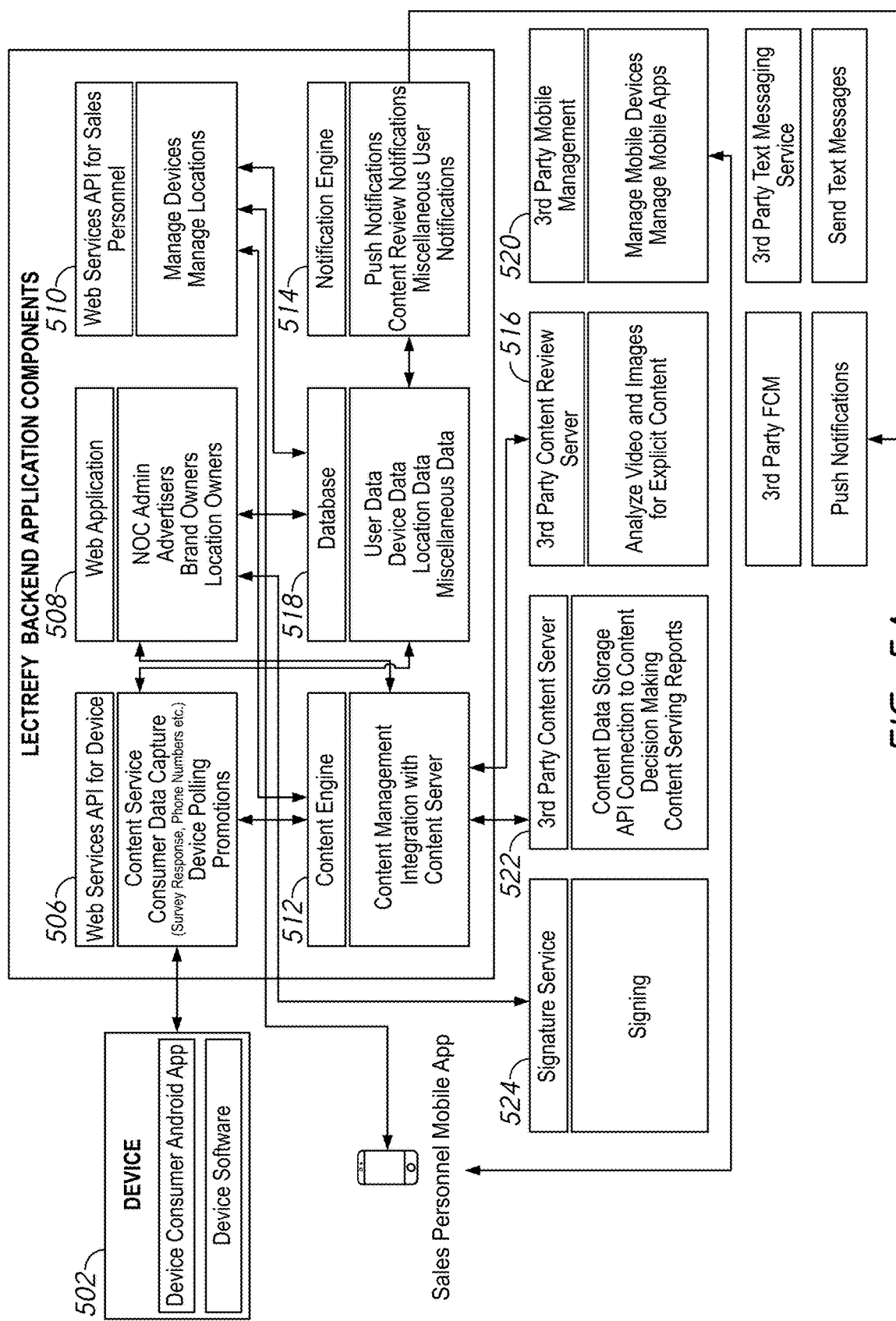
FIG. 5A illustrates an example architecture for charging station management system.

FIG. 5A illustrates an example software architecture for the remote management system. A web services API 506 is provided to interface with tablet-charging stations 502. The web services API 506 captures user data, such as user survey responses, phone number(s), contact database records, interactions with content, time spent viewing items of content, date/time content was viewed, images of the user captured using tablet-charging station cameras, user voice captured using a tablet-charging station microphone, other data described herein, and/or the like. The web services API 506 may also poll tablet-charging stations (e.g., to determine if they are active, the charge levels, other information discussed herein), receive responses to promotions, etc. The web services API 506 may communicate with a content engine 512, which provides content management and interacts with content servers (e.g., ad servers 522, film preview servers, film previews, entertainment, restaurant information, etc.).

The content servers store a content library and may serve content (e.g., ads, film previews, entertainment, restaurant information, etc.), provide API connections to content, count the number of items of content served, select content (e.g., based on information provided by the content engine 512, by content providers, based on which content will result in the most revenues for the system operator, the establishment owners/operators, and/or the content providers, and/or other parameters), monitor campaign progress, and/or generate reports. A given content server may be operated by the same entity that operates the remote management system or by a third party.

The content engine 512 may inspect or request inspection (using internal and/or external applications) of content to ensure it meets certain specifications (e.g., does not include objectionable content, such as offensive language, nudity, violence, graphic medical images, and/or other objectionable content; is at least a specified minimum time length and no greater than a maximum time length; is in one of authorized file formats; has at least a specified minimum resolution and no greater than a maximum resolution; etc.). For example, the content engine 512 may transmit content or links to content to a content review server 516, which may optionally be operated by a third party. The content review server 516 may inspect image, video, text, and/or audio content for objectionable content. An example content inspection process is described with reference to FIG. 6.

The content engine 512 may communicate information related to an available impression and enable third parties to bid for such impression.

A web application module 508 provides interfaces, examples of which are disclosed herein, to system administrators, content providers, brand owners/licensees, and location owners/operators. A technical support web services API 510 provides user interfaces and web services to technical support/sales personnel. For example, the web services API 510 enables such personnel to manage, via their devices 504, tablet-charging stations and to add or delete locations authorized for the placement of tablet-charging stations. Such notifications may be provided via a support application installed on support personnel devices.

A notification engine 514 may generate various notifications, such as user notifications, content review notifications, push notifications, and the like, examples of which are disclosed elsewhere herein. The notification engine 514 may transmit notifications to user devices via third party push notification services, third party text and/or multimedia messaging services (e.g., an SMS/MMS messing service), cross-platform messaging services, and/or the like.

A database 518 may store content and/or links to content for serving to the tablet-charging stations 502, may store device data (e.g., unique tablet-charging station identifiers, tablet-charging station configurations (e.g., screen size, battery size, electrical interfaces, model numbers, charge levels), status (e.g., online, offline, in need of repairs, in repair, repaired and awaiting shipment, current locations, designated locations, etc.) etc.), location data (e.g., location address, number of tablet-charging stations at location, location physical layout, contact information for charge instructions, identifiers/contact information of support personnel designated for location, etc.) for multiple locations, and other data described herein (e.g., user profile data, content impression data, content viewing data, viewer emotion data, viewer interaction with content data, etc.). The database may be a relational database (e.g., an SQL database) or a non-relational database (nonSQL database). For example, a nonSQL (e.g., Hadoop) database may be used rather than an SQL database as it better scales out horizontally and so can handle large number of transactions (e.g., millions of transactions at a time). Further, a nonSQL database may be better utilized with unstructured and semi-structured data. Thus the selection of the database technology may be based on the particular use scenario (e.g., large number of simultaneous transactions v. large amounts of unstructured and semi-structured data).

The system may determine and report, optionally in real time and subject to specified filters, performance of stations (e.g., within a specified managed territory or territories and/or those not assigned to a territory). For example, the system may determine and report (e.g., within a specified managed territory or territories and/or for stations not assigned to a territory) on the total number of stations placed in a managed territory, the total number of active stations (e.g., that are on and ready to display content), the total number of screen views and/or content impressions via the stations, the number of "inactive" devices and, where possible, the determined reasons for an inactive status (e.g., cannot be connected to via the network, insufficient power available to fully power station, not at its designated location, etc.), device identifiers, the content sync status (e.g., synced, incomplete, not synced) of each station, station installation dates, a statistical analysis (e.g., an average or median analysis) of the runtime/uptime of stations, and/or the like.

The system may determine and report, optionally in real time and subject to specified filters, the geolocation of stations (e.g., as determined from GPS information acquired by stations, using WiFi location information, using cell tower triangulations, or otherwise). For example, a list of stations (optionally with respective station identifiers) may be listed in association with a corresponding physical address. Optionally, the system may generate a list of location addresses (e.g., of approved locations within a specified territory or territories) and provide the number of stations located at each address (and optionally the number of each type of station at each address, where there are multiple types of stations). Optionally, the report may be limited to include only those locations to which the user has authorized administrative access. For example, a user may be authorized to have access to station-related data in one or more specified territories, but not other territories.

Optionally, a search engine may be provided that enables a user to search for locations by address, territory, zip code, establishment type, establishment/brand name, or otherwise. For example, a search user interface user interface may be provided comprising a search field configured to receive a text query and/or search filters from which the user may select. The query received via search user interface may be processed by the search engine to find matching locations. The search engine may generate and provide for display a ranked search result list (e.g., ordered by relevance, alphabetically, etc.).

Optionally, a given search result list entry may comprise a link to related data. For example, optionally, a user (e.g., a user that services or manages stations) may select (e.g., tap or click on) an entry for a listed station, and more detailed station information may be accessed and presented (e.g., serial number, screen size, memory size, available memory, processor type, operation system version, app version, power bank battery size, current charge level of power bank, current charge level of battery configured to power station, etc.) and/or a map of the station location may be generated and presented. By way of further example, optionally, a user may select (e.g., tap or click on) an entry for a location, and more detailed station information may be accessed and presented (e.g., the number of each type of station at the location, the respective serial numbers, screen size, memory size, available memory, processor type, operation system version, app version, power bank battery size, current charge level of power bank, current charge level of battery configured to power station, etc.). A map of the location and/or a graphic layout of the location (e.g., showing where tables are location, the specific position of tablets at the location, etc.) may be rendered and presented. The system may determine and report, optionally in real time and subject to specified filters, the geolocation of users that service and/or manage stations (e.g., as reported by applications installed on their user devices (e.g., cell phones)).

The system may be configured to maintain records of where tablet-charging stations are located (where a given tablet-charging station is identified by a unique identifier, and a location may be identified by a unique identifier and/or physical address) and optionally historical locations at corresponding time periods. The system may be configured to provide interfaces that enable locations to be identified and designated as a location eligible to have tablet-charging stations placed thereat. Optionally, such interfaces may be provided via support applications installed on support personnel user devices and/or via a web service accessible via browsers. A user interface may be provided that enables a user to enter or update, for a given location, a location name, operating days, operating hours, establishment type (e.g., restaurant, clothing store, jewelry store, retail store, gym, yoga studio, hotel, hospital, airport, doctor's office, lawyer's office, accountant's office, professional office, etc.), physical address, occupancy capacity, number of tables, number of seating locations, customer demographics, square footage, owner/operator contact information, and/or other information. Optionally, a user may need to be granted authorization to authorize such locations and/or such locations need to be approved by an authorized user after being added and prior to delivering of stations to the newly added locations. Optionally, certain commonly owned or franchised locations may have all their locations pre-approved as a group for having such tablet-charging stations placed thereat.

A user interface may be provided via which an authorized user (e.g., an account manager) can specify how many stations are to be located at a given location, how many of each model of station (e.g., where different models may have different size displays and/or batteries) are to be located at the given location, whether any stations are to be relocated from one location to another location, and/or the like. Optionally, a user interface is provided via which an authorized user can turn on or off the display of selected types of content (e.g., ads, offers, etc.) on specific stations and/or at specific locations.

A third party mobile management service 520 may optionally be utilized to manage provisioning, securing and managing mobile devices (e.g., user devices that have applications installed thereon), such as those of support personnel (which may provide technical and/or sales support). For example, the mobile management service 520 may provide support for hardware (e.g., inventory, provisioning, repairs, etc.), software (e.g., configuration management, software distribution and updates of the support application), security (e.g., blacklists, whitelists, encryption, antivirus protection, authentication, jailbreak/rooted detection and notification, etc.), and/or network service management.

Optionally, an account may be created for a given location or set of locations (e.g., with an associated user identifier and password). The location owner/operator may use the account to specify and control local content (such as menus, special offers of the day, catalog of items available at the location, information of services offered at the location, monitor revenue generated via the stations at the location(s) (e.g., via content presentation on stations at the location), and the like. The local content may optionally be uploaded by the location owner/operator to the remote system via a location owner/operator device, and the remote system may then stream or download the local content over a network to the stations. The local content may be displayed on stations at the location at times specified by the location owner/operator via a user interface and/or during time slots were other content with higher priority is not displayed. For example, the system operator may specify that certain content or content types (e.g., ads) have a higher priority than local content. Where there is a conflict between the timing for display of higher priority content with lower priority content, the higher priority content is displayed. Optionally, the local content may be displayed at the same time other content provided or selected by the system operator. For example, an ad selected or facilitated by the system operator may be displayed at the same time as local content using a split screen arrangement or using two physically separate screens.

Optionally, to ensure that content submitted by a location owner/operator (e.g., to be used as local content) does not include inappropriate content, the system may utilize an internal image and/or audio analysis engine or access a third party image and/or audio analysis engine via an API, to request that the content be analyzed for one or more types of objectionable content, such as offensive language, nudity, violence, graphic medical images, and/or other objectionable content as similarly discussed elsewhere herein. If objectionable content is not identified, the location owner/operator content may be added to the content library for later audio and/or video playback via tablet-charging stations.

Optionally, the system may monitor specific stations, stations at specific locations/regions, or stations at all locations. A user interface may be generated in real time showing the status of stations. By way of illustration, the system may determine and report which stations are on or off, which stations are online/offline, why a given station is offline (e.g., cannot be accessed over a network), what stations have been reported lost, what are the station charge levels, what stations are below a threshold charge level (e.g., below 15% charge level), which stations currently are connected to user devices, what content is currently being displayed on a given station, and/or other information. The system may determine and report support and inventory requests (e.g., from location operators), whether a new location has been approved or rejected, daily performance information, and/or the like. A filter interface may be provided that enables a user to specify which stations should be included in the generated status report. For example, the user may specify specific stations, locations, and/or regions, whose stations should be included in the generated status report. The user-specified filter may be applied and status report will include only those stations that satisfy the filter conditions. Optionally, a user interface may be provided that enables a user to initiate a test routine for one or more selected stations or far all online stations at a specified location.

Optionally, based on station status, notifications may be generated and transmitted to the location (e.g., to the owner, waiters, information technology persons, etc.) and/or to support personnel. For example, notifications may be generated and transmitted tin response to detecting that a station battery level is below a specified threshold (so that the station can be recharged). Optionally, a support application may be downloaded to or otherwise installed on support personnel user devices to receive such notifications and to enable other support functions to be performed by such support personnel. Optionally, a given station may include a visual indication of the battery charge. For example, a low battery charge indication may be provided (e.g., an illuminated red indicator light, blinking light, or other low battery indicator) by the station itself.

Optionally, a user interface is provided by the support application via which a replacement device may be requested if a station is malfunctioning (e.g., not powering on, broken display, not connecting to the Internet, etc.). Delivery tracking may be performed by the system and reported to a user via the support application, email, text message, and/or otherwise. For example, the system may track and report the number of stations ordered, timing requested for station fulfillment, proposed placement of stations, and/or the like.

Interfaces may be provided via which location owners/operators may communicate station-related issues (station replacement requests, technical support requests, requests for addition stations, and/or the like). The communication may be reported to support personnel (e.g., via a browser accessible site, via a support application installed on support personnel devices, or otherwise).

Optionally, a user interface may be provided via which a location owner/operator or support personnel may upload or draw a graphic layout of the location, including an indication as to the placement of tables and other surfaces on which stations may be placed. A user may indicate on the graphic layout where a given station is to be placed. The system may detect if the stations are actually placed as indicated on the graphic layout, and indicate via the graphic layout if they are or are not so placed. The system may determine how many stations are active at a given time at the location, and cause the user interface to display how many stations are active at a given time at the location. Optionally, a user interface may be generated using information from the system that indicates the placement of stations at a given location, and the user interface may be rendered and displayed on stations so that consumers or other users at the location can view where other stations may be found. Optionally, the user interface indicating the location of stations at a given location may be displayed on stations at specified times, when other scheduled content is not being displayed, and/or in response to a user selecting a corresponding icon displayed on the station touch screen display. Optionally, the user interface may indicate which stations are currently being used to charge user devices, and which devices are currently not being used to charge user device. This enables users to identify where available stations are location so that the user can charge her device. Optionally, the user interface indicating the location of stations at a given location (and optionally an indication as to which stations are currently being utilized or unutilized to charge user devices) may be displayed via an application installed on a user device (e.g., a smart phone, tablet, etc.), optionally in response to determining that the user device is at the location.

Optionally, the support application may be used to detect if any stations are within a threshold distance of the support personnel user device, and if so, a notification may be provided to the support person via the support application. For example, the notification may be in the form of a map showing the location of stations and their distance from the user device. Optionally, a list of locations may be generated and presented. The list may be ordered (by default or in response to a user instructions) by proximity, travel time to reach, alphabetically based on location name, or otherwise. A given entry may include a location name, a chain name, an address, and/or a distance from user. Optionally, a pop-up notification may be displayed on the user device textually indicating that a station is within a specified distance. Optionally, the support application may provide navigation, turn by turn, directions (e.g., textually, and/or graphically via a map) to a station selected by the support person. The map and directional information may be generated by a remote system and provided to the support application for display. Optionally, the tablet-charging station access application may provide a user interface via which the user can specify a travel mode (e.g., car, bike, foot, public transportation) and the distance and/or travel time determination will be based on the specified travel mode. Optionally, the support application may estimate the user's current travel mode (e.g., by detecting the user's movement speed) and use the estimated travel mode to generating distance and travel time estimates.

An electronic signature service 524 may be utilized in having an electronic agreement executed (e.g., an agreement regarding content placement, an agreement via which a user provides consent for the use of user-related images, facial recognition models, names, contact information, and the like. The electronic signature service may encrypt ssignatures and documents (e.g., agreements), then apply a hash to reveal whether the document has been tampered with or compromised.

Figure 5B:
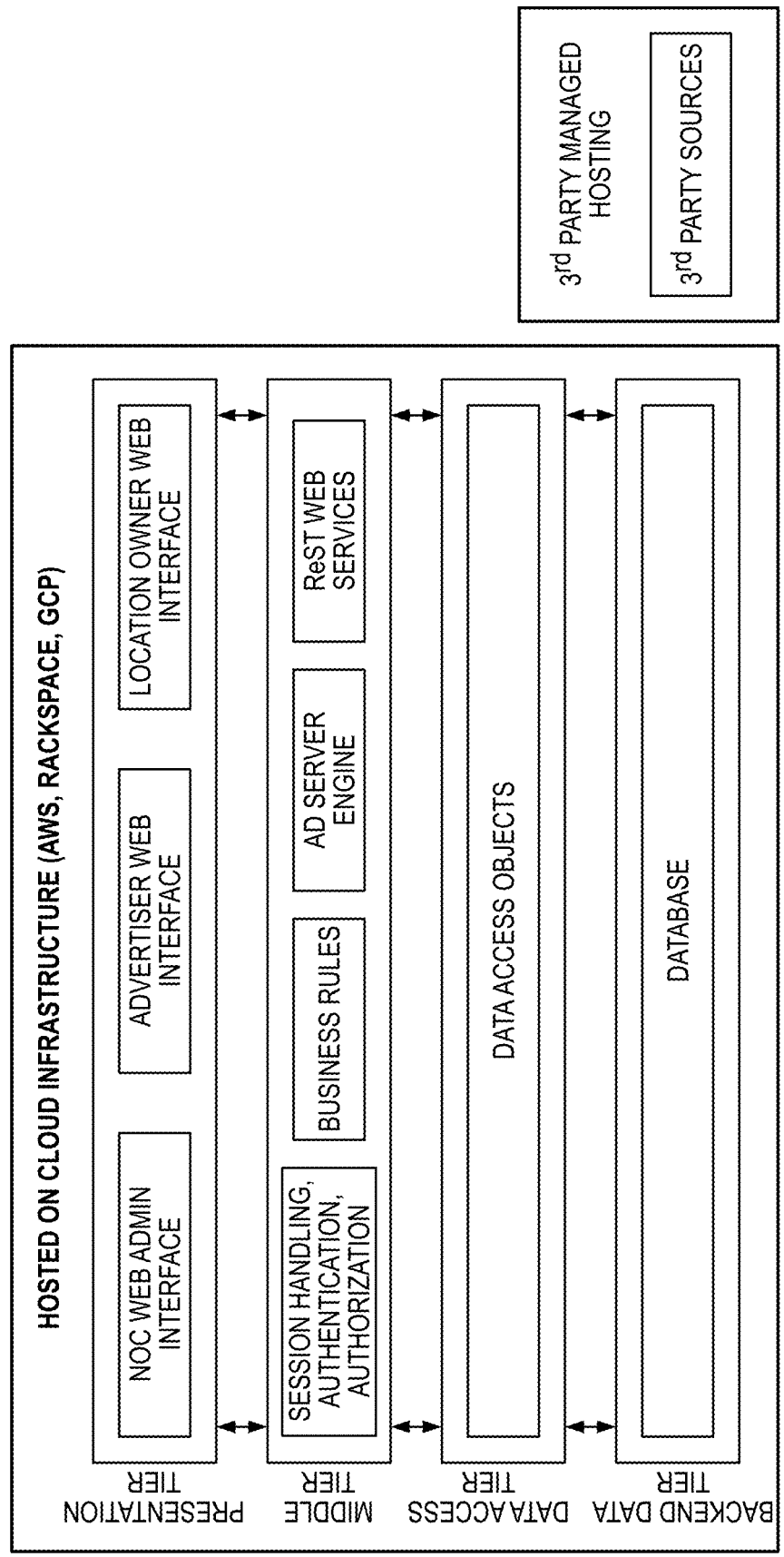
FIG. 5B illustrates an example embodiment of a multi-tier software architecture.

FIG. 5B illustrates an example embodiment of a multi-tier software architecture. The bottom tier may include a backend data sources tier comprising a database storing data as similarly disclosed elsewhere herein (e.g., user profiles, user inferred preferences, user likes of content, user dislikes of content, user interaction histories, user facial recognition data, content provider data, and/or other data disclosed herein). A data access tier comprises data access objects that provide an abstract interface to backend data sources by mapping application calls to the backend data source tier without exposing details of the backend data sources (e.g., the database).

A middle tier provides session handling, authentication, and/or authorization. For example, a session handler may link authentication and access control/authorization modules. A session identifier may be created and transmitted to a user device or station, which may store the session ID. The user device or station (e.g., via a browser) may include the session ID in each HTTP request in order to keep the authenticated state and track the users progress within a web application. The middle tier may also comprise business rules that describe operations, definitions and/or constraints. The middle tier may include a content server engine, such as that described elsewhere herein. The middle tier may include web services (e.g., REST (Representational State Transfer) web services).

A presentation tier may include a NOC web administration interface, a content provider web interface, a location owner/operator web interface, as similarly described elsewhere herein.

As noted above, various types of content may be transmitted to the tablet-charging station. Optionally, certain content may be downloaded over a network from a remote system, such as that illustrated in FIGS. 5A-5B, to the tablet-charging station and stored in local memory for later playback to users. Optionally, the download may be performed via a power bank station (see., e.g., FIG. 1E), discussed elsewhere herein, configured to power and charge one or more tablet-charging stations at a time (e.g., when not in use by users). The power bank station may, wirelessly or via a wired connection to a network, download content from the remote system.

Optionally, the content download may be performed in batch mode (where multiple items of content may be downloaded at a time) and scheduled to occur at a time when the establishment (e.g., restaurant) at which the tablet-charging station is located is closed to customers, thereby reducing network bandwidth usage by the tablet-charging station 200 during peak WiFi usage times at the establishment. Optionally, such download processes may be scheduled to occur periodically (e.g., every night, once week, etc.). Optionally, the download may be performed when a given tablet-charging station is being charged via the power bank station. Optionally, the scheduling may be performed via the remote management system. Optionally, the schedule may be provided to the tablet-charging station by the remote management system. Optionally, content download may be performed via a wired or wireless (e.g., Bluetooth, WiFi, etc.) connection to a local portable device, such as that of a tablet-charging station service person. Optionally, certain content may be downloaded and/or streamed in real time to the tablet-charging station 200 by and/or under the control of the remote management system. Optionally, certain content may be downloaded and/or streamed in real time to the tablet-charging station 200 in response to a request from the tablet-charging station 200. Optionally, the remote management system may grant permissions to third party content providers to provide content to one or more tablet-charging stations, as will be described in greater detail herein.

As noted above, content may be downloaded or streamed to a tablet-charging station 200. Optionally, in exchange for performing certain actions or for certain information, a user of the tablet-charging station 200 may be provided with devices and/or content. For example, if content is provided for display to a tablet-charging station 200 while a user is charging a user device, the user may be asked to provide feedback regarding the content or personal information. In response to receiving the feedback or personal information, the user may be provided with a device (e.g., a phone or tablet-charging station) which will become a user device and/or content (e.g., a ticket to an event or a coupon). Optionally, in response to receiving the feedback or personal information, the user may specify (e.g., via a user interface) one or more recipients of to be provided with a device (e.g., a phone or tablet-charging station) and/or content.

By way of further example, the tablet-charging station 200 may be configured to provide different speeds of charge using different charge currents (e.g., 0.5 amp, 1 amp, 1.6 amps). Optionally, in exchange for performing certain actions or for certain information, a user of the tablet-charging station may be provided with a relatively faster charge using a higher charge current (e.g., 2 amps rather than 1 amp or 0.5 amp).

By way of further example, the user may be asked to enter user information (such as a phone number), and in exchange, content (e.g., a coupon) may be transmitted to the user number. The coupon may be in the form of a QR or other visual code that encodes a coupon identifier, expiration date, applicability, and/or value, and that may be read via a camera or other device (e.g., a laser barcode scanner) in order to apply/redeem the coupon. The phone number may be transmitted by the tablet-charging station to the remote management system. The QR code may be generated by the remote management system or other server and transmitted to the user-entered phone number as an SMS/MMS short message or using other messaging protocol. Optionally, upon confirmed transmission of the QR code to the phone number, a confirmation notification may be transmitted to and displayed by the tablet-charging station to the user. The use/reading of a QR code may be tracked by an entity, such as a digital agency, to evaluate the effectiveness of a corresponding campaign. Optionally, a QR code reader (e.g., a networked camera) may be provided by the system operator. Optionally, a given QR code reader may be assigned to the specific location. The system may track and manage the placement of QR code readers. Data scanned by the QR code reader may be automatically synchronized automatically to the remote database (e.g., hosted by the cloud-based system).

Optionally, the station camera may be used to read QR or other optical codes in the user's environment. For example, QR codes may be posted in a museum in association with an exhibit. A rear-facing camera of the station may capture the QR code, decode the encoded information (e.g., a URL or other link), and use the encoded information (e.g., URL or other link) to access the corresponding data. The corresponding data may then be presented on the station display. The station may automatically flip from the front facing camera to the rear facing camera based on a detected geo-location of the tablet. For example, if the tablet is detected to be in a location where there are known posted QR codes, the station may be commanded by a remote system to use the rear facing camera so as to automatically detect and capture QR codes in the view of the rear facing camera. Optionally, a control may be provided (e.g., an on-screen touch control or a physical button) that enables a user to command whether the front camera or rear camera is to be used to capture images.

Optionally, the content may be requested or accessed and then played back by the tablet-charging station 200 according to a playback schedule that specifies respective playback times and/or frequencies. Optionally, the playback schedule may be transmitted to the tablet-charging station by the remote management system. The playback schedule may have been defined by a content provider or other entity as similarly discussed below. Optionally, the content may provide real time interactivity to the user (e.g., via embedded links or hot spots). For example, the user may touch an item of content being displayed, and in response, different (but optionally related) content may be displayed. For example, if the content relates to a product or service, in response to the user touching the content (which may include an embedded link) additional information (e.g., information accessed by activation of the link, information provided via a tooltip-type interface, or otherwise) regarding the content or service may be displayed. Optionally, the content may be targeted to the user based at least in part on the user's profile, the location of the tablet-charging station, the time of day, the current charge level of the user's device, and/or based on other user or tablet-charging station described herein.

Optionally, as similarly discussed above, a control may be presented in association with an item of content or certain types of content (e.g., advertisements) via which the user can provide a negative (e.g., dislike) indication regarding the content. Optionally, a user like or dislike of content may be inferred from detected human emotions (e.g., as determined from facial expressions, vocal expressions, and/or via pupil dilation and gaze direction, as discussed elsewhere herein), such as joy, happiness, laughter (which may be classified as a like) or anger, hate, contempt (which may be classified as a dislike). For example, by tracking a user gaze, the user's gaze may be mapped to content displayed on a station. The determination as to what the user is looking at, combined with the user's facial and vocal expressions, may be used to determine user interest in and feelings regarding the subject of the user's gaze.

In response to detecting user dislike of an item of content, the tablet-charging station may inhibit the re-presentation of the corresponding content and/or presentation of similar content. For example, the tablet-charging station may prevent the presentation (e.g., display/playback) of the corresponding content to the user without a time limit, or for a specified period of time (e.g., one hour) after which the content may be presented again. In response to detecting user liking an item of content, the same or similar content may be presented to the user with greater frequency (e.g., every time the user accesses a station, every other time the user accesses a station, etc.).

Optionally, a user interface control may be provided (e.g., a soft control displayed on the touch screen or a physical control) via which an end user (using the tablet-charging station to charge a user device) may command the device to enter a 'do not disturb' mode which may set the device display to a display off or low brightness 'ambient' light mode, turn off video content playback (e.g., for a set period of time or until another user device is connected to the tablet-charging station) and mute sound (if any sound is being generated), or cause a still, static image and/or text to be displayed.

Figure 7:
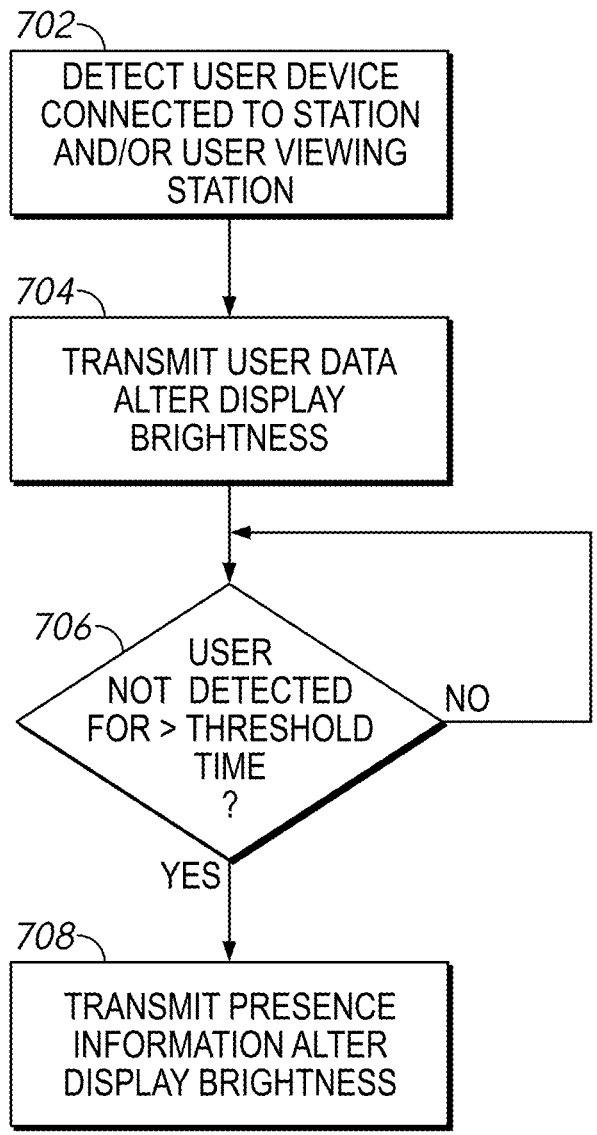
FIG. 7 illustrates an example embodiment user detection process.

FIG. 7 illustrates an example user detection process. At the beginning of the process a station may have its display turned off or dimmed to set threshold. At block 702, the process detects whether a user device is connected to a given station and/or whether a user is looking at the station (e.g., using the station camera as discussed above). At block 704, in response to detecting that a user device is connected to the station and/or a user is viewing the station, the display may be enabled and the brightness set to a certain level (e.g., between 50-100% of brightness range) to make content displayed by the display easily visible to the user. Optionally, user data is transmitted to the remote management system (e.g., images of the user face, a model of the user face, user login information provided by the user, etc.). At block 706, via the camera and/or station touch display, the process monitors the user to ensure the user is still present and optionally ensuring the user is viewing the display. For example, the process may monitor the user's eye movements or face to determine if the user's is present and looking at the display. By way of further example the process may monitor user touch inputs on the station's touch display to determine that the user is present and interacting with the content. If the user presence and/or attention to device content is not detected for a threshold period of time (e.g., 15 seconds, 30 seconds, 60 seconds, 120 seconds, etc.), the station display may be commanded to enter a low power consumption mode and/or mute the speaker. For example, at block 708, the station may be commanded to turn off the display or lower the display brightness to a certain level (e.g., 0-25% of maximum display brightness) in order to conserve power. The process may then repeat. Optionally, if the user's presence and/or motion is not detected for a configurable period of time (e.g., 1 minute, 3 minutes, 5 minutes, or other time period), the content being played by the tablet-charging station will be paused and/or terminated.

The tablet-charging station camera 206 may continue to monitor its field of view to detect the presence and/or motion of the user. If the user presence and/or motion is detected, the playback of the content may be continued from the point it was paused, the content restarted, or new selected content may be selected to be played. If new content is played, the new content may optionally be selected according to a pre-specified content schedule. As similarly noted elsewhere herein, the schedule may optionally specify specific items of content to be played at specific times or may optionally specify specific types of content (e.g., a video clip, weather, an advertisement, etc.) to be played at specific times.

The device management program may cause the tablet-charging station camera 206 to capture one or more images at a pre-determined interval (e.g., every 5 second, every 10 seconds, every 15 second) in order to detect a user's presence and/or motion, while conserving power and memory utilization by not continuously capturing images at 30 or 60 frames per second. Optionally, the motion detection is used for confirmation that a user is continuing to use the tablet and has not left (rather than being used for initial user identification). Optionally, a kinesthetic analysis is performed to aid in determining user behavior characteristics to provide more in-depth motion detection. Each image may optionally be timestamped so as to preserve the image sequence and timing. Optionally, the captured images may be periodically deleted (e.g., every 10 seconds, every 30 seconds, every 60 seconds; once certain image analysis has been performed; and/or when a user's lack of presence (e.g., the user has left the station) is detected) to reduce memory utilization and preserve privacy and security. Optionally, the tablet-charging station 200 will not transmit such images to the remote management system to preserve security and user privacy. Optionally, the tablet-charging station 200 will transmit such images to the remote management system or other system hosting an image analysis program for authentication and/or emotion analysis as described below.

As noted above, the images may be analyzed via a local analysis program and/or via a remote system hosting an image analysis program. The analysis may include detection of a user's emotion (e.g., neutral, happiness, joy, sadness, surprise, laughter, anger, fear, disgust, contempt, etc.). For example, the analysis program may, in real time, track a user's face and facial expressions from frame to frame (e.g., in accordance with the image timestamps). By way of illustration, emotion detection may include performing face and facial component detection, facial feature extraction, and expression classification. A face image may be detected in a frame and facial components (e.g., eyes, nose, mouth, forehead, cheeks, etc.) may be detected. Spatial and temporal features may be extracted from the facial components. Pre-trained facial expression classifiers may be utilized to generate emotion recognition results using the extracted spatial and temporal features. By way example, a pre-trained facial expression classifier may utilize a support vector machine (SVM), Adaptive Boosting (AdaBoost), Random Forest and/or Gradient Tree Boosting algorithms.

If a remote image analysis system is utilized, the image analysis system may be configured to automatically delete the images upon determining the presence of a user's face and/or emotion to reduce memory utilization and preserve privacy and security. Optionally, the images are transmitted to a remote system for analysis in a batch mode, with multiple images transmitted at the same time.

The device management program may cause the tablet-charging station to capture a user's voice input via the microphone 204. Optionally, the captured voice input may be periodically deleted (e.g., every 10 seconds, every 30 seconds, every 60 seconds; and/or or once certain voice analysis has been performed) to reduce memory utilization and to preserve user security and privacy. Optionally, the tablet-charging station will not transmit such voice input to the remote management system to preserve security and privacy and to reduce network bandwidth utilization. The voice input may be digitized and analyzed via a local analysis program (which may be a module included in the device management program) and/or via a remote analysis system hosting an image and voice analysis program. The voice analysis may include determination of a user's emotion/sentiment based on the speech content (e.g., determined using a natural language processing engine, by identifying keywords, or the like), and/or voice characteristics, such as pitch, timbre, loudness, and/or vocal tone. The determined user emotion (e.g., neutral, happiness, joy, sadness, surprise, laughter, anger, fear, disgust, contempt, etc.) may be classified as a like or dislike of content. Finer classifications may be used, such a mild like, like, strong like, mild dislike, dislike, or strong dislike. Optionally, image and voice analysis may be performed by providing the images and voice files to a cloud based system (see, e.g., FIGS. 4, 5A, 5B), as similarly discussed above. The cloud based system may be configured to process and store large amounts of structured data, unstructured data, and/or semi-structured data. The data may relate to user data (including sound and/or video recordings, contact information, profiles, etc.) disclosed herein.

By way of illustration, a detected keyword (e.g., "vacation") may be used to select and present content relevant to the keyword (e.g., regarding luggage, travel locales, airlines, rental cars, etc.).

Additional description will now be provided regarding the provision of content for distribution to distributed stations.

Content providers may be provided (e.g., by the remote management system or other system) with interfaces (e.g., application programming interfaces (APIs)) that enable them to have their content directed to appropriate users of tablet-charging stations by specifying desired target characteristics. For example, the content providers may specify desired demographics, user profiles, locations of tablet-charging stations, charge levels of tablet-charging stations, charge level of user devices connected to tablet-charging stations, user emotions as detected via user images, eye tracking, and/or voice input, time of day, and/or other information.

Optionally, in order to have their content provided to users via tablet-charging stations, content users may need to establish an account. User interfaces may be provided that enables a content provider to establish such an account. For example, a content provider may specify a user identifier (which may be an email address) and a password. An account, associated with the email address, may be designated as a master user/master administrator account. The master user may set up one or more sub accounts to provide certain other users with access to certain functionality and/or content, but not other functionality of content (where the master administrator may have full access to functionality and/or the content provider's content). For example, if the content provider is an advertiser, sub-accounts may be set up for specific brands (and sub-brands, which may be specific product brands) and/or agencies.

As part of a registration/application process a content provider may provide contact information (e.g., business name, address, phone number, email address) and payment information, such as credit card information or bank account information (e.g., to have their content displayed on tablet-charging stations). Optionally, certain information, such as the payment information, may be stored on a separate, highly secure system, such as that of a third party payment processor platform, for compliance and security purposes.

Optionally, a user interface may be provided via which a content provider may specify one or more spend limits with respect to having their content displayed on tablet-charging stations. For example, the user interface may enable the content provider to specify spend limits for a given advertising campaign and/or for a given period of time (e.g., per day, per week, per month, or other time period), and/or may specify a CPI (Cost Per Impression) limit, a CPA (Cost-per-Action) limit (e.g., where the content provider pays for each specified action, such as an application install, a form submittal, an opt-in, etc.), and/or a CPC (Cost-per-Click), for a given campaign. The system may enable the user to modify the spend limits as desired (e.g., during a campaign or in the middle of a time period). The user interface may enable the user to specify a lifetime budget for the campaign.

Optionally, a given content provider request to provide content may go through an approval process. Optionally, if the content provider has provided the requisite information via the user interfaces (e.g., content information, payment information, and/or spend limits), the application will be automatically approved by the system. Optionally, an application may be reviewed and electronically marked as suspended if a determination is made that further review of the application is needed. For example, if the system determines that the content provider has failed to provide certain required information (e.g., an email address, payment information, etc.), or has provided incorrect information (e.g., an invalid credit card number), then the application may be suspended.

Once the application is approved (e.g., manually or automatically), the system may generate a notification (e.g., an email, messaging service "text" message, webpage, and/or app notification) to an electronic address of the content provider confirming approval of the application. Optionally, an electronic agreement may be provided regarding content placement via a user interface which the content provider may electronically execute (e.g., utilizing a electronic signature process integrated into the user interfaces and system).

If an application is not approved and is suspended, a notification may be generated and provided to the content provider, wherein the generated notification may indicate why the application is not approved or suspended. For example, the notification may indicate that the content provider failed to provide a needed item of data or provided data determined to be erroneous. A link to a user interface may be provided (e.g., via email or text message) via which the content provider can provide missing data or correct erroneous data. Optionally, a contact interface (e.g., an online chat interface, a VoIP call interface, etc.) may be provided to enable the content provider to interact with a service personnel to resolve outstanding application issues. Once the content provider has provided or corrected needed information, the content provider application may be approved and the account un-suspended.

As noted above, an account, associated with the email address, may be designated as a master user/master administrator account. The master user/master administrator account may be associated with a content provider. Optionally, the content provider may provide (or have provided) advertising content (e.g., graphics, photographs, videos, audio, text, coupon, and/or other content) for a brand controlled by the content provider. Optionally, the content provider may be acting on behalf of an entity that has a brand (e.g., a brand for clothing, food, entertainment, vehicles, electronic devices, housewares, etc.). The master user may set up one or more sub-accounts to provide certain other users with access to certain functionality and/or content, but not other functionality of content. For example, if master user is at a company that controls a given brand, the master user may create additional users with different levels of assigned functionality, such as campaign management, content management, financial management, and/or reporting/analytics generation.

By way of further example, a content provider that has a brand (or is acting on behalf of such an entity), may create an account for a "digital ad agency" entity to enable the entity to manage content and campaign on behalf of the brand. The digital agency may also be enabled to create an account for a "brand entity" (e.g., a company with one or more brands) to manage associated content and ad campaigns. Optionally, the brand entity may be enabled to create multiple sub-user accounts and associate such accounts with respective specific brand(s) of the brand entity. Optionally, an interface may be provided that enables a brand entity to designate a master account which may share management of campaigns and content across multiple brands.

A digital agency acting on behalf of the brand entity may optionally be enabled to create multiple sub-user accounts and associate such accounts with respective specific brands of the brand entity, to thereby provide segmented accounts. A digital agency may optionally be enabled to specify a master account to share management of campaigns and content across multiple brands with personnel at the digital agency (who may be managing campaigns and content for multiple brands) and/or with brand entity personnel. Thus, such segmented accounts may be shared with the brand entity personnel (with different levels of assigned functionality) so that the brand entity is able to monitor campaign activity in real or near real time (e.g., between about 0.01 second-15 minutes delay) along with the digital agency, providing a high level of transparency and visibility. By way of further example, a master user/super administrator at a digital agency may be enabled to create additional user sub-account with different levels of assigned functionality, such as ad campaign management (e.g., creation and editing of campaigns), content management (e.g., upload and deletion of content), financial management (e.g., financial history, payment preferences, etc.) and ad spend management, and reporting/analytics. As discussed elsewhere herein, a digital agency may upload content to a library associated with an account (e.g., a brand account). Optionally, the brands may be inhibited from deleting content uploaded by the digital agency. If the digital agency is removed from the content, optionally, the content uploaded by the digital agency will not appear in the account library.

Optionally, the system may enable a content provider to bid in an ad placement auction. For example, an auction may be conducted that is used to determine what content is provided for display/reproduction on which tablet-charging station or set of tablet-charging stations. An ad auction engine may determine which content is displayed on which tablet-charging station or set of tablet-charging stations. The determination may be based on several factors including bid amount, content provider target specifications, estimated action rates (an estimate of how likely a given consumer of the content is likely to take a desired act (e.g., click on a link), and/or content relevancy to a content consumer.

For example, a content provider (or an entity acting on its behalf, such as a digital agency) may bid on tablet-charging station time slots for placement of content (e.g., advertising). By way of example, a user interface may be provided via which a content provider may specify some or all of the following with respect to desired content targeting:

timing information with respect to desired placement slots (e.g., day of the week/month/year, weekday/weekend, holiday(s), non-holidays, time of day (e.g., specific hours, range of hours, prime time/non-prime time, etc.);

tablet-charging station location (e.g., address, block, zip code, etc.);

number of tablet-charging stations available to receive content at the specified tablet-charging station location;

type of business at which tablet-charging station is located (e.g., restaurant, hospital, clothing store, airport, hotel, doctor's office, etc.);

tablet-charging station user demographics (e.g., age, gender, income, residential address, congressional district, profession, etc.);

content frequency (the number of times a given item of content is to be displayed to a user);

content placement time available based on content run time;

spend limit (for the campaign);

CPI limit (for the campaign);

CPA limit (for the campaign);

user's historical emotional response to content of a similar type; and/or other bid parameters.

Optionally, the system may enable the user to specify a different subsets of the foregoing criteria for different types of campaigns. For example, the system may enable the user to specify run time windows for a first type of campaign, and not permit the user to specify run time windows for a second type of campaign.

Figure 8:
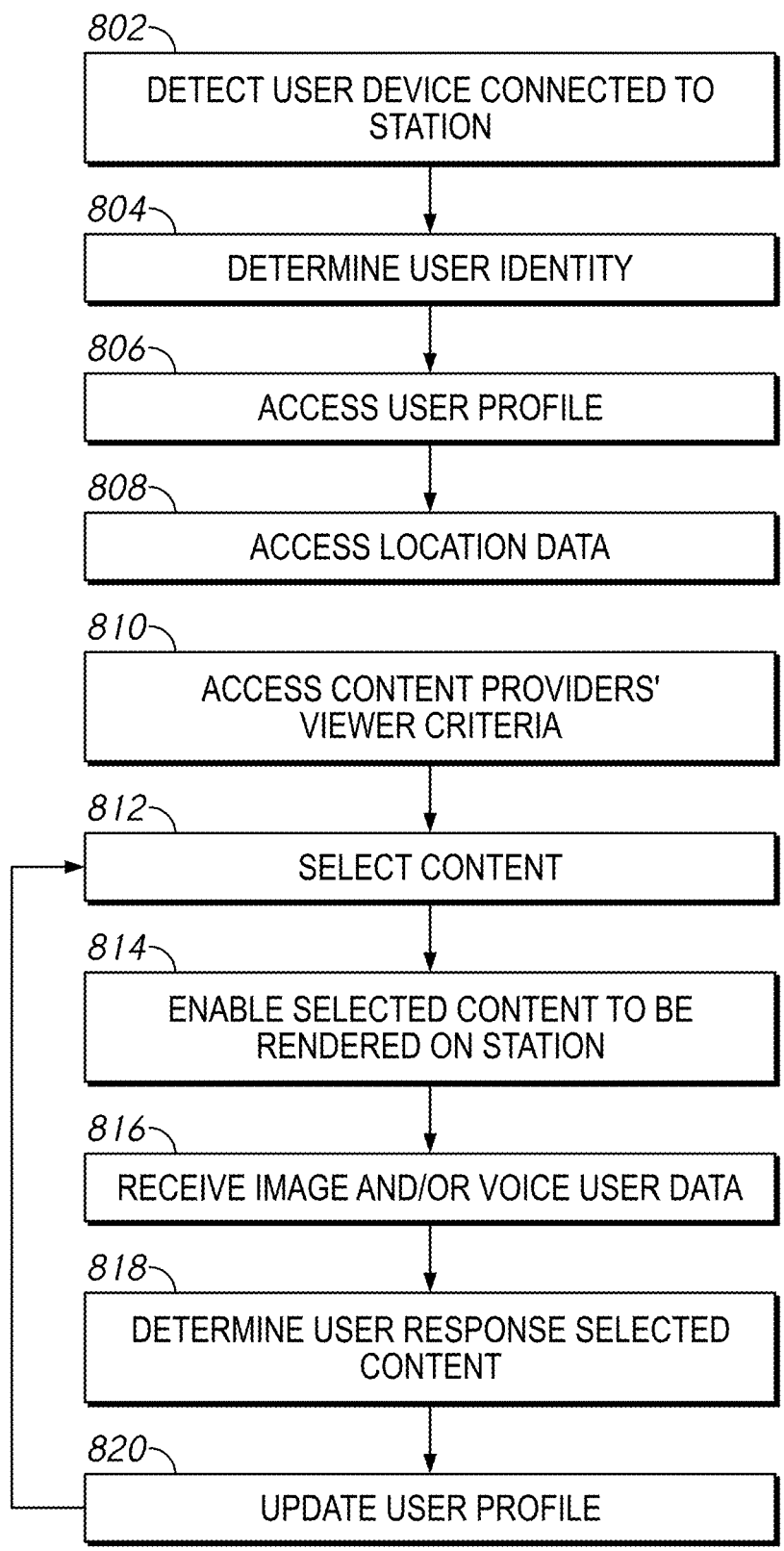
FIG. 8 illustrates an example process for selecting and rendering content.

FIG. 8 illustrates an example process for selecting and rendering content. At block 802, the process detects when a user device (e.g., a phone or tablet) is connected to a station (e.g., for charging). At block 804, the process anonymously identifies the user. Anonymous identification, in this sense, does not mean identifying the user by name, contact information, or the like. Rather, anonymous identification in this context means using biometrics of the user (e.g., an image of the user as similarly discussed elsewhere herein, a voice print, a fingerprint, an eye print, or the like) to identify a record associated with the user without personally identifying the user. However, optionally a user may be personally identified (e.g., by receiving an email address and/or name of the user).

At block 806, the anonymous identification of the user is utilized to access an associated record or records, which may include profile information associated with the anonymous user. The profile information may include, by way of example, historical content likes, dislikes, emotions, content interactions, locations at which the user accessed stations, inferred demographics of the user (as similarly discussed elsewhere herein) and/or the like. At block 808, location data is determined. For example, location data may be received from the station (e.g., GPS, Wi-Fi, or other location). In addition or instead, the location may be determined using a station identifier received over a network at the system from a station, wherein the station identifier is used to access location information stored in association with the network identifier (e.g., where the location information may correspond to a location designated for placement of the station, which may or may not be the actual location of the station).

At block 810, the viewer criteria specified by one or more content providers is accessed from a data store. For example, the criteria may include demographics (e.g., age, gender, etc.), historical user interactions with content, user content preferences (e.g., as determined from user provided likes, dislikes, evidenced emotions, eye tracking, and/or the like), locations of tablet-charging stations, charge levels of tablet-charging stations, charge level of user devices connected to tablet-charging stations, user emotions as detected via user images, eye tracking, and/or voice input, time of day, and/or other information At block 812, the user profile information is compared to the criteria specified by the content providers to determine a match (e.g., a closest match). If there is a match, the content specified by the content provider whose criteria matches the user is selected.

At block 814, the selected content is streamed to the tablet for display to the user. Optionally, if the content has previously been downloaded to the station, a command is transmitted from the system to the station to play the content.

At block 816, images and/or voice recordings of the user are received while the content is displayed. For example still or video images of the user may be captured by the tablet computer and the images (or facial feature data derived from the images) streamed over the network to the remote system for analysis. In addition, or instead, voice input from the user may be captured by the tablet microphone and transmitted to the system. Optionally, manual like or dislike indications provided by the user (e.g., by activating a like or dislike control displayed in association with the content) may be received by the system from the tablet.

At block 818, the user response to the content is determined in real time or at a later time. For example, as discussed elsewhere herein, the user emotional response and interest in the content may be determined by analyzing the images of the user captured while viewing the content, tracking of the user's pupils, user voice input, and/or user activation of like/dislike controls. At block 820, the user response is utilized to update the user profile to further refine the user content preferences, and the update is stored in the corresponding user record.

As noted above, optionally, an auction may be conducted via which content providers may bid to have their content displayed on terminals (where a given display opportunity may be referred to an impression). One or more algorithms may be utilized to achieve a combination of optimized auction bid revenue and optimized possible placement of content. Optionally, the highest bidder for given impression will be awarded the impression. A content provider may provide compensation to provide compensation for awarded impressions using a financial instrument provided by the content provider or using credited amounts from previous campaigns (e.g., where all specified ad spend was not achieved in previous campaign).

Optionally, the system may detect if a tablet-charging station on which an item of content was to displayed was unable to display the content (e.g., because the tablet-charging station was discharged, was set to a do not disturb mode, was inaccessible via WiFi, was broken, etc.). The system may provide a corresponding credit to the winning bidder whose content was to be displayed on the unavailable tablet-charging station. Such credits may be tracked and reported to the content provider/digital agency, and optionally may be used for future bids.

As discussed above, a content provider may be able to add content to a content library/database in association with the content provider's account. User interfaces may be provided via which the content provider may edit, update, and/or remove digital content from the content. Examples of digital content may include digital photographs (e.g., in one or more of the following formats: JPEG, TIFF, RAW, PNG, etc.), graphics (e.g., in one or more of the following formats: TIFF, JPEG, GIF, PNG, RAW, etc.), video (e.g., in one or more of the following formats: MPEG/MP4, MOV, AVI, FLV, WMV, etc.), and audio content (e.g., MP3, Advanced Audio Coding, Ogg Vorbis, FLAC, etc.). Thus, content providers are provided interfaces and tools that enable them to create and curate a library of content on stored in a content database (which may include links to separately stored files). A content provider may optionally add metadata to be associated with an item of content, such as a title, length, actors, date, subject matter, and the like. The content provider may also specify a campaign the content is to be used for. Such metadata and campaign association may be stored in association with the content. If the content provider is an ad agency, optionally, when the agency is removed from an associated brand account, the content uploaded by the ad agency will no longer be included in, and will be disassociated from the brand content library.

Figure 6:
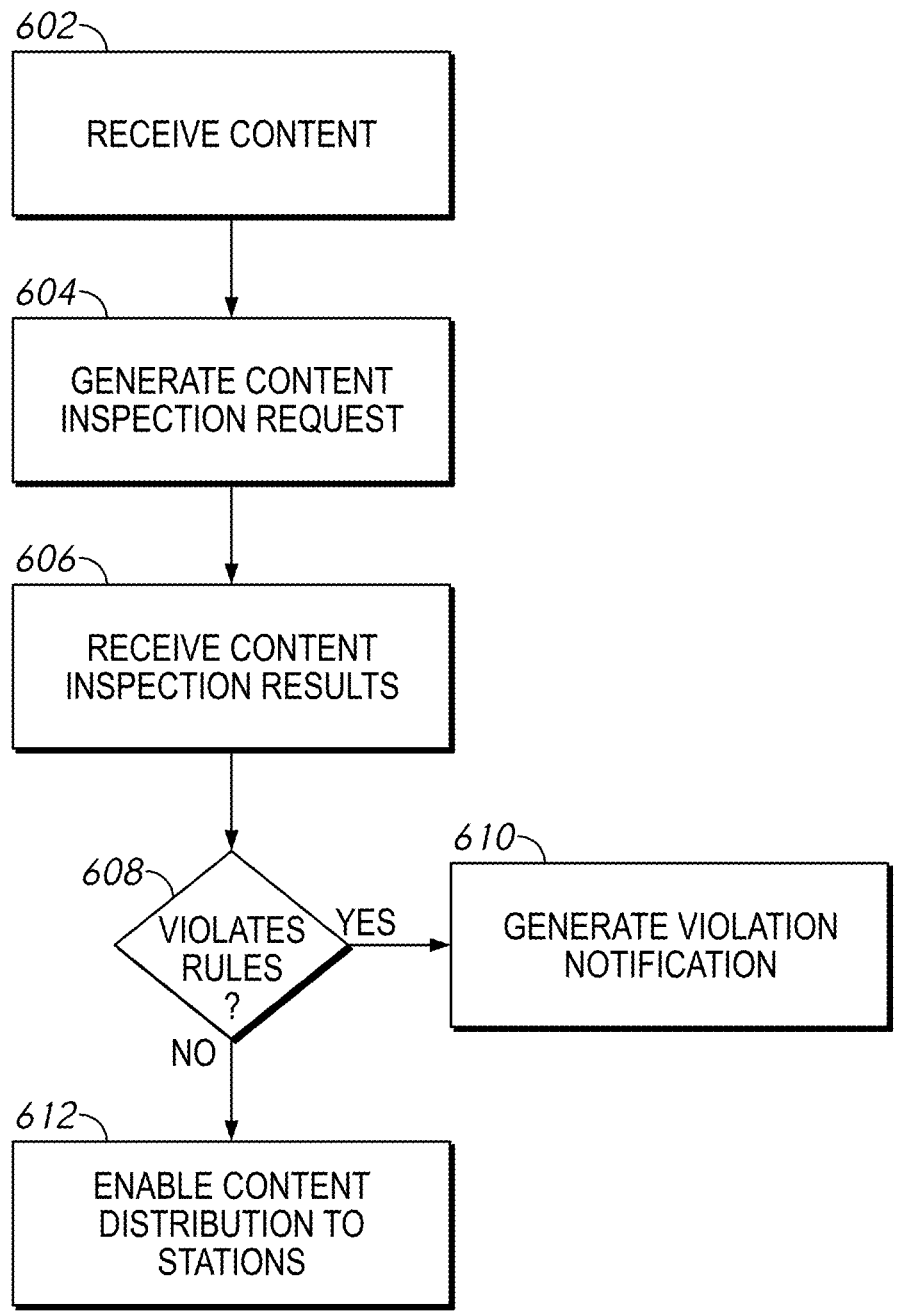
FIG. 6 illustrates an example process for inspecting content.

Optionally, as discussed elsewhere herein with reference to FIG. 6, to ensure that content submitted by a content provider does not include inappropriate content, the system may utilize an internal video analysis engine or access a third party image analysis engine (e.g., GOOGLE SAFESEARCH detection system, MICROSOFT content moderator, or other systems) via an API, to request that the content be analyzed for one or more types of objectionable content, such as offensive language, nudity, violence, graphic medical images, and/or other objectionable content.

If objectionable content is not identified, the content may be added to the content library for later display via tablet-charging stations.

Optionally, prior to such objectionable content analysis, the content is tentatively added to the content library, with a distribution indication indicating that the content is not to be distributed for display on tablet-charging stations, pending such analysis. Once the analysis has been performed, a determination is made as to whether objection content has been identified. If objectionable content is not identified, the distribution indication may be changed to one that indicates that the content may distributed for display on tablet-charging stations. Optionally, if objectionable content is identified, the distribution indication may be changed to one that indicates that the content does contain objectionable content and is not to be distributed or the content may be deleted from the library. Optionally, if objectionable content is identified, a corresponding notification may be generated describing the type of objectionable content that was identified (e.g., offensive language, nudity, violence, and/or graphic medical images) and indicating the content is not eligible for display on the tablet-charging stations. The notification may then be transmitted to the content provider (or digital agency) at the designated electronic address (e.g., email, text message, and/or other address).

Optionally, prior to rejecting content that has been identified as including objectionable content, a notification may be transmitted to an administrator of the system to further review the content, and approve or disapprove the content for distribution for display on tablet-charging stations. Optionally, the administrator may suspend the content provider's account for policy violation in response to determining that the content includes objectionable content.

Optionally, the objectionable content analysis process may be initiated substantially immediately upon receiving the content from the content provider at the content library. Optionally, instead, the objectionable content analysis process can be performed at a later time, according to a schedule. For example, the analysis can be scheduled to be performed during a time period when the system and/or network resources are not being highly utilized for other purposes (e.g., between 2 AM-4 AM or other time period) to thereby reduce peaking system and/or network loading and enhance their performance.

Once content has been approved, it may then be utilized for display on tablet-charging stations. For example, if a content provider wins a bid in an auction to place content on one or more tablet-charging stations, the approved content may be accessed from the content provider's content library and transmitted to appropriate tablet-charging stations. The same item of content may optionally be played on multiple tablet-charging stations at the same time or at different times. The timing of the display of content may be that specified by the content provider (e.g., by the content provider whose bid won an impression auction, as similarly discussed elsewhere herein) and/or may be intermittently displayed during time periods when other content is not scheduled for display.

Optionally, if an item of content is scheduled to be displayed at a specific time, the system may enable the content provider to replace the item of content with a different item of content. Optionally, the system inhibits such replacement within a certain time period/window prior to the scheduled content distribution and/or display.

FIG. 6 illustrates an example content inspection process. At block 602, content is received (e.g., from an advertiser, a location operator, or other source). At block 604, the process generates a content inspection request. The request format and destination may be selected based on the content type. For example, different inspection engines may optionally be used for text, video, and/or audio content. A given inspection engine may need to have requests formatted in accordance with an engine-specific API. A given inspection engine may optionally be operated by a third party entity. At block 606, the inspection results may be received. The inspection results may indicate whether the content contains objectionable material and if so, optionally the type of objectionable material (e.g., violent, sexual, etc.), and the degree to which the content is objectionable for each objection type. For example, the inspection results may indicate, on a scale of 1 to 10 (where 10 is the most objectionable), how violent and/or sexual the content is.

At block 608, content rules are accessed from a rules data store and a determination is made using the content inspection results as to whether the content violates one or more rules. For example, a rule for sexual content may indicate that any content that has a sexual rating of greater than 4 is a rule violation, while a rule for violent may indicate that any content that has a violence rating of greater than 6 is a rule violation. In one or more rules are violated, then at block 610, a do not distribute indication may be stored in association with the content, and a notification may be generated and electronically transmitted to the provider of the content indicating that the content will not be distributed and indicating why (e.g., for sexual content, for violent content, etc.).

If the content does not violate any rules, at block 612, the content is enabled for distribution to stations. For example, an indication may be stored in association with the content indicating that the content is approved for distribution. The content may then be distributed to appropriate stations (e.g., stations that satisfy criteria specified by the content provider, such as location, location type, profile of user viewing station, etc.).

The system may optionally provide content management capabilities to enable a content provider (or someone acting on its behalf, such as a digital agency), to manage active campaigns. The system may provide user interfaces that enable the content provider to select and view the content submitted/designated for campaigns, and view the status of content (e.g., approved, disapproved, pending review, available for distribution, etc.) as reported by the system.

The system may optionally provide user interfaces that enable the content provider to access and view some or all of the following current campaign status information generated by the system:
  currently running content (e.g., ads) for the campaign;
  total number of content impressions to date (e.g., content runs, view impressions, and/or the like);
  total campaign spend to date;
  remaining campaign content impressions to be satisfied;
  remaining campaign budget.

The system may optionally provide user interfaces that enable the content provider to dynamically modify certain aspects of a campaign. For example, the system may enable the content provider to:
  increase or decrease the maximum campaign CPI and/or CPA;
  increase or decrease the number of desired content impressions;
  increase or decrease the remaining campaign budget (which may then result in an increase or decrease in resulting content impressions);

suspend the campaign (optionally, if a campaign is suspended a credit may be provided to the content provider's account; optionally a refund may be provided; optionally, neither a credit nor a refund is provided for a suspended campaign);

remove content from an active campaign (which such removal may be inhibited within a certain time period prior to a scheduled content distribution and/or display);

substitute content in an active campaign (which such substitution may be inhibited within a certain time period prior to a scheduled content distribution and/or display).

Optionally, the system provides tools and user interfaces that enable a content provider to calculate a campaigns return on investment (ROI) based on one or more criteria. For example, the ROI tool may determine and indicate the results of sniper targeting, where an item of content is targeted to a specific user or tablet-charging station, at a specific location and a specific period of time (e.g., a tablet-charging station in a bar at happy hour between 5 and 7 pm). The ROI tool may determine and indicate user responses to rewards and offers provided by or in association with the content. The ROI tool may determine and indicate the count of content impressions and eye (e.g., retina) scans, and facial expressions. Thus, the ROI tool may provide a very in-depth analysis on the metrics of a campaign.

As noted elsewhere herein, the system may perform analysis on various detected and collected data, and may generate reports using such analysis, optionally in real time. The reports may be provided to the system operator, a location owner/operator, and/or a content provided.

The detected, collected, and/or reported data may be filtered via a provided filter interface that enables a user to have filters applied to limit the analysis and/or reports to specified range of times and specified categories, and/or to exclude specified range of times and categories. For example, the filters may filter by specified station(s), location(s), brands, name (or other identifier) of establishment, name (or other identifier) of establishment operator, name (or other identifier) of establishment owner, operating hours (e.g., a range of hours or having a status of currently opened or currently closed), establishment type (e.g., restaurant, clothing store, jewelry store, retail store, gym, yoga studio, hotel, hospital, airport, doctor's office, lawyer's office, accountant's office, professional office, etc.), and/or the like. The user of such filters may reduce the amount of data that need to be processed (hence reducing server processor load), the amount of data being transmitted to a terminal for display (hence reducing network bandwidth utilization), and the amount of data being displayed (hence conserving display area).

For example, for a given campaign (e.g., an ad campaign), the system may detect and track, subject to specified filters, the number of associated content plays, number of user devices (e.g., user phones) connected to the tablet-charging stations during associated content plays, total campaign spend, the ratio of total campaign spend to content views/impressions (e.g., CPI), number of user interactions per interaction type (e.g., number of number of free drink responses, survey responses, detected emotions (e.g., detected happy user voices (while a specific item of content is playing, as determined using voice capture and analysis), detected happy facial impressions (while a specific item of content is playing, as determined using facial impression capture and analysis)), redemptions, and/or other data discussed herein. The system may optionally detect and track how many items of content were shown at each location on tablet-charging stations (e.g., while connected to user devices, such as for charging). The system may optionally rank locations based on how many items of content were shown (e.g., from highest to lowest or lowest to highest). The system may optionally rank CPIs achieved (e.g., from lowest to highest or highest to lowest) at locations.

The system may determine and report, optionally in real time and subject to specified filters, the placement of content on stations (e.g., currently or over a specified range of time) in a selected territory (e.g., a geographical area, a set of commonly owner or operated locations, or other selected territory).

The system may determine and report, optionally in real time and subject to specified filters, the revenue via the stations within a specified managed territory.

As noted above, optionally content may be provided by advertisers. Additional examples will now be provided with respect to ad campaign set up and management. A campaign dashboard may be generated and provided for display. For example, the generated campaign dashboard may include a control enabling a user to create a new campaign.

In addition, the generated dashboard may include a table of future campaigns, current campaigns, and/or previously run campaigns. The table may include some or all of the following columns or row: Campaign name, Campaign Type, associated Brand, associated Sub-brand, Start date, Status, Current Spend, Budget, Number of Impressions, Number of Missed Plays.

Optionally, the campaigns and campaign data presented may be filtered based on the user's authorization level. For example, for a user authorized to access a master account, data for all campaigns may be provided for display. By contrast, for Brand accounts, for users only authorized to access sub-accounts, campaigns and related data associated with the master brand will be provided for display only if assigned to the sub-account or only for the sub-brands assigned to the sub-account.

With respect to digital agencies, optionally users of sub-accounts will only be provided with information on campaigns for the master account or only assigned brands as set up in the account.

Optionally, the credits associated with an account, sub-account and/or brand may be accessed and displayed.

For a given brand, campaigns and associated data for the brand may be provided for display in the campaign management panel when set up by a digital agency.

Optionally, campaigns created by a given digital agency are included in the presentation displayed to the associated brand, even if the digital agency that created the campaign is no longer authorized to access the account. However, optionally, a given digital agency maintains control over their own content libraries.

In response to a user activating the campaign creation control, a user interface may be provided that enables the user to perform some or all of the following. The user may be enabled to define for the campaign a booking type such as:

Booked, wherein Booked time will be pre-paid. Booked time may be pre-sales (where certain slots are provided to preferred customers prior to making the slots available for purchase or bid to public bidding/purchase), or last minute (e.g., within 24 hours or other specified time frame) depending on when the user sets up a campaign.

Bid ads, which may optionally be set up at any time and may optionally be adjusted (e.g., on a day to day basis).

A bid ad booking may be used to secure slots in advance of the content display date.

Intelligent ads, which may optionally be set up at any time and may optionally be adjusted (e.g., on a day to day basis). Optionally, an intelligent ad booking is not used to secure slots in advance of the content display date.

Special event ads may be used for specific events that take place over a limited defined window of time set or confirmed by an authorized user (e.g., an NOC administrator). An advertiser may select for a list of events to access eligible locations and make a special event ad booking. Optionally, on electing to book special event time, a search user interface may be provided enabling the advertiser to for specific events and/or by specifying a desired date range and geographical criteria (e.g., city, state, zip code, and/or the like). A special event listing may include some or all of the following data: event name, start time, end time, and/or price per specified time slot length. The advertiser may select one or more listed special events to bid for.

Once a particular booking type of campaign is selected, the user may select, via the user interface, a campaign type (e.g., an image campaign, a video campaign, etc.). For example, the user may select an image campaign (which optionally may include a single figure). A user may select a video campaign, where a video campaigns includes video content. Optionally, the video content may include a series of static images. The user may add a survey to the different campaign types. A link may be provided to a video guiding the user in slot length planning for surveys.

A description of the booking and ad set ups pre-sales and last minute ads will now be provided. When a user activates a campaign creation control, the system may detect whether the current sales period is in a pre-sale period or a last minute booking period. A "book ad" space user interface may be provided the current period.

If the system determines that the user is a digital agency user, the user interface may enable the user to a optionally select an associated brand and/or sub-brand for which the campaign is to be created. Optionally, the user may skip the brand selection step.

Optionally, the list of campaigns from which the user can select is filtered to only include brands and sub-brands that the user is authorized to access.

If the user is a brand user, the user can specify, via a user interface (e.g., an interface that includes a list of digital agencies or text fields configured to receive a digital agency name, email, etc.), which digital agency is authorized to manage a campaign for the brand or sub-brand.

A user interface is provided via which the user can specify (e.g., via text fields or via selection from a menu options) some or all the following criteria:

Location details: including some are all of the following: business category, business type, business sub-type (which may be automatically selectively displayed upon selection of the business type), district type, city, zip code, state;

Demographic details: including some are all of the following: age, gender, income, education, gender, family status;

Run time windows;

Peak hours;

Prime time/Non-prime time;

By time slot (e.g., hour time slots, 30 minutes time slots, 15 minute time slots, etc.);

Slot length (e.g., in units of 15 seconds) (where the system may, in response, display the lowest and highest floor price per slot length for the specified campaign dates);

Start and end dates;

Minimum and maximum frequency of ad placement;

One or more exclusion options.

The user may specify that locations are to be excluded that have less than a specified ratio of the total number of slots that match the other specified criteria over the total number of possible slots over the length of the campaign. The possible slots may consist of slots for a location's opening hours (e.g., if a user wants to run ads from 10 to 11 AM and the store opens at 10:30 AM, the number of potential slots would be half the allotted slots for the hour).

The user may specify that locations are to be excluded that do not have bookings available for one or more specified.

After the criteria and exclusions are specified, the system may search for matching locations and generate search results which may be displayed via a user interface. The user interface may also display summary data including, for example, the number of matching locations, number of available devices at the matching locations, number of slots requested, and/or the number of available slots. The user interface may enable the user to select locations from the matching locations, devices at the matching locations, and slots from the available slots. Based on the user selections, an estimated cost may be calculated, and the estimated cost may be provided for display. In addition, a bid user interface may be provided enable the user to bid for placing content at the selected locations. The user interface may enable the user to specify the maximum the user is willing to bid for a time slot The system may generate and display, in response to a user instruction, reports and analysis. For example, the report may include a price analysis for one or more time slots specified by the user and may include updated estimated costs for displaying content for a given timeslot. The update may be performed in real time and the update may be based in part on current auction bids for the slot. The report may also display the name (or other identifier) and/or address for qualifying locations. The user may select one or more locations (e.g., via associated checkboxes), and in response a location profile or a link thereto may be presented. The location profile may include location-related data, such location name, city, state, zip code, business type, number of devices, prime times (the time periods when the location tends to have the most customers), the demographic profile of customers (e.g., average or median ages, income levels, education levels, gender composition), opening hours, closing hours, and/or percentage of slots available (e.g., as a percentage of the maximum slots requested (for a corresponding date range) based on the specified frequency range). Optionally, the foregoing may be presented via a pop-up user interface. Optionally, the user may select a certain item of information, and additional related information may be presented.

For example, in response to the user selecting the availability item, a calendar view may be generated and provided for display for selected locations. For example, the calendar view may include rows and columns. A given column may display a day in the specified date range, while a given row may display the data of a selected location. Optionally, a given row may be subdivided into selected windows of time in which to run an item of content. A given cell may whether the specified desired frequency range is met or not. For each specified location, the availability percentage may be indicated. The user interface may enable the user to select some or all of the locations and add to the locations to a requested booking. The selected locations may booked for all eligible days within the specified campaign date range (optionally for the maximum possible frequency). Optionally, the user interface may enable the user to exclude specific days or adjust the frequency for specific days. Optionally, for a given location booking, the devices at the location will be set to the same content playback schedule.

The system may run a secondary availability check and confirm the final number of views and locations booked, as well as the final cost. Some or all of the foregoing data may be displayed via a generated confirmation page. Booking discounts may be provided for certain content providers or for certain locations. The system may access discount specifications and determine if any discounts are applicable to the current booking. If there are multiple applicable discounts, the system determines if they may be applied cumulatively or if only one discount may be applied. If there are multiple available discounts and a determination is made that only one discount may be applied, the system may determine which is the highest value discount, and may apply such discount, and display such discount. If there are multiple available discounts and a determination is made that the discounts may be applied cumulatively, the system may apply each of the discounts, and calculate and display the total discount.

If the system detects a change in available slots, a corresponding availability change notification may be generated and presented to the user. A user interface may be provided that enables the user to re-specify the desired booking. A user interface may be provided via which a content provider may provide payment information for a booking. Once the user has entered in the booking specifications and payment information, the user will be provided with user interfaces enable the user to provide or select media for the campaign, and to launch the campaign.

Figure 9:
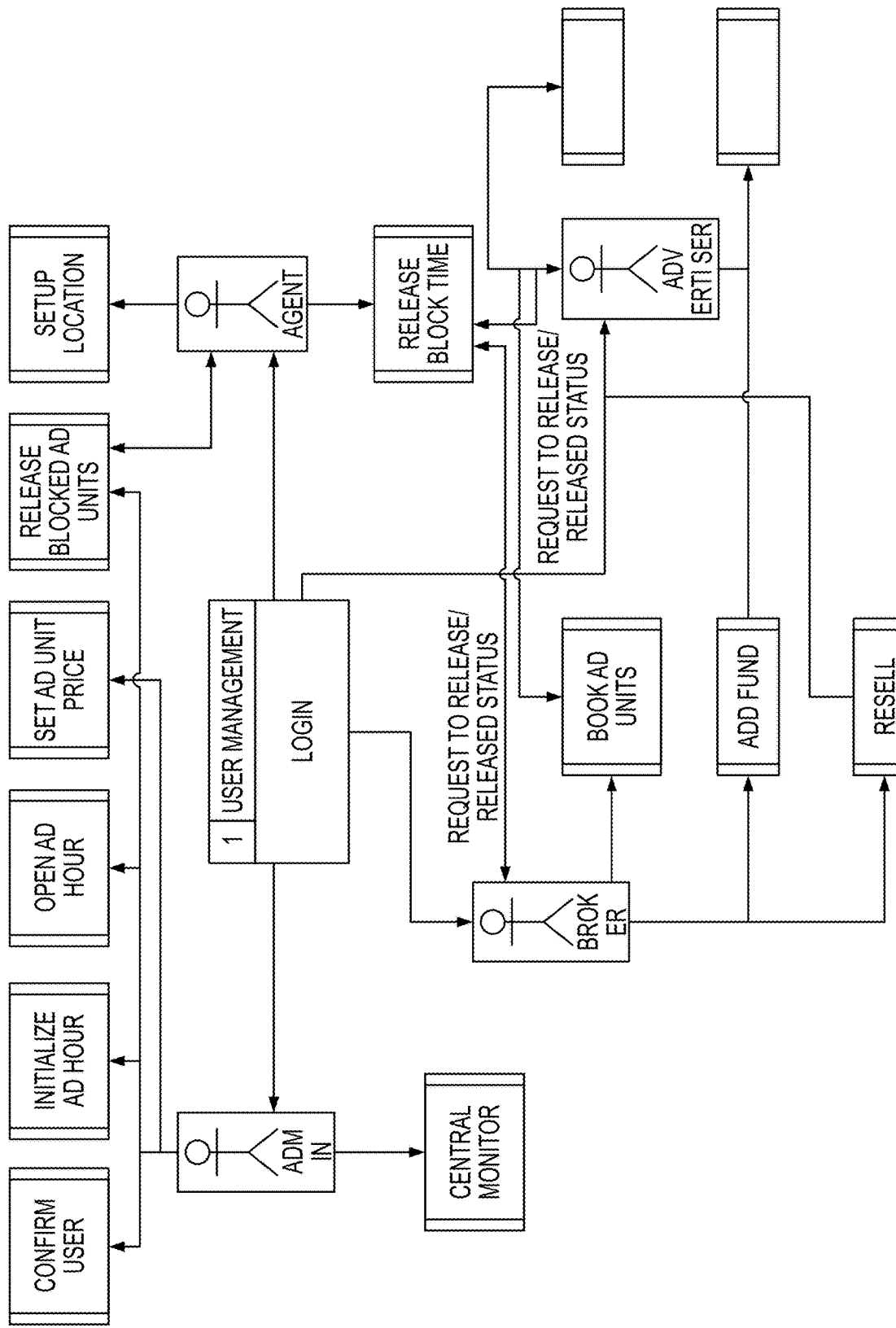
FIG. 9 illustrates an example process flow.
Figure 10:
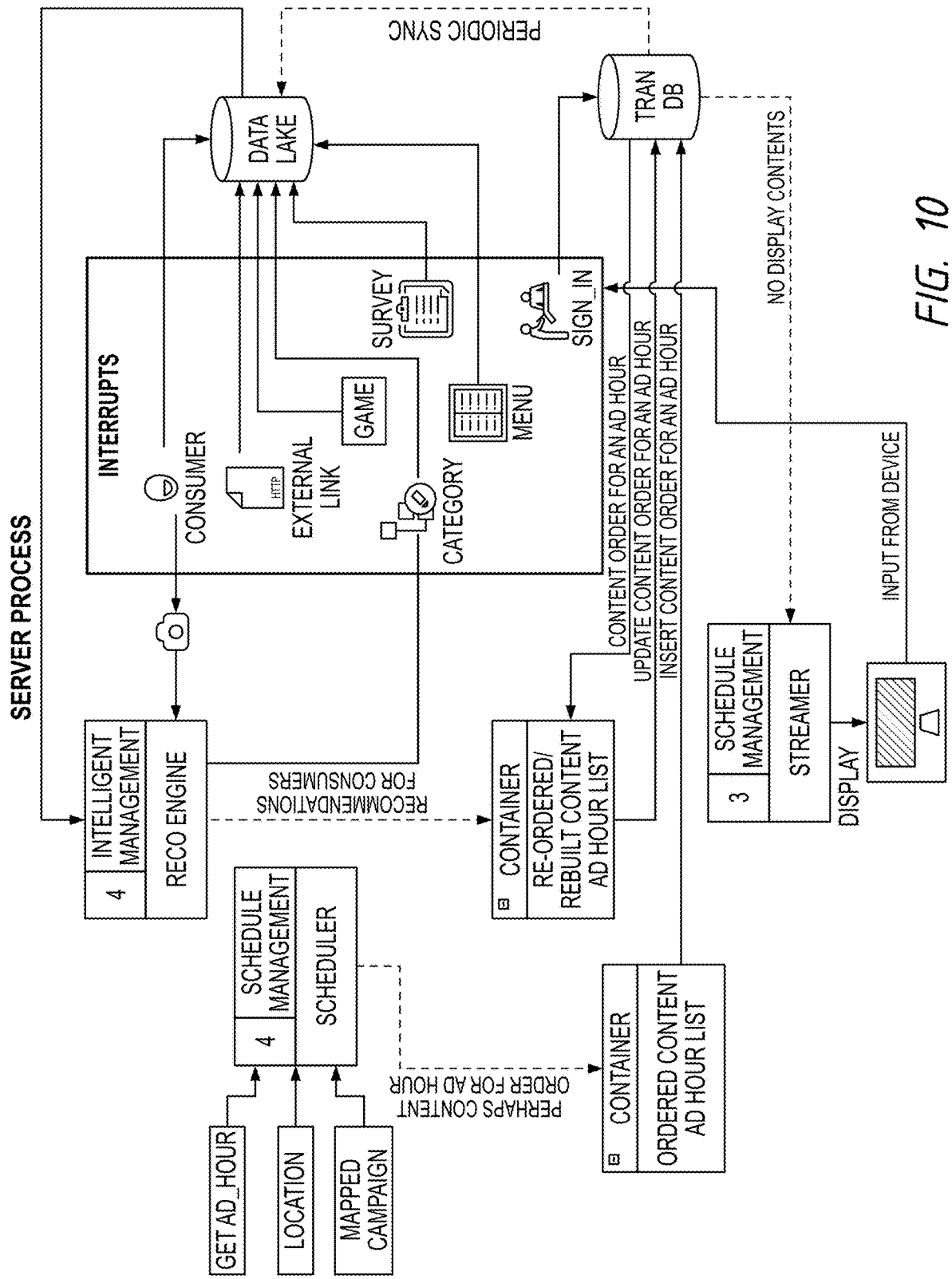
Figure 11:
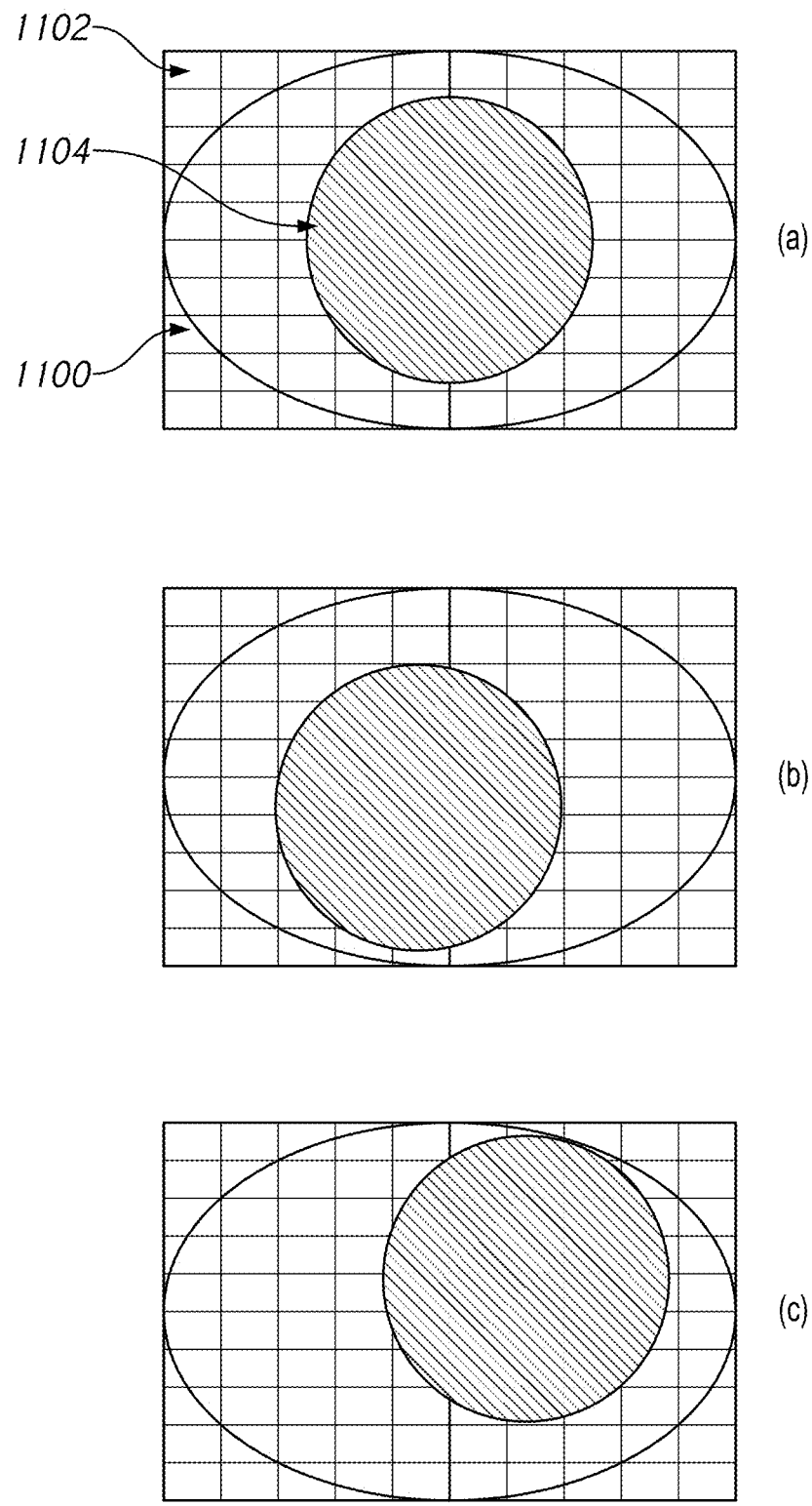

FIG. 9 illustrates an example process involving administrator functions, broker functions, and content provider (e.g., advertiser) functions. An administrator may confirm a user (e.g., an advertiser or broker) to enable the user to utilize the system, initialize ad hours (where the administrator defines content time slots for corresponding dates/times, but the time slots are not yet available for purchase), open ad hours, set ad unit prices, release ad hours (so that they are available for booking or auction, or are reserved for later release), and setup locations (causing a certain number of stations to be placed at a given location). Different administrators may be authorized to perform certain of the foregoing functions, while not being authorized to perform certain other of the foregoing functions. For example an administrator agent may be authorized to setup locations and request from a different administrator that ad units be released. A broker and/or content provider may in turn request from the agent that ad units be released. A central monitor may be provided that displays in real time the current status of stations at one or more locations (e.g., out of service, in service, needs charging, currently in use etc.).

A broker (who purchases time/slots (e.g., ad units) for resale), may purchase ad units, pay for ad units, ad funds to the broker's account for purchases, and resell ad unit. A content provider (e.g., advertiser) may similarly purchase ad units, pay for ad units, ad funds to the content provider's account for purchases, and purchase ad units being offered for resell by a broker. The content provider may also create and upload content for distribution and display on stations, and may map the content to slots and/or locations.

Figure 10:
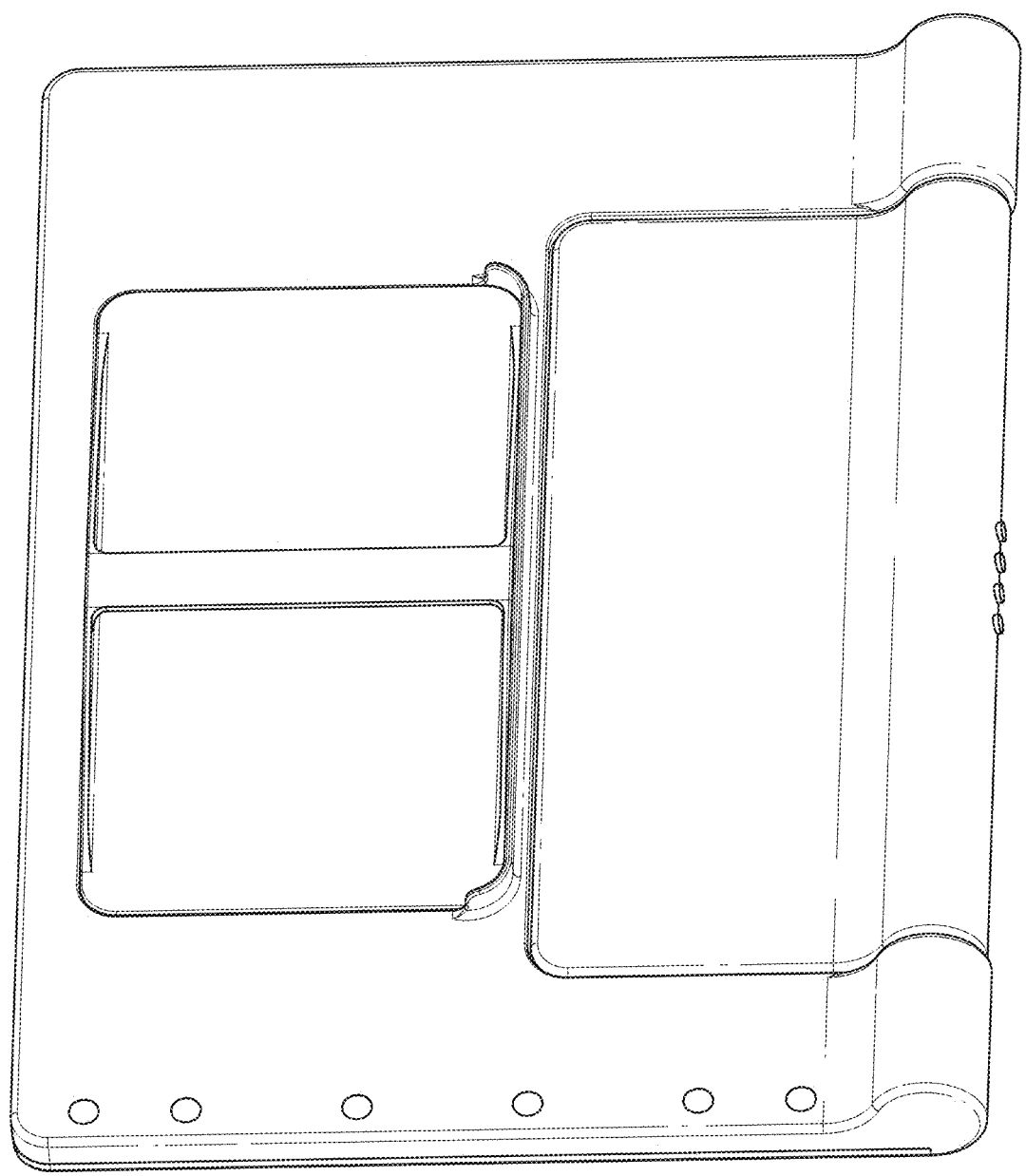
FIG. 10 illustrates an example backend process flow.
Figure 10:
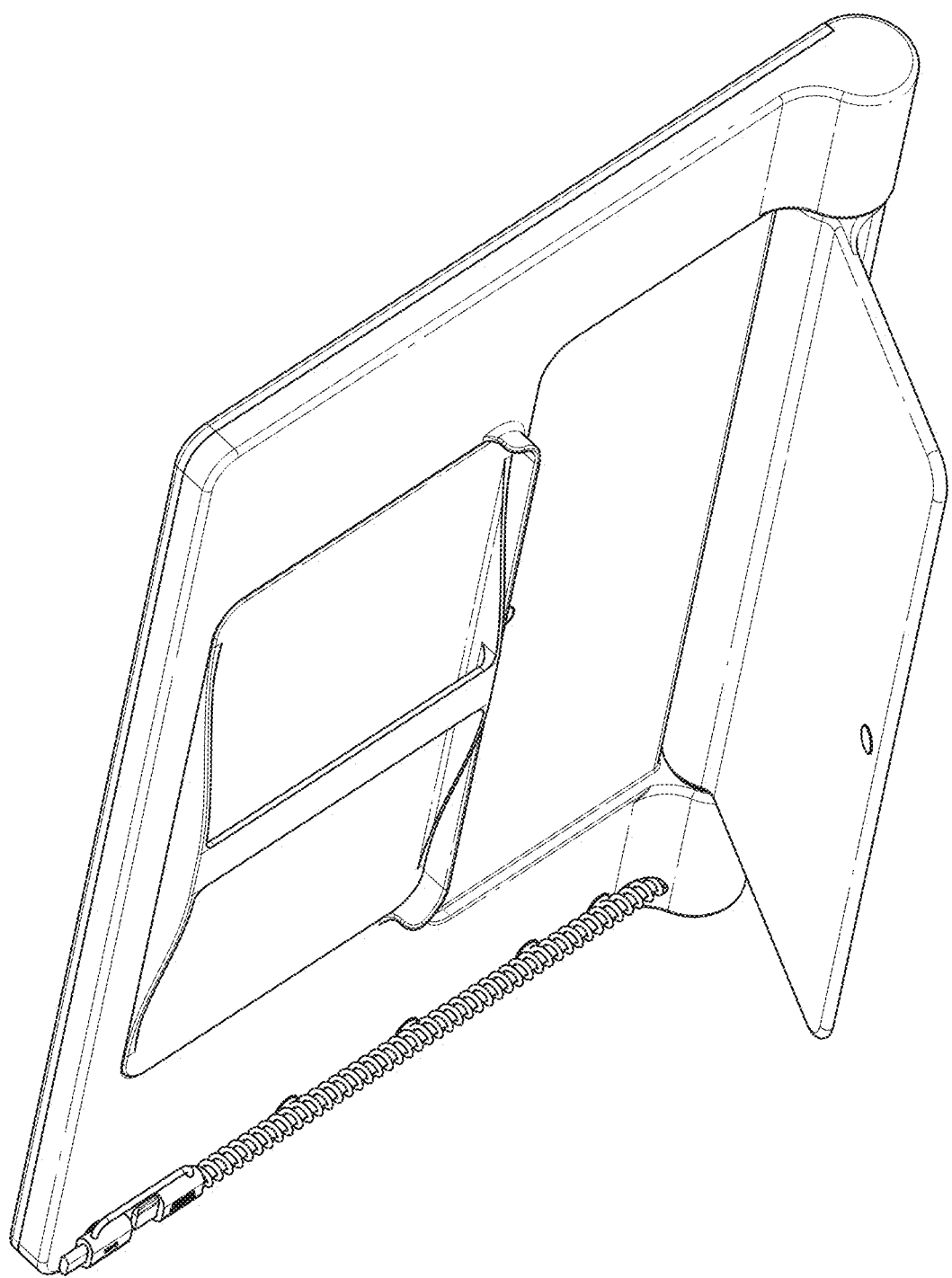

FIG. 10 illustrates an example backend process flow which may be executed using a server (which may be in the form of a cloud based distributed system). The process may execute scheduling services, streaming services, recommendation services, and interrupt processing. For example, the schedule may input information regarding ad hours (e.g., which ad units have been released), locations (e.g., which locations have stations and the number of stations per location), and campaign mappings of content to time slots/locations. The scheduler determines which campaigns have content that need to be displayed on a particular ad hour at particular location. Based on the scheduler inputs, the scheduler determines an order of content presentation (a content list), and provides the content list via a container component to a transitional database. The transitional database provides the content in the designated order to the streaming component with an instruction to stream the content accordingly to the designated stations. The stations display the content, receive user input (e.g., facial, eye, vocal, touch input), and transmit the inputs to the interrupt service. User inputs may be stored in a data store (sometimes referred to as a data lake). Example user inputs include user login information, user inputs to a game application, user selections of menu items, user activations of links associated with content displayed on respective stations, user gaze tracking, user facial features (e.g., used to recognize the user and to determine user emotions), and the like. The transitional database and data lake may be periodically synchronized. The foregoing user inputs may be received by the recommendation service.

The recommendation service may use the inputs to determine whether the content list should be re-ordered. If the recommendation service determines the content list should be re-ordered, the recommendation service may reorder the content list, and provide the content list via a container to the transitional database. The transitional database provides the content in the designated order specified by the reordered content list to the streaming component with an instruction to stream the content accordingly to the designated stations.

As discussed above, a user may specify bids for placing content. Optionally, if there is a floor price set (e.g., for a given slot), the user may specify a bid as a percentage above the floor price. Optionally, the user interface enables the user to specify bids on individual locations, by location category, by business type, by price tier (e.g., premium, mid, low), across all locations, across all locations in specified territories, and/or the like.

The system may optionally determine and provide for display the highest bid percentage to indicate which location received the most number of bids, the highest bid rate (e.g., the number of competing bids coming in per time period, such as per hour), and/or the highest bid amount, applicable to each location, location category, business type, price tier, across all locations, and/or across all locations in specified territories.

The system may provide a user interface that enable a user to modify bids for a future bid cycle. The modified bids may then be applied future bid cycles.

Optionally, once a user has specified campaign criteria (e.g., timing and location related criteria), the content provider may set up their media, complete payments as needed, and initiate the campaign. For example, for an image campaign, the user may upload images that satisfy specified resolution criteria (e.g., maximum and minimum pixels for image width and height) and format criteria (e.g., TIFF, JPEG, GIF, PNG, Raw, etc.). For a video campaign, the user may upload videos that satisfy specified ratio criteria (e.g., 4:3 ration, 16:9 ratio, or other specified ration), format criteria (e.g., MPEG/MP4, MOV, AVI, FLV, WMV, etc.), and/or length criteria (e.g., less or equal than the specified time slot, or if a survey is to be provided after the video, at least a specified amount of time (e.g., 15 seconds, 30 seconds, 45 seconds, etc.) shorter than the specified time slot to enable sufficient time for a viewer to complete the survey). Optionally, if a survey is provided (for an image or video campaign), a control may be provided to viewers to enable them to skip the survey.

Optionally, a survey user interface is provided that enables a user to specify a survey. Optionally, the user may be restricted to specifying a single step survey. Optionally, the user may be enabled to specify a multi-step survey. The system may determine the availability of a single or multi (e.g., two) step survey based at least in part on options selected when creating a new campaign and/or selecting a booking time.

For a given survey interface that will be presented to an end user, some or all of the following may be specified via the survey creation user interface:

Title;
Questions (optionally, the user may be restricted to adding no more than a threshold number of questions, such as 2, 3, 4, 5, or 6 questions; optionally the threshold number of questions may be dynamically determined based on the types of questions a user is adding (e.g., multiple choice, single selection, etc.);
One or more question types (e.g., end user phone number, email, short text, multiple choice question, single selection question (e.g., a checkbox question), etc.);
Question text for a given question (optionally, a character limit may be specified or determined for optimal screen display and formatting and/or based on the total number and/or type of survey questions being added);
How long the survey is to be displayed (e.g., optionally in units of 15 seconds or other specified step size; optionally with a minimum and with a maximum period of time).

Optionally, a game specification user interface may be provided that enables a user to specify various game-related criteria. Optionally, only certain types of users (e.g., system administrators) may be enabled to access the game specification user interface. For a given game interface that will be presented to an end user, some or all of the following may be specified via the game specification user interface:

The URL of the game (for a web-based game);
The maximum amount of time for which the browser can remain open (e.g., specified in minutes and/or seconds);
Whether ads may override the browser-based game (whereupon, if ads may not override the browser-based game, on close of the browser, ads may resume);
an image (e.g., which the user may upload) for display to end users, where a button to launch the game may be displayed in association with the image, where the image and launch control will be displayed at the appropriate slot times, and upon an end user selection of the launch control, the system consider the game's time slot to be over.

Media can be selected from an existing media library hosted by the cloud-based system and/or media may be uploaded directly. Optionally, the same item of content may be used for multiple campaigns. As discussed herein with reference to FIG. 6, optionally to ensure that content submitted by a content provider does not include inappropriate content, the system may utilize an internal video analysis engine or access a third party image analysis engine (e.g., detection system, MICROSOFT content moderator, or other systems) via an API, to request that the content be analyzed for one or more types of objectionable content, such as offensive language, nudity, violence, graphic medical images, and/or other objectionable content. If objectionable content is not identified, the content may be added to the content library.

A campaign details user interface may be accessed by selecting among listed campaigns from the campaign management landing page. The campaign details user interface may be generated for the selected campaign that provides (e.g., for live and/or completed campaigns) campaign status (e.g., running, ended, suspended, paused), details and reports. Optionally, the campaign details user interface may enable a user to edit or suspend the campaign. Optionally, the campaign may be automatically suspended if any content for the campaign has been flagged as objectionable. Optionally, a system administrator may suspend a campaign by activating a suspend control. Optionally, if the system determines there are insufficient funds for a given campaign, the campaign may be automatically paused.

When an entity creates a campaign or purchases space on stations for the display of content (e.g., an advertisement), the entity may specify desired states, cities, location category, location sub-category, viewer demographics (e.g., age ranges, ethnicity, gender, income range), viewer interests (sports, cars, food, travel, clothing, makeup, jewelry, etc.), and/or the like. A user interface may be provided that enables the entity to specify a campaign start date, end date, slot (where a slot may be a specified period during the day, and where each hour may include a certain number of slots (e.g., where a slot may be 30 seconds, 60 seconds 2 minutes, 5 minutes, 15 minutes, 30 minutes, etc.)), frequency, and content length (e.g., in minutes, seconds, etc.).

An interface may be provided that enables whether the content must be shown during the specified slot or whether the system may flexibly adjust the timing of the content display (e.g., within a specified range). For example, if the entity enables the content to be flexible schedule control, the system may adjust the timing of the display of content to better match the specified demographics. By way of illustration, if the system detects that a viewer whose record indicates is interested in cars is viewing the tablet, car-related content that is scheduled to be shown in 30 minutes may be rescheduled to be shown immediately to ensure that the current viewer views the car-related content.

A user interface may be provided that enables the entity to specify different qualities of screen/page space for the display of content. For example, there may be 2, 3, 4, or more designated different designations (e.g., standard, default premium, custom premium) corresponding to a corresponding space or space quality. For example, a display or page area may be conceptually divided into a central area, a left area, a right area, a top area, and a bottom area, with different costs associated with different areas (e.g., based on the prominence of the area. A user interface may be provided that enables an entity to assign a label to a given purchase.

A user interface may be provided that enables the entity to map content provided by (e.g., created by or for) the entity to various purchased times and/or locations (referred to as slots herein). The system may determine which slots do and/or do not have content mapped thereto and calculate and render a percentage of slots that have and/or do not have content mapped thereto.

The system may determine what slots for a given location have been selected or are available, the slot cost, and/or the number of stations at the location. The system may also generate and populate a user interface showing, for a given location, a schedule of slots, slot availability, slot cost, the number of station, and/or other data. The schedule may be scrollable to show different slots.

Items of content may be scheduled to be shown sequentially on a given station. If no content has been mapped to a given slot and the slot has been purchased by an entity, then other content of the entity that has been mapped to different slots may be shown. Optionally, public service announcement, in-house content, default content, or other content may be shown during a slot that does not otherwise have content mapped thereto.

Figure 12A:
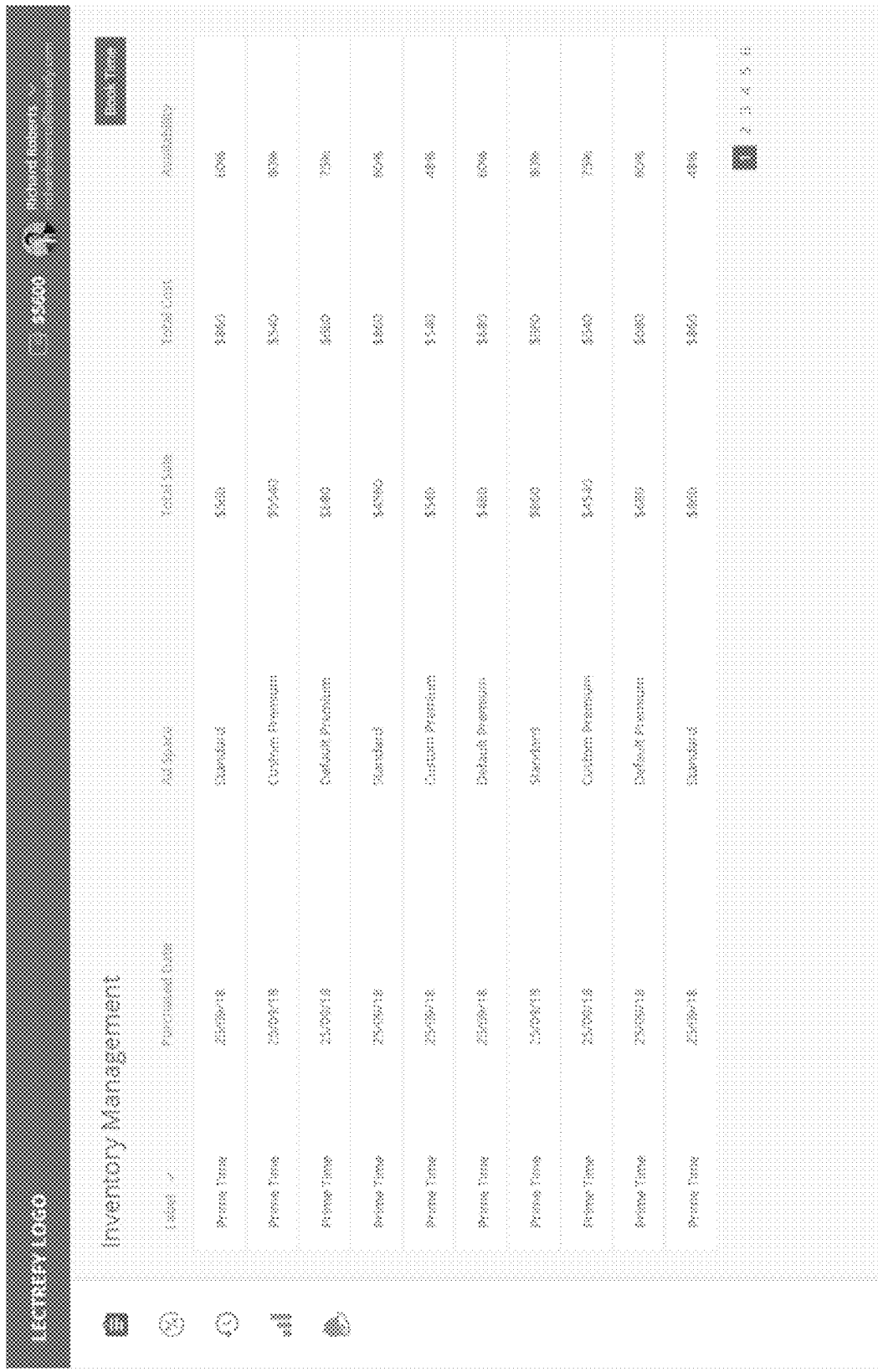

Certain example user interfaces will now be discussed with reference to FIGS. 12A-12K. Certain user interfaces may be configured to be accessed via user devices and used by an administrator (e.g., a sales agent), a content provider (e.g., an advertiser), or a broker (who purchases slots for resale to content providers). FIG. 12A illustrates an example inventory management user interface showing slot purchases for a given entity. For example, the inventory management user interface includes a label column, a purchased date column, an ad space column, a total sale column, a total cost column, and an availability column. The label column may include a name assigned to the purchase by the entity. The ad space column may indicate the type or quality of the purchased space (e.g., standard, premium, default premium, etc.). The total sale column may indicate the total sale value of the purchased slots to which content has been mapped by the entity. The total cost column may indicate the total cost of the purchased slots (including slots to which content has been mapped by the entity and slots that have not yet had content mapped thereto). The availability column indicates the percentage of slots to which content has not been allocated. The availability calculation takes into account the value of slots, where different slots may be associated with a different costs.

Figure 12B:
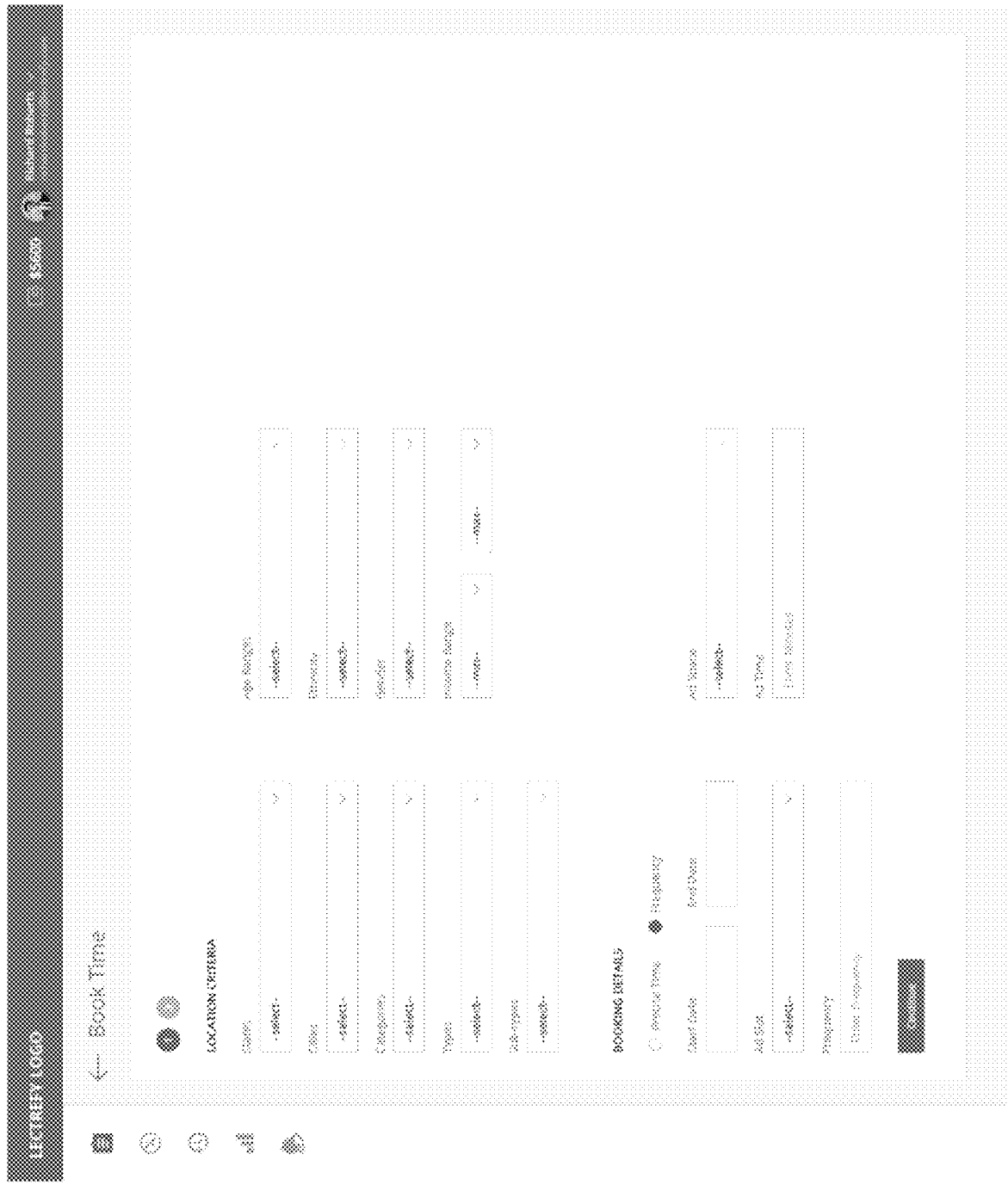

FIG. 12B illustrates an example "book time" user interface. The user interface includes fields for selecting/designating location criteria, such as states, cities, and/or categories. In addition, the user interface includes fields for selecting/designating types, sub-types, age ranges, ethnicity, gender, and income range. The category and sub-category fields may be used to assign tags to the content that the entity is provided to be displayed on stations. For example, if the user selects a category (e.g., women's shoes) and a corresponding menu of sub-categories may be identified and process to the entity. The entity may then select a sub-category (e.g., high-heeled shoes) from the identified sub-categories. In addition, booking details fields are provided, including checkboxes via which the user can specify whether a precise time or frequency will be specified. Fields are provided via which a start date, end date, ad slot, frequency (the number of times a given item of content is to be shown), ad space, and ad time may be specified.

Figure 12C:

FIG. 12C illustrates a "finalize booking" user interface. A requested time success rate is calculated and presented. The success rate may be reported as a percentage of the time requests that are available and/or have been successfully reserved, and/or in terms of absolute numbers (the number of time requests available out of how many time requests made). A user can indicate whether the user will only book locations at the specified preferred times, or whether the user is willing to select alternative times. A total due amount is reported (calculated based on the number of requested slots available). A table is generated including a location column (e.g., reporting a unique location identifier, such as a location name and address, a unique alphanumeric code, and/or the like), a cost column, a number of devices/stations column (reporting the number of stations at the location), and a scrollable calendar indicating various time slots for a corresponding date (including a control enabling a user to scroll through different dates). A given time slot cell may indicate whether the time slot is available for selection, not available for selection, or has already been selected by the user.

Figure 12D:

FIG. 12D illustrates a purchased time detail user interface. In this example, the purchase had previously been labeled "Prime Time". General data, sales data, and schedule data selection controls are provided. A label field is provided configured to receive a user label if the user wants to change the current label. Purchase date, first date, and last date fields are provided that report corresponding data. In addition, total time, total cost, total sale, and total time sold fields are provided that report corresponding data. A booking details area includes start date, end date, ad space, ad slot, ad time, success percentage fields that report corresponding data. A link is provided that when activated causes a scrollable calendar schedule to be rendered and presented showing when and where the entity's designated content is scheduled to be shown.

Figure 12E:
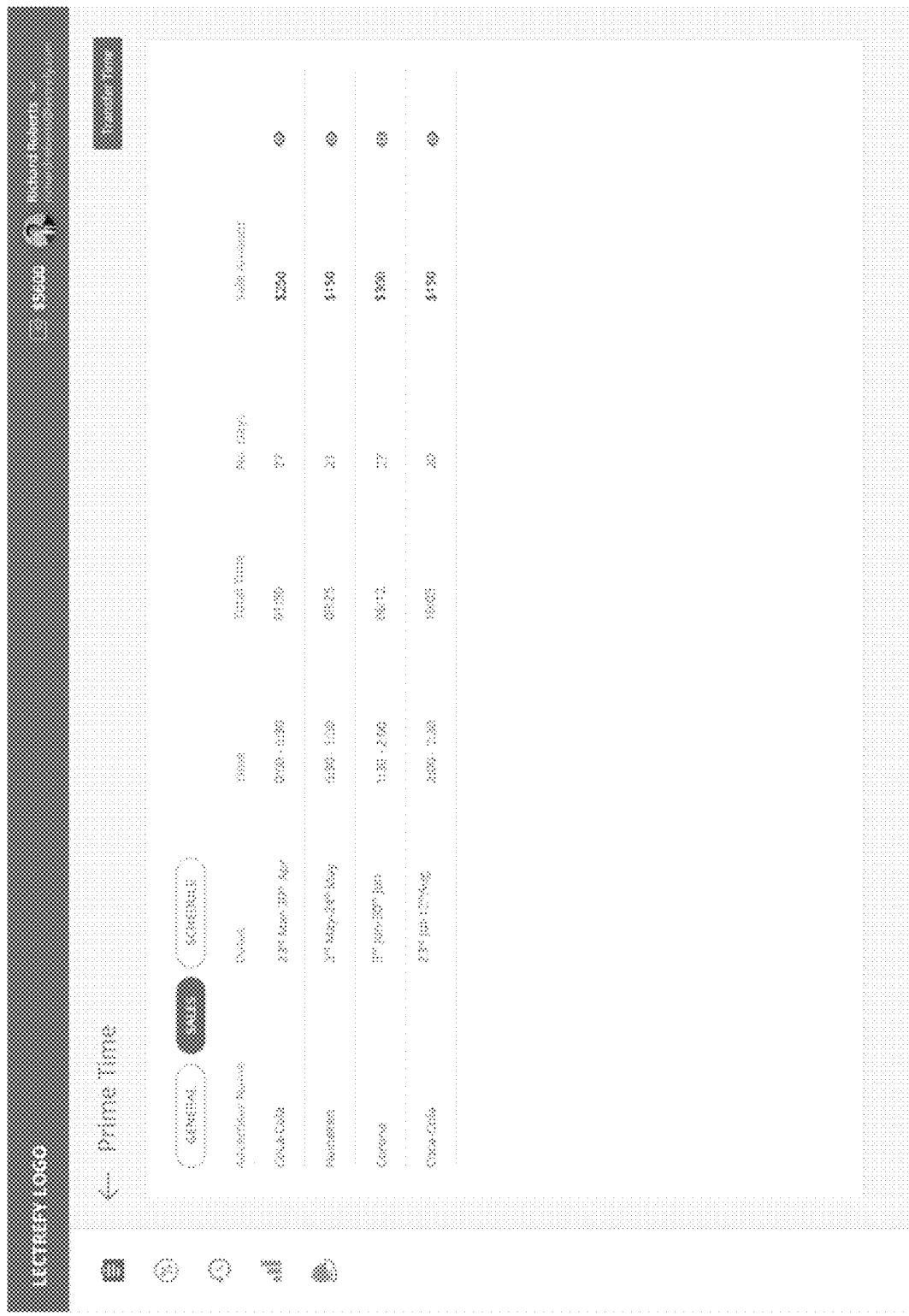

FIG. 12E illustrates an example campaign sales interface that may be accessed by an administrator. A table is rendered and displayed that includes a content provider (e.g., advertiser name) column, a campaign date range, a time range, a total time, the number of days in the campaign, and the sales amount.

Figure 12F:
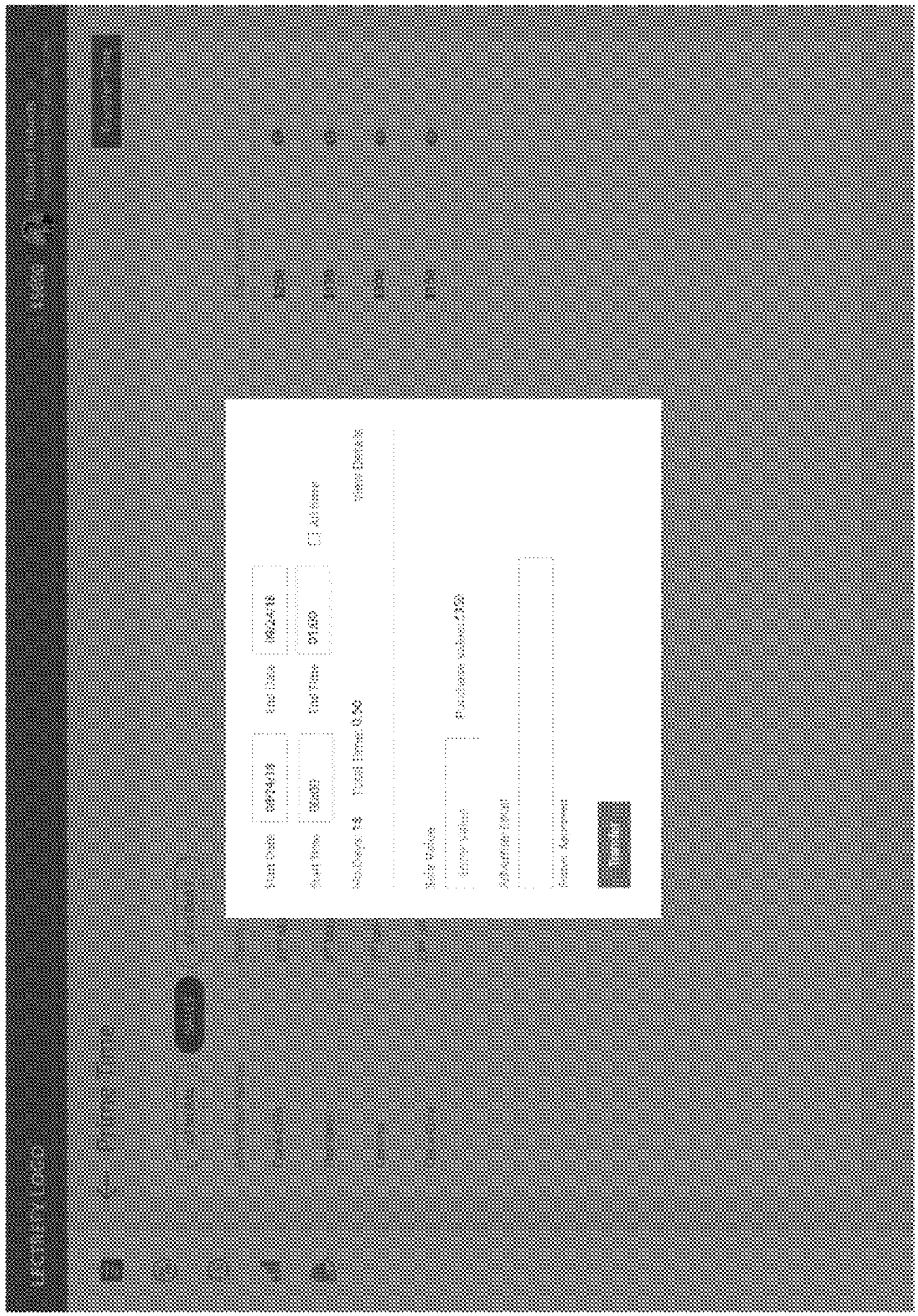

An entity (e.g., a broker or content provider) may be enabled to transfer purchased time to another entity (e.g., a content provider or broker). A "transfer time" control may be provided that when activated causes a time transfer interface to be rendered, an example of which is illustrated in FIG. 12F. The transferor may specify a start date, an end date, a start time, an end time, or all time for the time to be transferred. The system may, based on the entity input, calculate the total days for which time is being transferred, the total time, and the purchase value. The transferor may enter the sale value into a corresponding field. The transferor may enter the transferee's contact information (e.g., email address). A transfer control is provided that when activated will cause the system to transfer the corresponding time to the transferee. The transfer may be recorded in respective account records of the transferor and transferee.

Figure 12G:
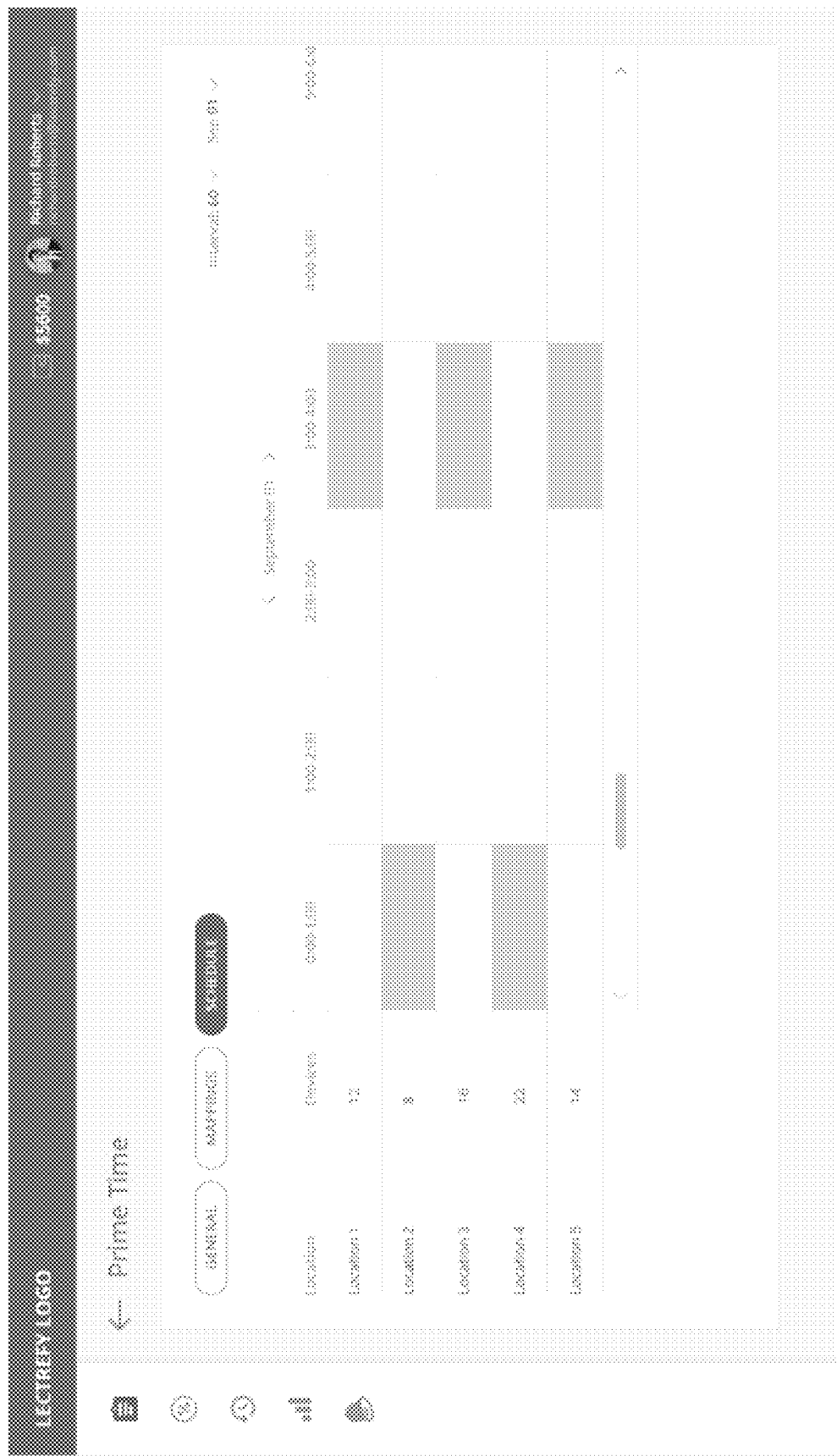

In response to a user (e.g., an administrator) activating a schedule control, the example user interface illustrated in FIG. 12G may be rendered. The schedule may include a location column that identifies (e.g., via name, address, unique alphanumeric code, etc.) locations at which stations are placed. The schedule may also include a devices column that provides the number of stations present at a corresponding location, and scrollable time slot columns with the corresponding content scheduled for respective time slots and/or an indication as to whether a given time slot is still available for purchase or has been already purchased. The time slot columns may indicate the purchaser of a given time slot. Controls may be provided via which a user can select the time interval and the date and the schedule will be rendered accordingly.

Figure 12H:
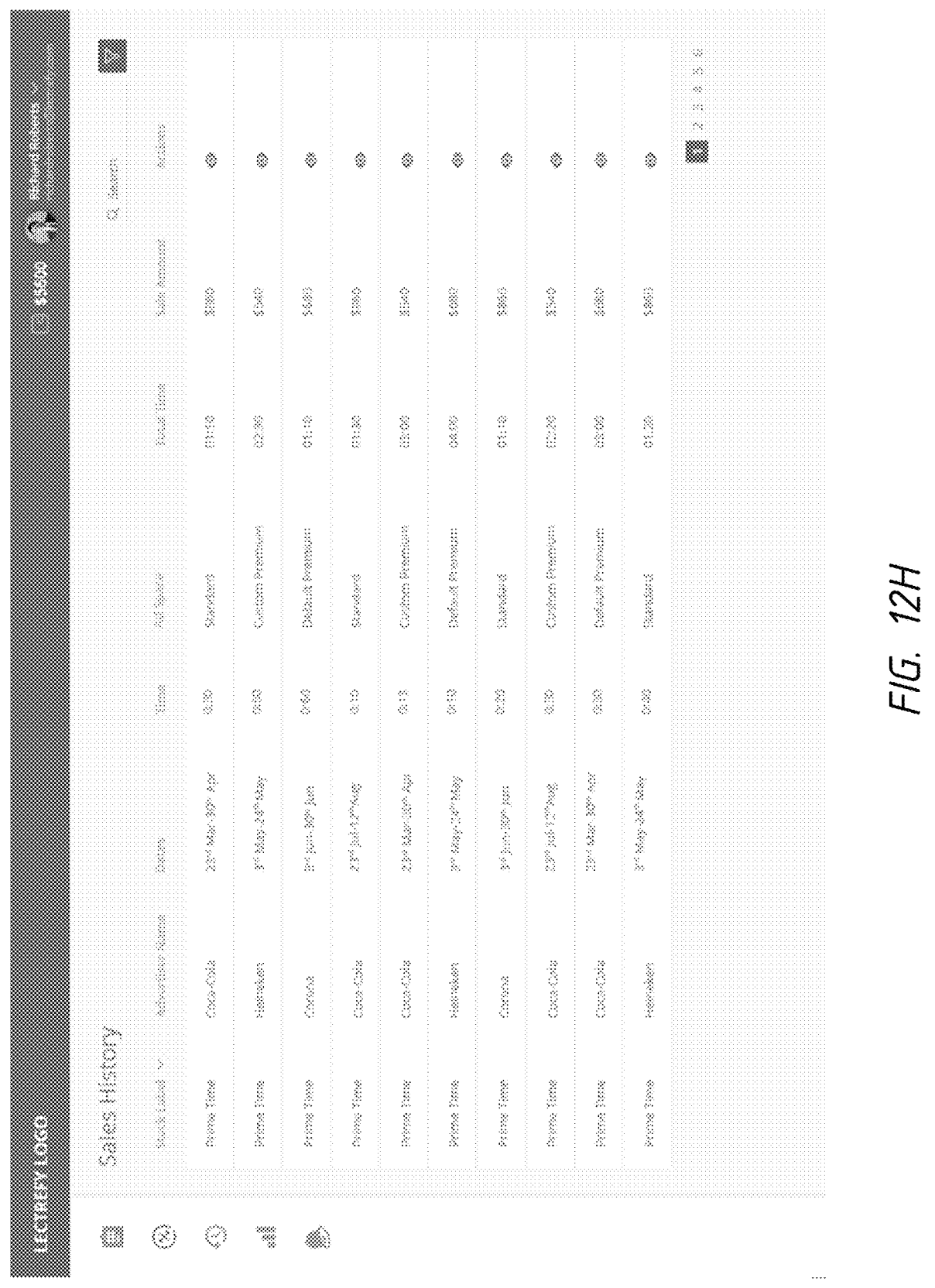

FIG. 12H illustrates an example sale history user interface for campaign/time purchases. The sale history user interface may be rendered as a table. The table may include a label column (e.g., a label assigned by a content provider that purchased the corresponding time). The user interface may include a content provider name, the campaign date range, the length of the content, the designation (e.g., quality) of the corresponding screen/page space purchased, the total time, the sale amount, and actions.

Figure 12I:

FIG. 12I illustrates an example time sold user interface that provides campaign details for different content providers. The name of the content provider (e.g., advertiser), sales value, purchase value, start date, end date, number of days, and total time for the campaign may be displayed. The time sold data may be rendered as a scrollable table including a location column and day columns. For each day column there is a content (e.g., ad) hour column and a content (e.g., ad) time column. A scroll control may be provided that enables the table to be scrolled to different dates and/or locations.

Figure 12J:
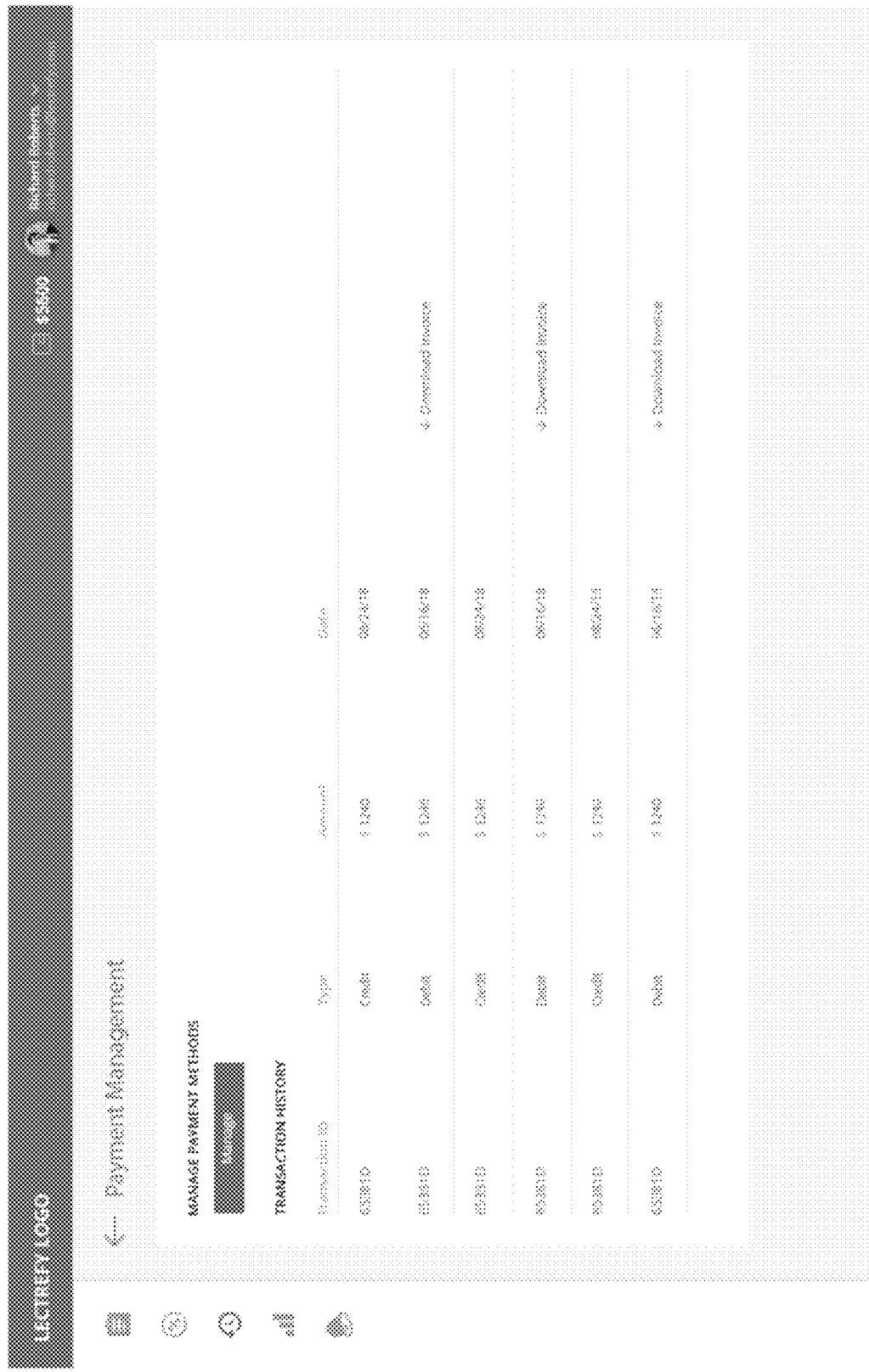

FIG. 12J illustrates an example transaction history user interface that provides financial information for time purchases. The information may be rendered as a scrollable table with a transaction identifier column, a payment instrument type column (e.g., credit, debit, etc. used to make the purchase), a transaction amount column, and a transaction date column. An invoice download control may be provided that when activated causes a corresponding transaction invoice to be downloaded (e.g., as a PDF file) to a user terminal.

Figure 12K:
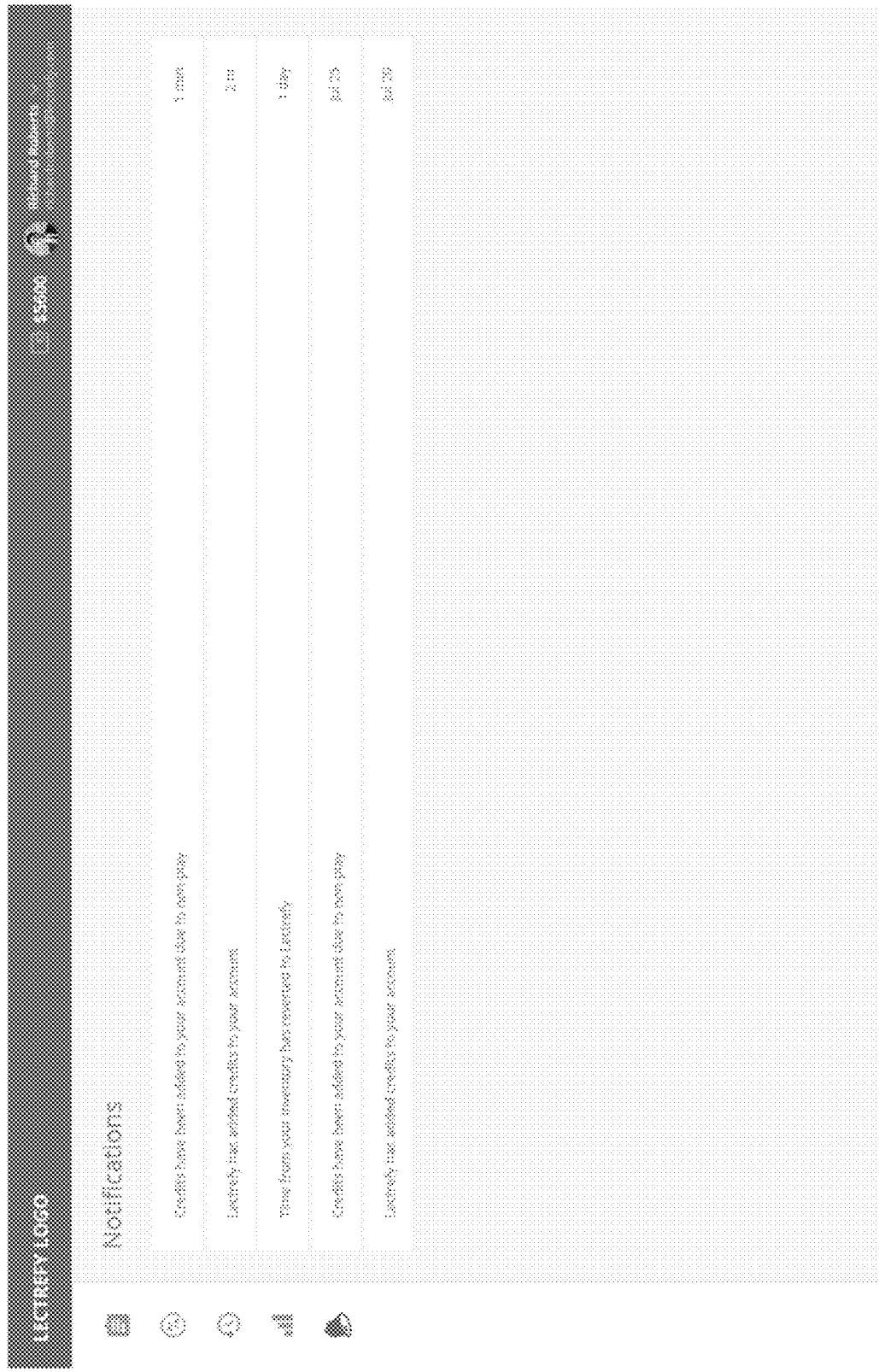

FIG. 12K illustrates an example notification user interface that lists notifications and the timing of the notifications generated by the system to a user (e.g., a purchaser of time). The notifications may reflect events detected or initiated by the system.

Figure 13A:
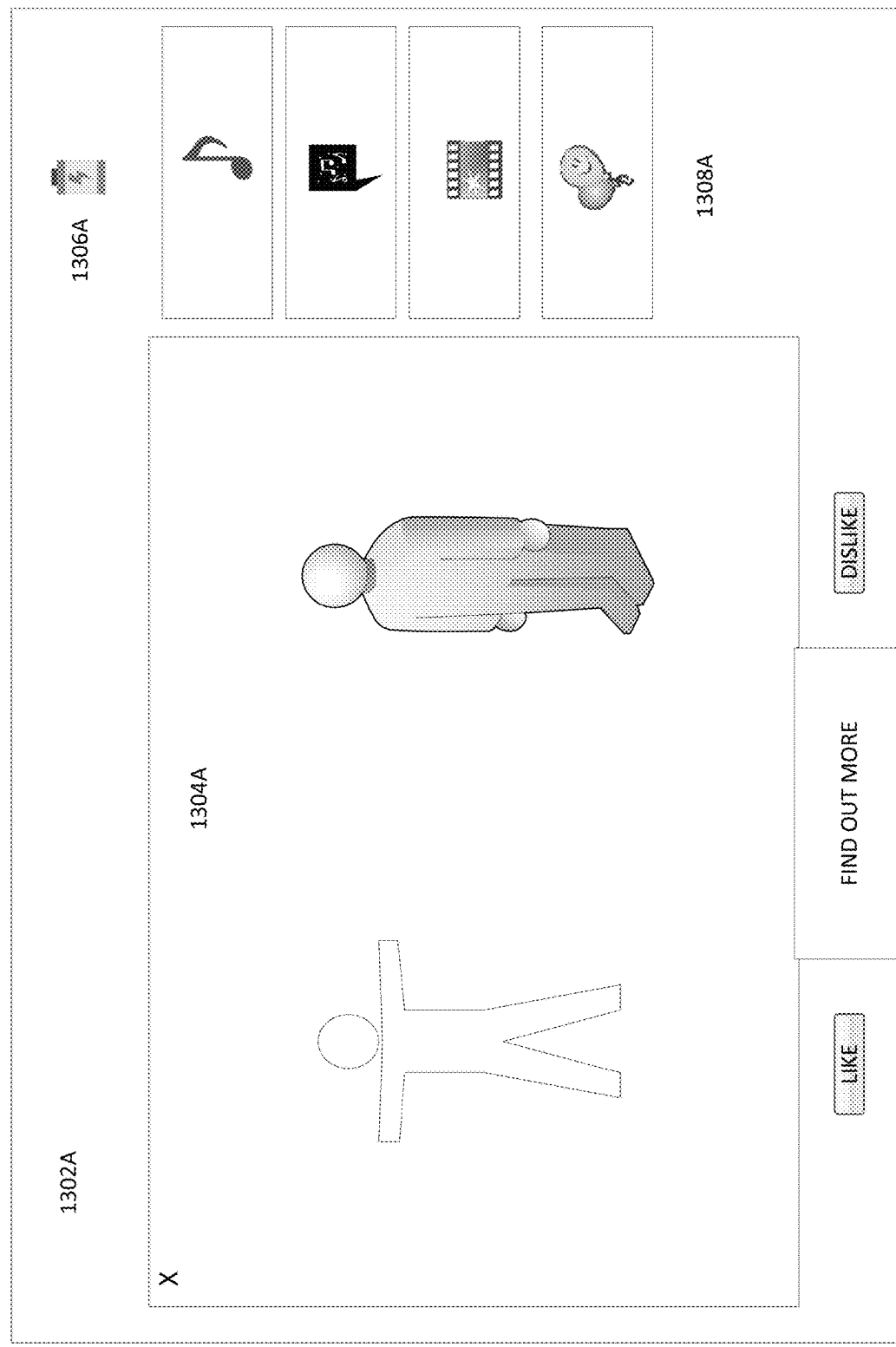
Figure 13B:
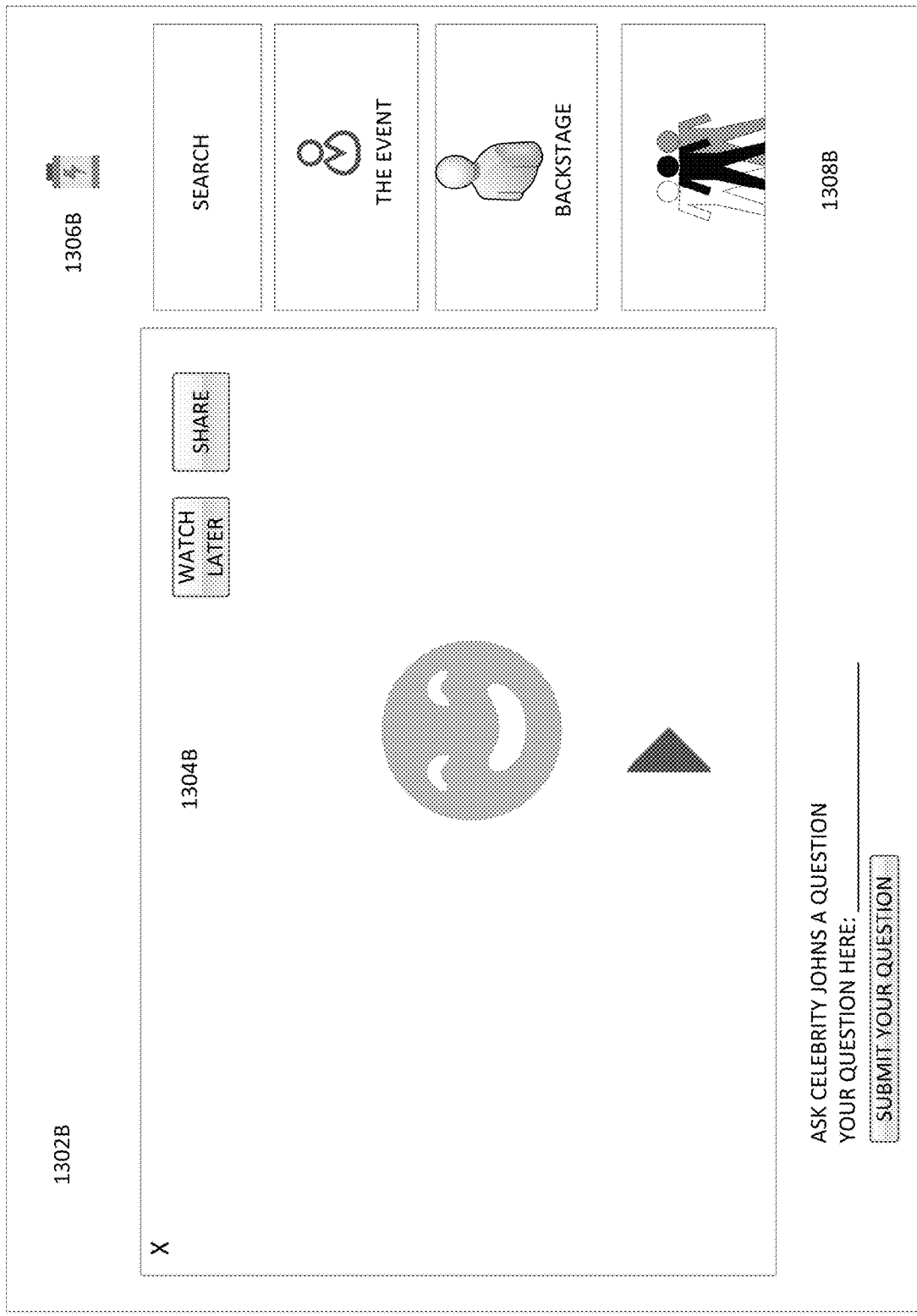

FIGS. 13A-13B illustrate example user interfaces that may be displayed on a charging station.

FIG. 13A illustrates an example user interface 1302A that may be displayed on a charging station display based on a user profile. As described elsewhere herein, the user profile may be identified using an image of the user captured using a station camera or otherwise as described elsewhere herein. The user profile may be used, in part, to select content to present to the user, as similarly described elsewhere herein. Content, such as a pre-recorded video or live video feed may be displayed in a first, largest pane 1304A. A control may be provided which enables the user to close the pane 1304A so that it is no longer displayed. A control may be provided (e.g., a "find out more" control) which when activated causes additional information/content related to the content displayed in pane 1304A to be accessed from a local or remote source (e.g., a web server) and enable such additional information/content to be rendered on the station display. One or more battery charge indicators/meters 1306A may report the charge state of the station battery and/or of the user device connected to the station.

The user interface 1302A may include a like control and/or dislike control via which the user can indicate whether the user likes or dislikes the content rendered in pane 1304A, where such indication may be stored in the user' profile and used to select future content as similarly discussed elsewhere herein. One or more other panes 1308A may display corresponding content (e.g., video content, still image content, text content, links to audio content, other content types described herein, and/or the like). The user can select one or more of the panes 1308A, and the content may optionally be rendered in the pane 1304A, within the selected pane, or elsewhere, and any audio may be played back via the station speaker (or wired or wireless headphones/ear buds of the user connected to the station). The user content selections may be stored in the user's profile.

Optionally, the panes may include one or more social media feeds (e.g., selected based on the user's profile). Optionally, the content of one or more of the panes and/or one or more controls (e.g., links to content) may be selected based at least in part on the user's profile and/or on the location of the station. Thus, different stations at a given venue may automatically display different content, based on the location of the tablet and on the profile of the user (if a user profile is available). For example, if the station is located at an airport, the content of a given pane may be current flight arrival and/or departure times for a time period (e.g., the next 4 hours) for the airport. By way of additional example, if the station is located at a sports venue, the content of a given pane may be score information or player information for a game being played at the venue. By way of further example, if the station is located at a mall, and the user's profile indicates an interest in jewelry, the content of a given pane may identify jewelry stores within the mall. By way of yet further example, if the station is located at a clothing store, one or more buttons (e.g., a set of buttons) maybe dynamically selected/generated and presented, where activation of a button causes a corresponding clothing trend social media feed to be accessed and presented via the station. Thus, a dynamic set of controls may be generated and presented to the user based at least in part on the station location and/or on the user's profile.

A search field may be provided via which the user may enter a search query (e.g., using a station keyboard or via voice input) comprising one or more search terms. For example, the search field may enable the user to enter search terms to search for content and/or information. A local and/or remote search engine may receive the query, search for corresponding content/information, and cause search results to be displayed on the tablet, optionally in a ranked order (e.g., ranked in terms of relevance and/or in terms of paid placement). The search results may include respective links to sites hosting the corresponding content/information.

FIG. 13B illustrates a user interface 1302B displaying a live video feed (e.g., of a concert, sporting event, interview, etc.) in a pane 1304B. A play/pause control is provided which when activated enables the user to pause or restart the live video feed. If the user pauses the live video feed and then activates the play control, the displayed feed will be time delayed to an amount corresponding to the time gap between the activation of the pause and play controls.

A "watch later" control, when activated, enables the user to later access a recorded version of the live video feed (e.g., causes the video to be stored in a watch list of the user). The user interface 1302B provides one or more interfaces enabling the user to interact with a person presented in the live video feed. For example, a text field may be provided via which the user may enter a question or comment which may be provided in real time to a person in the live video (or someone working with the person in the live video). The person in the live video may respond on the live feed to the user question or comment or the response may be provided via text and/or audio video directly to the user by the person in the live video or by another person associated with the person in the live video. Optionally, an audio/video input control may be provided which enables the user to provide the question or comment via a tablet microphone and/or camera.

One or more other panes 1308B may display corresponding content (e.g., live video content, prerecorded video content, still image content, text content, links to audio content, other content types described herein, and/or the like) which are optionally related to the live video rendered in 1304B. For example, if the pane 1304B is displaying a concert-related video, one of the panes 130B may provide access to backstage video of the concert, and another pane may provide a video of the concert itself or of a past concert. Different content may be displayed based on the location of the station within a venue. For example, if the station is determined to be located in a venue seating area that has a partly or wholly blocked view of an event at the venue, one or more panes may show camera views of the event (e.g., concert) that a station user would not be able to see. By contrast, if the station is determined to be located in a venue seating area that has an unobstructed view of an event at the venue, one or more panes may show a close-up of what the user can view with the user's unaided eye.

The user can select one or more of the panes 1308B and the content may optionally be rendered in the pane 1304B, in the selected pane, or elsewhere, and any audio may be played back via the station speaker (or wired or wireless headphones/ear buds of the user connected to the station). The user content selections may be stored in the user's profile as similarly discussed elsewhere.

Optionally, certain content, such as certain live video streams of a live event, may only be made available to stations located at the venue where the live event is taking place. Optionally, certain panes may present content only be made available to stations located at the venue where the live event is taking place, while other panes may present content that is also available at other locations. Controls or panes may provide links to enable a user to order food or merchandise at the venue where the station is located.

As similarly discussed elsewhere herein, one or more battery charge indicators/meters 1306B may report the charge state of the station battery and/or of the user device connected to the station. A search field may be provided via which the user may enter a search query comprising search terms. A local and/or remote search engine may receive the query, search for corresponding content/information, and cause search results to be displayed on the station display, optionally in a ranked order (e.g., ranked in terms of relevance and/or in terms of paid placement). The search results may include respective links to sites hosting the corresponding content/information.

Optionally, an interface may be provided that enables a user to capture an image of the user's face, and modify the image of the face. For example, controls and menus may be provided which enables the user to age the face to a desired age, to add or change hair, glasses, hats, beards, clothing and/or like. Controls and menus may be provided that enable a user to add a digital sticker or frame to the image. Controls and menus may be provided that enable the user to share the modified image via a social media site, a messaging service, email, and/or otherwise.

Thus, as would be appreciated by one of skill in the art, the use of the disclosed navigation techniques and user interfaces represent a significant technological advance over prior conventional implementations. For example, the use of the disclosed user interface enables a user to locate and access content with fewer clicks, scrolls, and/or page navigations that would otherwise be required to locate appropriate content.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers, gaming consoles, smart televisions, etc. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integer to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. For example, a click may be in the form of a user touch (via finger or stylus) on a touch screen, or in the form of a user moving a cursor (using a mouse of keyboard navigation keys) to a displayed object and activating a physical control (e.g., a mouse button or keyboard key). User inputs may, by way of example, be provided via an interface or in response to a prompt (e.g., a voice or text prompt). By way of example an interface may include text fields, wherein a user provides input by entering text into the field. By way of further example, a user input may be received via a menu selection (e.g., a drop down menu, a list or other arrangement via which the user can check via a check box or otherwise make a selection or selections, a group of individually selectable icons, a menu selection made via an interactive voice response system, etc.). When the user provides an input or activates a control, a corresponding computing system may perform a corresponding operation (e.g., store the user input, process the user input, provide a response to the user input, etc.). Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone, a VoIP equipped mobile device, etc.), laptop, tablet computer, interactive television, game console, media streaming device, head-wearable display, virtual reality display/headset, augmented reality display/headset, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

What is claimed is:

1. An image processing system, comprising:
   a network interface;
   a processing device;
   computer readable memory that stores instructions that when executed by the processing device cause the image processing system to perform operations comprising:
      determine a first physical location of a remote terminal camera, the remote terminal comprising the camera and a remote terminal network interface;
      receive via the network interface images from the remote terminal camera at the first physical location, the remote terminal comprising the camera and the remote terminal network interface;
      detect faces of people viewing at least a first item in at least a portion of the images received from the remote terminal camera at the first physical location;
      estimate respective ages of the detected faces in the images of people viewing at least the first item;
      estimate respective genders of the detected faces in the images of people viewing at least the first item;
      determine facial expressions of detected faces of people viewing at least the first item in the images received from the remote terminal camera;
      determine emotions from the determined facial expressions of detected faces of people viewing at least the first item in the images received from the remote terminal camera, wherein the emotions are determined using:
         facial component detection,
         facial feature extraction, and
         expression classification;
      determine how many people viewed the first item at the first physical location over a first specified period of time;
      detect inputs provided via fingers of people that viewed the first item at the first physical location over the first specified period of time, the finger inputs providing corresponding interactivity with the first item;
      store in non-transitory computer readable memory:
         an identifier associated with the first item,
         the estimated respective ages of the detected faces in the images of people viewing at least the first item,
         the estimated respective genders of the detected faces in the images of people viewing at least the first item;
         the determined emotions of the detected faces in the images of people viewing at least the first item;

a quantity corresponding to the determination as to how many people viewed the first item at the first physical location over the first specified period of time;
the detected inputs provided via fingers of people that viewed the first item at the first physical location over the first specified period of time, the finger inputs providing corresponding interactivity with the first item; use:
the determined first physical location of the remote terminal camera, and
the detected inputs provided via fingers of people that viewed the first item at the first physical location over the first specified period of time, the finger inputs providing corresponding interactivity with the first item, and
the identifier associated with the first item, and
the estimated respective ages of the detected faces in the images of people viewing at least the first item, and
the estimated respective genders of the detected faces in the images of people viewing at least the first item, and
the determined emotions of the detected faces in the images of people viewing at least the first item, and
the quantity corresponding to the determination as to how many people viewed the first item at the first physical location over the first specified period of time,
to enable, at least in part, a second item to presented to at least one viewer.

2. The image processing system as defined in claim 1, the operations further comprising:
receive from a first source a target definition comprising specified demographics and specified historical emotional responses to viewed items;
based at least in part on:
the received target definition,
the estimated respective ages of the detected faces in the images of people viewing at least the first item,
the estimated respective genders of the detected faces in the images of people viewing at least the first item;
the determined emotions of the detected faces in the images of people viewing at least the first item;
the determined quantity of people that viewed the first item at the first physical location over the first specified period of time,
select an item of content, and
cause the selected item of content to be presented at the first physical location.

3. The image processing system as defined in claim 1, the operations further comprising:
periodically delete images captured by the remote terminal camera to thereby preserve privacy of people whose images are captured.

4. The image processing system as defined in claim 1, the operations further comprising:
use a pre-trained expression classifier that utilizes a support vector machine, adaptive boosting, Random Forest and/or Gradient Tree Boosting algorithms to perform expression classification.

5. The image processing system as defined in claim 1, the operations further comprising:
perform expression classification utilizing extracted spatial and temporal features.

6. The image processing system as defined in claim 1, the operations further comprising:
use one or more Convolutional Neural Networks to determine from the detected faces: ages, genders and ethnicities.

7. The image processing system as defined in claim 1, the operations further comprising:
generate a report using data received from the remote terminal that indicates quantities and types of content presented to viewers for a first time period, and viewer interactions with the content.

8. The image processing system as defined in claim 1, the operations further comprising:
enable a report filter to be set that limits a first report to a first brand;
based at least in part on the report filter being set, generate the first report limited to the first brand using data received from the remote terminal that indicates quantities and types of content presented to viewers for a first time period, and viewer interactions with the content.

9. The image processing system as defined in claim 1, wherein the remote terminal comprises a battery, the operations further comprising:
monitor a charge level of the battery in the remote terminal; and
generate an alert at least partly in response to detecting that the charge level of the battery in the remote terminal falls below a first threshold.

10. The image processing system as defined in claim 1, wherein the remote terminal comprises a battery configured to charge a user device, the operations further comprising:
detect when a user device is being charged by the remote terminal battery; and
at least partly in response to detecting that a user device is being charged by the remote terminal battery, cause a first content item to be presented by a display of the remote terminal.

11. An image processing system, comprising:
a network interface;
a processing device;
computer readable memory that stores instructions that when executed by the processing device cause the image processing system to perform operations comprising;
determine a first physical location of a remote camera, the remote camera positioned at a first physical location;
receive via the network interface images from the remote camera positioned at the determined first physical location;
detect faces of people viewing at least a first item in at least a portion of the images received from the remote camera at the determined first physical location;
estimate respective ages of the detected faces in the images of people viewing at least the first item;
estimate respective genders of the detected faces in the images of people viewing at least the first item;
determine how many people viewed the first item at the first physical location over a first specified period of time;
detect inputs provided via fingers of people that viewed the first item at the first physical location over the first specified period of time, the finger inputs providing corresponding interactivity with the first item;
store in non-transitory computer readable memory:

the determined first physical location of the remote camera, and the detected inputs provided via fingers of people that viewed the first item at the first physical location over the first specified period of time, the finger inputs providing corresponding interactivity with the first item, and an identifier associated with the first item, and the estimated respective ages of the detected faces in the images of people viewing at least the first item, and the estimated respective genders of the detected faces in the images of people viewing at least the first item;

a quantity corresponding to the determination as to how many people viewed the first item at the first physical location over the first specified period of time; use:

the determined first physical location of the remote camera, and the detected inputs provided via fingers of people that viewed the first item at the first physical location over the first specified period of time, and the identifier associated with the first item, and the estimated respective ages of the detected faces in the images of people viewing at least the first item, and the estimated respective genders of the detected faces in the images of people viewing at least the first item, and the determined quantity corresponding to the determination as to how many people viewed the first item at the first physical location over the first specified period of time, to enable, at least in part, a second item to be selected to be presented to at least one person.

12. The image processing system as defined in claim 11, the operations further comprising:

determine pupil positions in the images of people viewing at least the first item;

use the determined pupil position in the images of people viewing at least the first item in enabling the second item to be selected to be presented to at least one person.

13. The image processing system as defined in claim 11, the operations further comprising:

Identify clothing and/or jewelry in the images of people viewing at least the first item;

use the identified clothing and/or jewelry in the images of people viewing at least the first item in enabling the second item to be selected to be presented to at least one person.

14. The image processing system as defined in claim 11, the operations further comprising:

receive from a first source a target definition comprising specified demographics and specified historical emotional responses to viewed items;

based at least in part on:
the received target definition,
the estimated respective ages of the detected faces in the images of people viewing at least the first item,
the estimated respective genders of the detected faces in the images of people viewing at least the first item;
historical emotional responses to viewed items;
the quantity corresponding to the determination as to how many people viewed the first item at the first physical location over the first specified period of time.

15. The image processing system as defined in claim 11, the operations further comprising:

periodically delete images captured by the remote camera to thereby preserve privacy of people whose images are captured.

16. The image processing system as defined in claim 11, the operations further comprising:

use a pre-trained expression classifier that utilizes a support vector machine, adaptive boosting, Random Forest and/or Gradient Tree Boosting algorithms to perform expression classification on the detected faces in the images of people viewing at least the first item.

17. The image processing system as defined in claim 11, the operations further comprising:

perform expression classification utilizing extracted spatial and temporal features.

18. The image processing system as defined in claim 11, the operations further comprising:

use one or more Convolutional Neural Networks to determine from the detected faces: ages and genders.

19. The image processing system as defined in claim 11, the operations further comprising:

generate a report using data received from a remote terminal at the first physical location that indicates quantities and types of content presented to viewers for a first time period, and viewer interactions with the content.

20. The image processing system as defined in claim 11, the operations further comprising:

enable a report filter to be set that limits a first report to a first brand;

based at least in part on the report filter being set, generate the first report limited to the first brand using data that indicates quantities and types of content presented to viewers for a first time period, and viewer interactions with the content.

21. The image processing system as defined in claim 11, wherein the remote camera is positioned on remote terminal that comprises a battery, the operations further comprising:

monitor a charge level of the battery in the remote terminal; and generate an alert at least partly in response to detecting that the charge level of the battery in the remote terminal falls below a first threshold.

22. The image processing system as defined in claim 11, wherein the wherein the remote camera is part of a remote terminal that comprises a battery configured to charge a user device, the operations further comprising:

detect when a user device is being charged by the remote terminal battery; and at least partly in response to detecting that a user device is being charged by the remote terminal battery, cause a first content item to be presented by a display of the remote terminal.

23. A computer implemented method, the method comprising:

determining, by a computer system, a first physical location of a remote camera;

receiving at the computer system via a network interface images from the remote camera positioned at the determined first physical location;

causing faces of people viewing at least a first item to be detected in at least a portion of the images received from the remote camera at the determined first physical location;

causing respective ages of the detected faces in the images of people viewing at least the first item to be determined;
causing respective genders of the detected faces in the images of people viewing at least the first item to be identified;
causing a quantity of people that viewed the first item at the first physical location over a first specified period of time to be determined;
storing in non-transitory computer readable memory:
the determined first physical location of the remote camera, and
an identifier associated with the first item, and
the determined respective ages of the detected faces in the images of people viewing at least the first item, and
the determined respective genders of the detected faces in the images of people viewing at least the first item, and
the determined quantity of people that viewed the first item at the first physical location over the first specified period of time;
using:
the determined first physical location of the remote camera, and
the identifier associated with the first item, and
the determined respective ages of the detected faces in the images of people viewing at least the first item, and
the determined respective genders of the detected faces in the images of people viewing at least the first item, and
the determined quantity of people that viewed the first item at the determined first physical location over the first specified period of time, and
to enable, at least in part, a second item to be selected to be presented to at least one person.

24. The method as defined in claim 23, the method further comprising:
determining pupil positions in the images of people viewing at least the first item;
enabling the determined pupil position in the images of people viewing at least the first item to be used in selecting the second item to be presented to at least one person.

25. The method as defined in claim 23, the method further comprising:
enabling clothing and/or jewelry in the images of people viewing at least the first item to be identified;
enabling the identified clothing and/or jewelry in the images of people viewing at least the first to be used in selecting the second item.

26. The method as defined in claim 23, the method further comprising:
based at least in part on:
a received target definition,
the determined respective ages of the detected faces in the images of people viewing at least the first item,
the determined respective genders of the detected faces in the images of people viewing at least the first item;
enabling an item of content to be selected for presentation to one or more people.

27. The method as defined in claim 23, the method further comprising:
causing images captured by the remote camera to be periodically deleted to thereby preserve privacy of people whose images are captured.

28. The method as defined in claim 23, the method further comprising:
using a pre-trained expression classifier that utilizes a support vector machine, adaptive boosting, Random Forest and/or Gradient Tree Boosting algorithms to perform expression classification on the detected faces in the images of people viewing at least the first item.

29. The method as defined in claim 23, the method further comprising:
generating a report using data received from a remote terminal at the first physical location that indicates quantities and types of content presented to viewers for a first time period, and viewer interactions with the content.

30. The method as defined in claim 23, the method further comprising:
enabling a report filter to be set that limits a first report to a first brand;
based at least in part on the report filter being set, generating the first report limited to the first brand using data that indicates quantities and types of content presented to viewers for a first time period, and viewer interactions with the content.

* * * * *